(12) United States Patent
Mello et al.

(10) Patent No.: US 7,914,604 B2
(45) Date of Patent: Mar. 29, 2011

(54) AIR CONDITIONING SYSTEM WITH MODULAR ELECTRICALLY STIMULATED AIR FILTER APPARATUS

(76) Inventors: Peter J. Mello, Scottsdale, AZ (US); Kenneth B. Tippets, Jr., Glendale, AZ (US); Margaret W. Crumpton, Cave Creek, AZ (US)

( * ) Notice: Subject to any disclaimer, the term of this patent is extended or adjusted under 35 U.S.C. 154(b) by 0 days.

(21) Appl. No.: 12/579,895

(22) Filed: Oct. 15, 2009

(65) Prior Publication Data
US 2010/0263530 A1    Oct. 21, 2010

Related U.S. Application Data

(62) Division of application No. 12/049,095, filed on Mar. 14, 2008, now Pat. No. 7,608,135, which is a division of application No. 11/828,245, filed on Jul. 25, 2007, now Pat. No. 7,531,028.

(51) Int. Cl.
*B03C 3/155* (2006.01)
(52) U.S. Cl. ..................... 95/69; 95/70; 95/79
(58) Field of Classification Search ............... 95/63, 69, 95/70, 78, 79; 96/55, 57–60, 66, 67, 69, 96/75–77, 83, 88–90, 96, 99
See application file for complete search history.

(56) References Cited

U.S. PATENT DOCUMENTS

| | | | | |
|---|---|---|---|---|
| 2,160,003 A | * | 5/1939 | Slayter et al. | 55/491 |
| 2,182,501 A | * | 12/1939 | Quave et al. | 55/491 |
| 2,404,479 A | * | 7/1946 | Essick | 261/97 |
| 2,505,175 A | * | 4/1950 | Davis | 55/491 |
| 2,579,445 A | * | 12/1951 | Warburton | 96/66 |
| 3,019,854 A | * | 2/1962 | O'Bryant | 55/491 |
| 3,271,932 A | * | 9/1966 | Newell | 96/67 |
| 3,727,380 A | * | 4/1973 | Remick | 96/76 |
| 3,999,964 A | * | 12/1976 | Carr | 96/59 |
| 4,715,870 A | * | 12/1987 | Masuda et al. | 96/67 |
| 4,940,470 A | * | 7/1990 | Jaisinghani et al. | 95/78 |
| 5,271,763 A | * | 12/1993 | Jang | 96/55 |
| 5,330,559 A | * | 7/1994 | Cheney et al. | 95/63 |
| 5,368,635 A | * | 11/1994 | Yamamoto | 96/17 |
| 5,403,383 A | * | 4/1995 | Jaisinghani | 95/69 |
| 5,540,761 A | * | 7/1996 | Yamamoto | 96/67 |
| 5,647,890 A | * | 7/1997 | Yamamoto | 95/69 |
| 5,855,653 A | * | 1/1999 | Yamamoto | 96/58 |
| 6,156,104 A | * | 12/2000 | Jeong | 96/88 |
| 7,156,898 B2 | * | 1/2007 | Jaisinghani | 95/63 |
| 7,531,028 B2 | * | 5/2009 | Mello et al. | 96/55 |

(Continued)

FOREIGN PATENT DOCUMENTS

JP    4-363157 A  * 12/1992 ................. 96/96

(Continued)

*Primary Examiner* — Richard L Chiesa
(74) *Attorney, Agent, or Firm* — Parsons & Goltry; Michael W. Goltry; Robert A. Parsons

(57) ABSTRACT

An air conditioning system includes an air flow pathway extending through a housing from an inlet to an outlet. Air conditioning apparatus is disposed in the airflow pathway between the inlet and the outlet conditioning an air stream passing through the air flow pathway from the inlet to the outlet. A modular electrically stimulated air filter apparatus is carried by opposed, parallel frameworks mounted in series in the air flow pathway between the inlet and the air conditioning apparatus filtering entrapping contaminants in the air stream flowing through the housing from the inlet to the outlet. The opposed parallel frameworks are mounted to opposed supports affixed to the housing.

16 Claims, 34 Drawing Sheets

U.S. PATENT DOCUMENTS

| | | | |
|---|---|---|---|
| 7,608,135 B2 * | 10/2009 | Mello et al. | 96/59 |
| 2006/0070526 A1 * | 4/2006 | Hong et al. | 96/69 |
| 2006/0150816 A1 * | 7/2006 | Jaisinghani | 96/67 |
| 2006/0180023 A1 * | 8/2006 | Coppom et al. | 95/59 |
| 2009/0025402 A1 * | 1/2009 | Mello et al. | 62/78 |
| 2009/0025559 A1 * | 1/2009 | Mello et al. | 96/57 |

FOREIGN PATENT DOCUMENTS

| | | | |
|---|---|---|---|
| WO | WO 8702274 A1 * | 4/1987 | 96/67 |

* cited by examiner

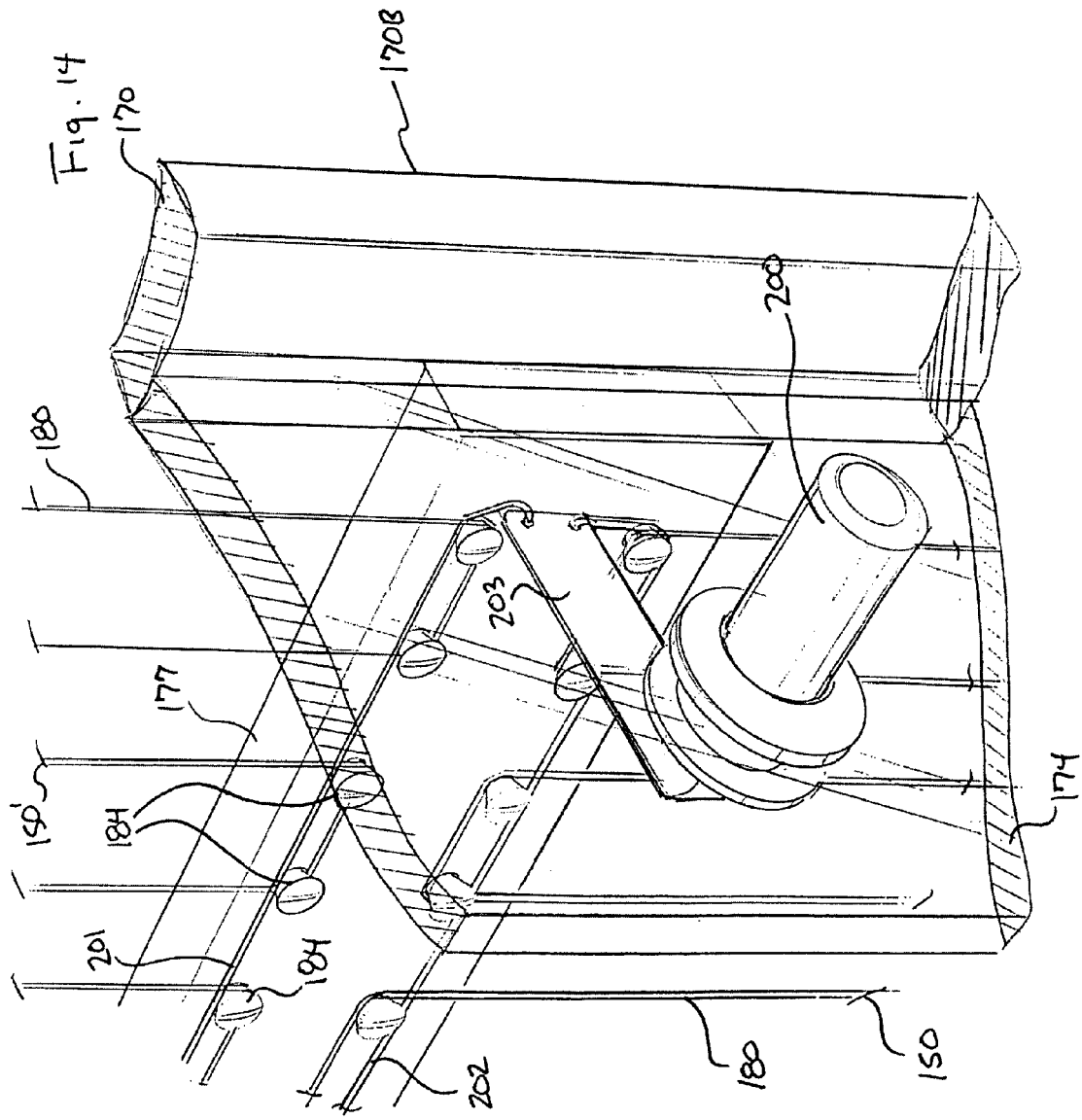

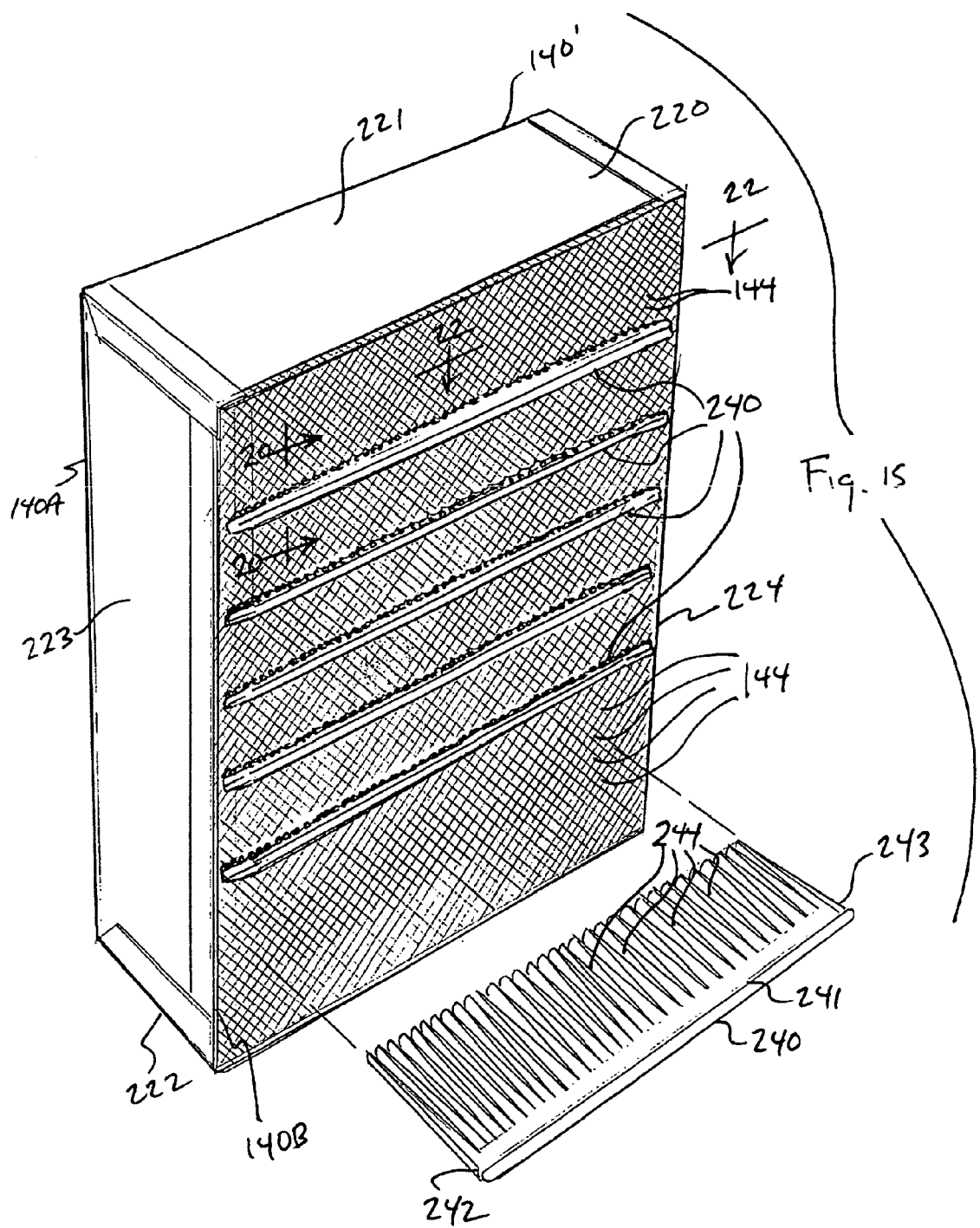

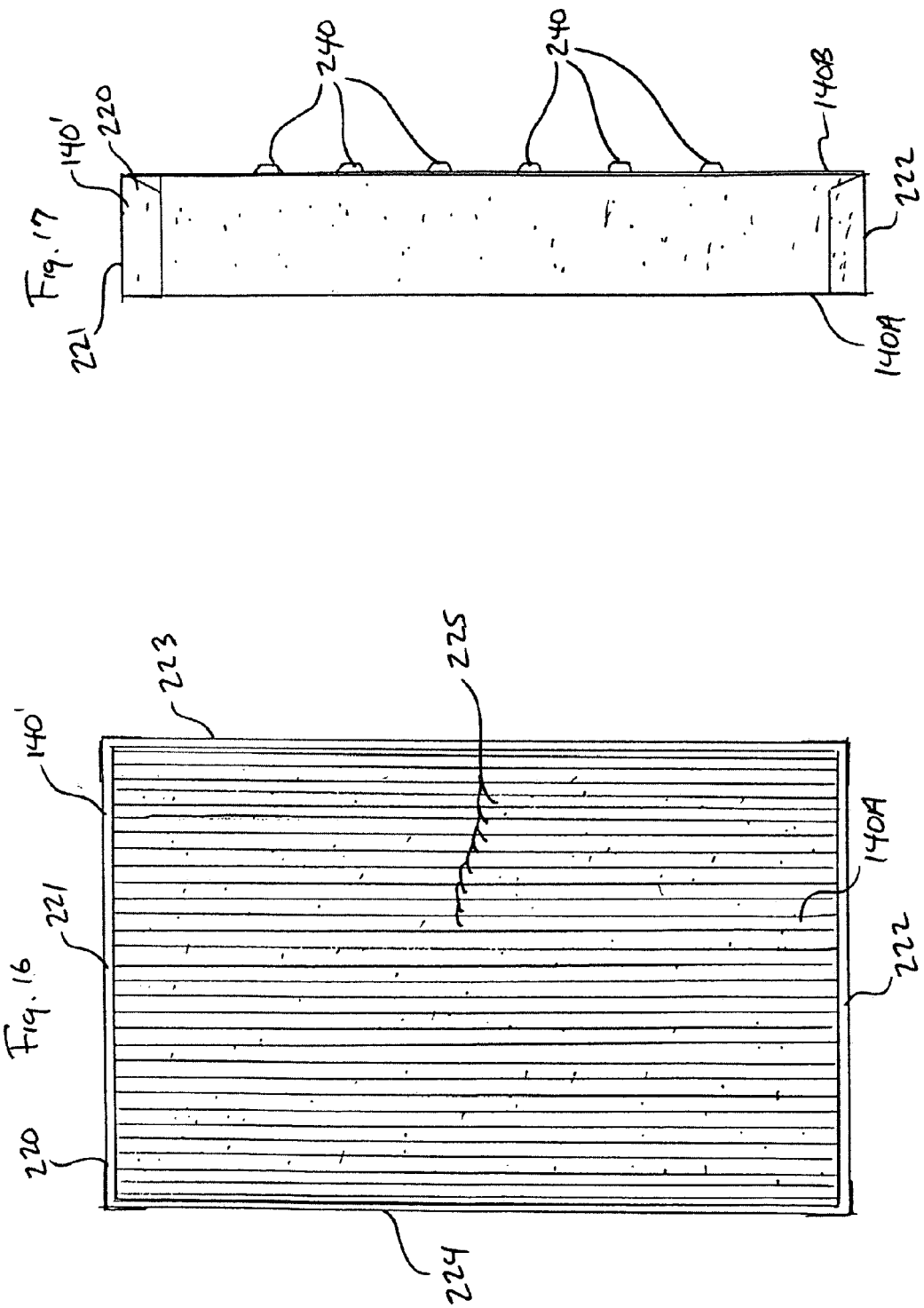

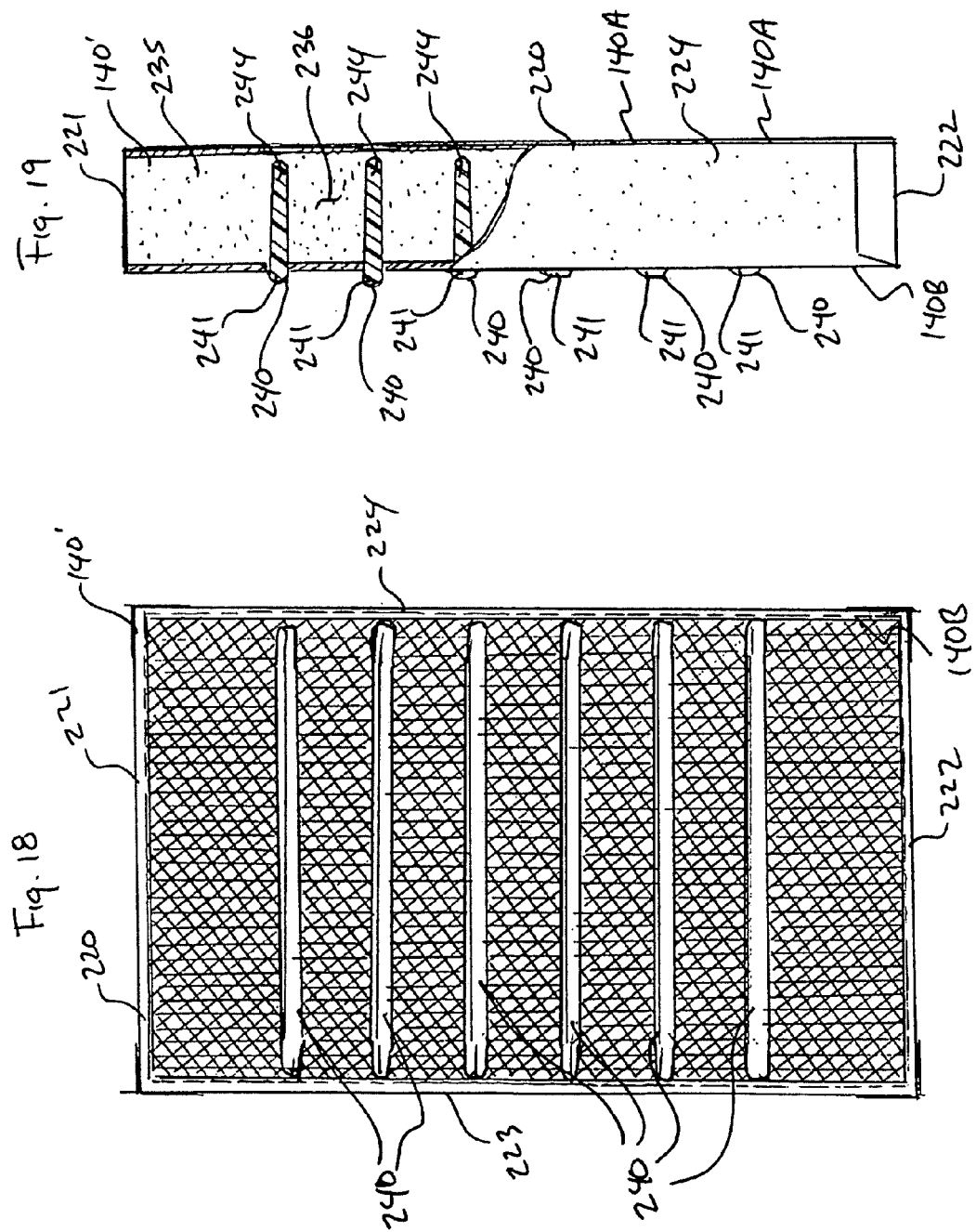

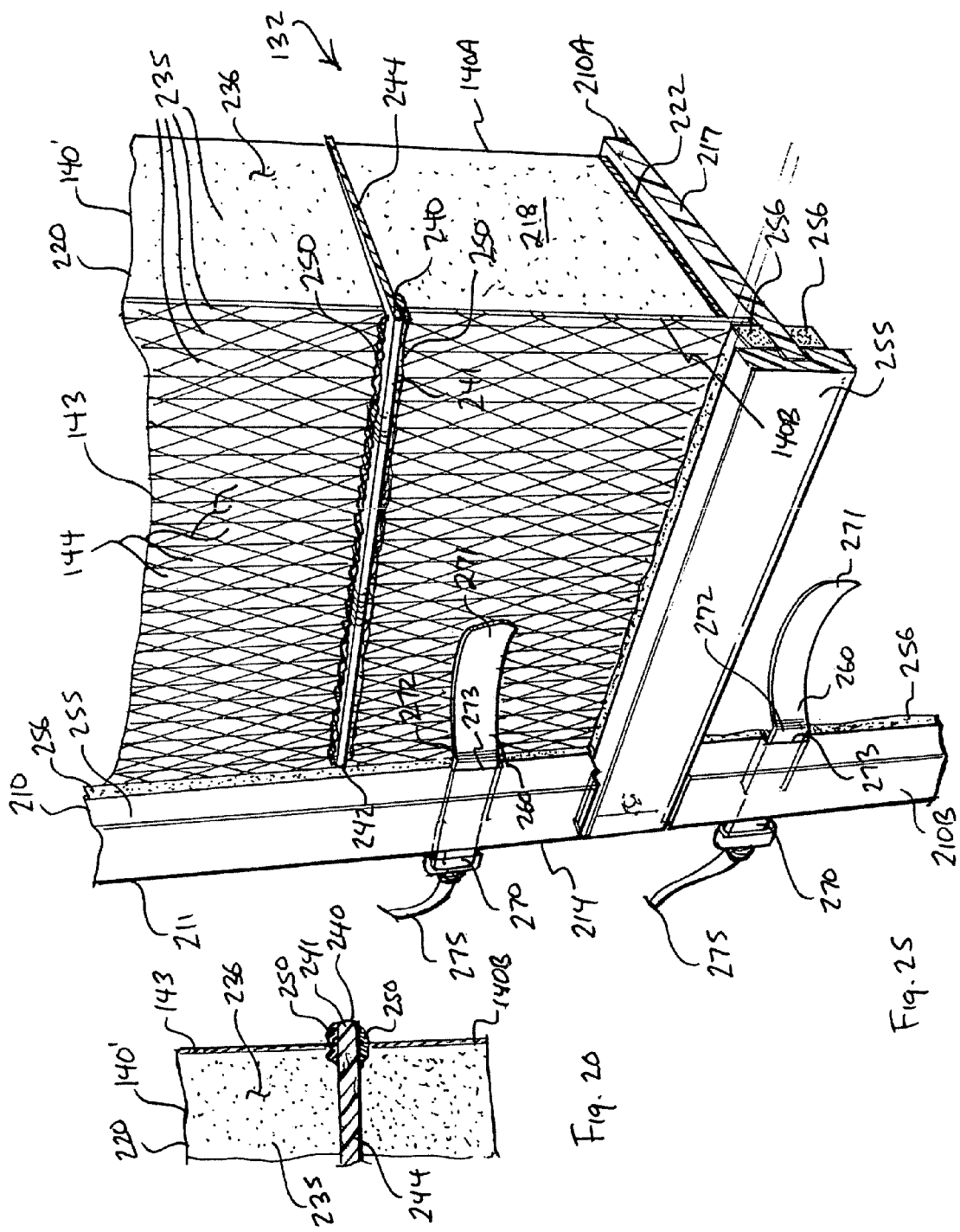

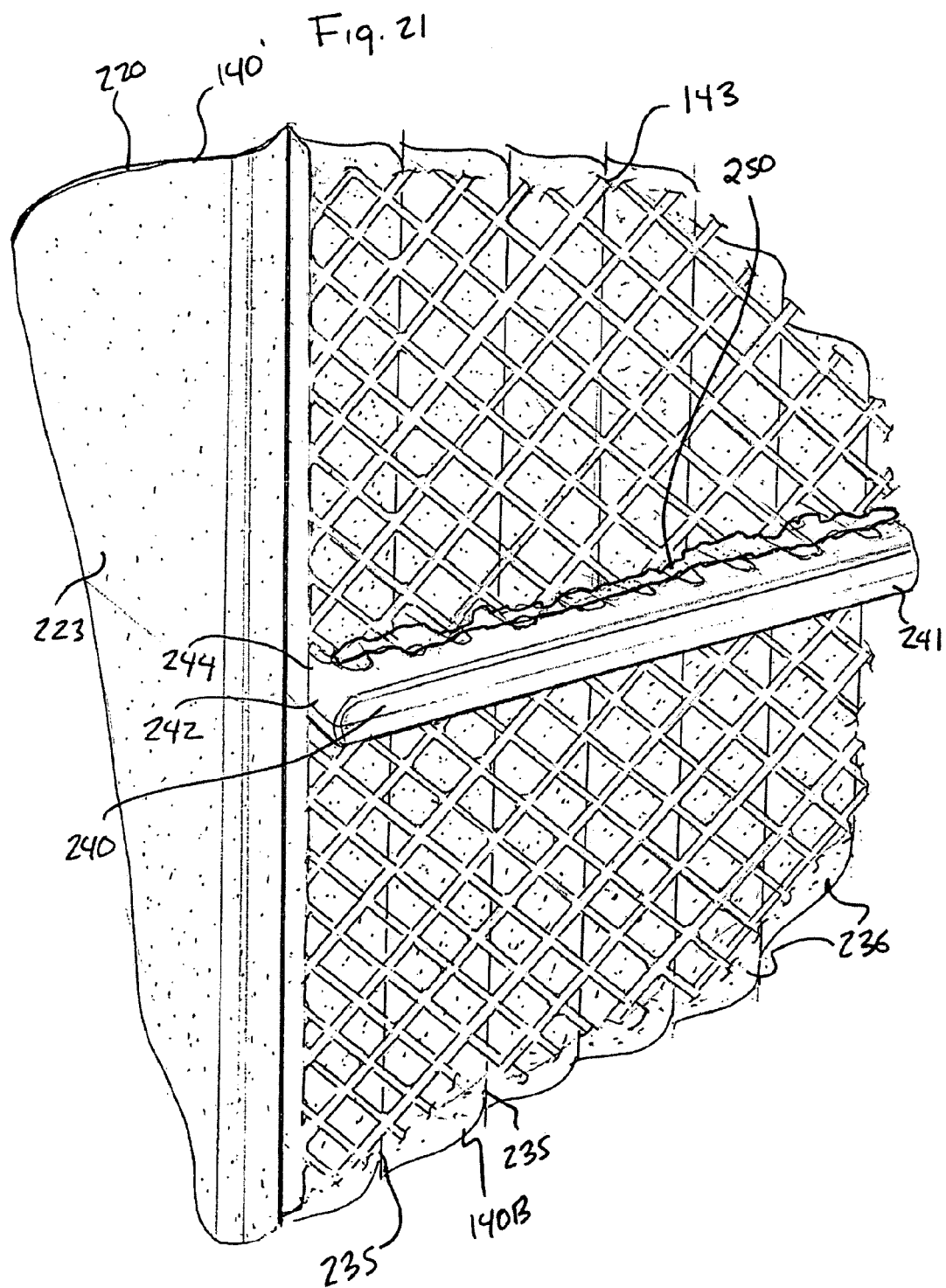

AIR CONDITIONING SYSTEM WITH MODULAR ELECTRICALLY STIMULATED AIR FILTER APPARATUS

This application is a division of application Ser. No. 12/049,095, filed on Mar. 14, 2008, now U.S. Pat. No. 7,608,135, which is a division of application Ser. No. 11/828,245, filed on Jul. 25, 2007, now U.S. Pat. No. 7,531,028.

FIELD OF THE INVENTION

The present invention relates to air conditioning systems and, more particularly, to air conditioning systems incorporating electrically stimulated air filter apparatus, and to a method for retrofitting an air conditioning system with electrically stimulated air filter apparatus.

BACKGROUND OF THE INVENTION

Airborne particles can be removed from a polluted air stream by a variety of physical processes. Common types of equipment for collecting fine particulates include, for example, cyclones, scrubbers, electrostatic precipitators, and baghouse filters.

Most air-pollution control projects are unique. Accordingly, the type of particle collection device, or combination of devices, to be employed normally must be carefully chosen in each implementation on a case-by-case basis. Important particulate characteristics that influence the selection of collection devices include corrosivity, reactivity, shape, density, and size and size distribution including the range of different particle sizes in the air stream. Other design factors include air stream characteristics (e.g., pressure, temperature, and viscosity), flow rate, removal efficiency requirements, and allowable resistance to airflow. In general, cyclone collectors are often used to control industrial dust emissions and as precleaners for other collection devices. Wet scrubbers are usually applied in the control of flammable or explosive dusts or mists from such sources as industrial and chemical processing facilities and hazardous-waste incinerators; they can handle hot air streams and sticky particles. Large scale electrostatic precipitators or filtration devices and fabric-filter baghouses are often used at power plants.

Electrostatic precipitation or filtration, which are interchangeable terms, is a commonly used method for removing fine particulates from air streams. In an electrostatic precipitator, an electric charge is imparted to particles suspended in an air stream, which are then removed by the influence of an electric field. A typical precipitation unit or device includes baffles for distributing airflow, discharge and collection electrodes, a dust clean-out system, and collection hoppers. A high DC voltage, often as much as 100,000 volts in large scale applications, is applied to the discharge electrodes to charge the particles, which then are attracted to oppositely charged collection electrodes on which they become trapped.

In a typical large-scale electrostatic precipitator the collection electrodes consists of a group of large rectangular metal plates suspended vertically and parallel to each other inside a boxlike structure. There are often hundreds of plates having a combined surface area of tens of thousands of square meters. Rows of discharge electrode wires hang between the collection plates. The wires are given a negative electric charge, whereas the plates are grounded and thus become positively charged.

Particles that stick to the collection plates are removed periodically when the plates are shaken, or "rapped." Rapping is a mechanical technique for separating the trapped particles from the plates, which typically become covered with a 6-mm (0.2-inch) layer of dust. Rappers are either of the impulse (single-blow) or vibrating type. The dislodged particles are collected in a hopper at the bottom of the unit and removed for disposal. An electrostatic precipitator can remove exceptionally small particulates on the order of 1 micrometer (0.00004 inch) with an efficiency exceeding 99 percent. The effectiveness of electrostatic precipitators in removing fly ash from the combustion gases of fossil-fuel furnaces accounts for their high frequency of use at power stations.

Large-scale electrostatic precipitators are expensive, difficult to build, and quite large. However, electrostatic filtration is exceedingly efficient and highly reliable. As a result, skilled artisans have devoted considerable effort and resources toward the development of small-scale electrostatic precipitators or air filtration devices specifically adapted for small scale applications, such as for filtering breathing. Although considerable attention has been directed toward the development of small-scale and portable electrostatic filtration devices utilized principally to filter breathing air, existing implementations are difficult to construct, expensive, must be constructed to strict and often unattainable tolerances, cannot be tuned or calibrated as needed to meet specific and/or changing environmental conditions or air filtering requirements, and are not suitable for use in large-scale applications, such as in conjunction with large-scale air conditioning systems utilized in large building establishments, such as casinos, office buildings, hospitals, and schools. Given these and other deficiencies in the art of electrostatic air filters, the need for continued improvement is evident.

SUMMARY OF THE INVENTION

According to the invention, an air conditioning system includes a housing, an air flow pathway extending through the housing from an inlet to an outlet, and air conditioning apparatus disposed in the airflow pathway between the inlet and the outlet conditioning an air stream passing through the air flow pathway from the inlet to the outlet. A first framework is mounted in the airflow pathway between the conditioning air apparatus and the inlet, and a second framework is mounted in the airflow pathway between the first framework and the inlet. The first framework carries filters each for entrapping contaminants in the air stream upstream of the conditioning air apparatus. The filters cooperate forming an upstream face facing the second framework and an opposed downstream face facing the conditioning air apparatus. Downstream electrodes are disposed in the air flow pathway between the air conditioning apparatus and the filters. Each downstream electrode is affixed to and contacts one of the filters. Electrical contacts mounted to the first framework electrically interconnect the downstream electrodes, according to the principle of the invention. An ionizer electrode is carried by the first framework in the air flow pathway between the inlet and the upstream face formed by the filters, and an upstream electrode is carried by the first framework in the air flow pathway between the inlet and the ionizer electrode. A first potential applied to the ionizer electrode imparts through induction a) a second potential to the upstream electrode forming a first ionizing field between the upstream electrode and the ionizer electrode, and b) a third potential to the downstream electrodes. The electrical contacts electrically interconnecting the downstream electrodes substantially uniformly disperse the third potential across the downstream electrodes forming a substantially uniform second ionizing field between the downstream electrodes and the ionizer electrode. The filters each have a front face and a rear face. The front faces cooperate to form the upstream face of the filters and the rear faces cooperating forming the downstream face of the filters. An abutment mounted to the first framework acts on the front faces of the filters thereby urging the downstream electrodes against the electrical contacts. The abutment consists of an elongate rod mounted to the first framework. Slots are formed in the first framework, and the elongate rod is received in, and held by, the slots. In a particular embodiment, the elongate rod has opposed first and second ends and a length extending between the first and second ends acting on the front faces of the filters, and the elongate rod defining a longitudinal axis extending front the first end to the second end. Structure is provided between the elongate rod and the first framework preventing movement of the elongate rod relative to the first framework along the longitudinal axis of the elongate rod. The structure interacting between the elongate rod and the first framework includes stops interacting between the elongate rod and the first framework. The stops are preferably carried by the elongate rod and, in particular, one of the stops by the first end of the elongate rod and another of the stops by the second end of the elongate rod. The ionizer electrode includes an ionizing wire having a length and opposed first and second ends secured to the second framework, in which the length of the ionizing wire between the first and second ends is strung across the second framework forming a planar array of courses of the length of the ionizing wire parallel to the upstream electrode and the downstream electrodes. The length of the ionizing wire between the first and second ends is strung across pins affixed to the second framework. Tension is applied to the ionizing wire maintaining tension across each of the courses of the length of the ionizing wire. A tension spring coupled between one of the first and second ends of the ionizing wire and the second framework applies the tension to the ionizing wire. In another embodiment, the tension applied by the ionizing wire is provided by a first tension spring coupled between the first end of the ionizing wire and the second framework, and a second tension spring coupled between the second end of the ionizing wire and the second framework. The upstream electrode is electrically isolated inhibiting arcing from occurring at the upstream electrode, and the downstream electrodes are grounded. A resistor is coupled to the upstream electrode and is adjusted to obtain a predetermined value of the first potential. The filters each consists of a dielectric filter. In a preferred embodiment, opposed, spaced-apart supports are affixed to the housing, and the first and second frameworks are each mounted to, and supported between, the supports. Preferably, the first and second frameworks are each slidably received by the supports, and the second framework is slidably received by the supports. The supports each have opposed first and second ends and a length extending between the opposed ends and define a longitudinal axis extending from the first end to the second end, in which the first and second frameworks are slidably received by the supports in longitudinal directions along the longitudinal axes of the respective supports. Compartments are formed in the first framework, and the filters are each received in one of the compartments.

According to the invention, an air conditioning system includes a housing, an air flow pathway extending through the housing from an inlet to an outlet, and air conditioning apparatus disposed in the airflow pathway between the inlet and the outlet conditioning an air stream passing through the air flow pathway from the inlet to the outlet. First and second framework are mounted in the airflow pathway between the conditioning air apparatus and the inlet, and third and fourth frameworks mounted in the airflow pathway between the first and frameworks and the inlet. Filters are carried by the first and second frameworks each for entrapping contaminants in the air stream upstream of the conditioning air apparatus. The filters carried by the first and second frameworks cooperate to form an upstream face facing the second framework and an opposed downstream face facing the conditioning air apparatus. Downstream electrodes are disposed in the air flow pathway between the air conditioning apparatus. The downstream electrodes are each affixed to, and contact, one of the filters. First electrical contacts mounted to the first framework electrically interconnect the downstream electrodes of the filters carried by the first framework, and second electrical contacts mounted to the second framework electrically interconnect the downstream electrodes of the filters carried by the second framework. The first electrical contacts of the first framework are electrically connected to the second electrical contacts of the second framework. A first ionizer electrode is carried by the third framework in the air flow pathway between the inlet and the portion of the upstream face formed by the filters carried by the first framework, and a second ionizer electrode is carried by the fourth framework in the air flow pathway between the inlet and the portion of the upstream face formed by the filters carried by the second framework. The first ionizer electrode is electrically connected to the second ionizer electrode. A first upstream electrode is carried by the third framework in the air flow pathway between the inlet and the first ionizer electrode, and a second upstream electrode is carried by the fourth framework in the air flow pathway between the inlet and the second ionizer electrode. The first upstream electrode is electrically connected to the second upstream electrode. A first potential applied to the first and second ionizer electrodes imparts through induction a) a second potential to the first and second upstream electrodes, and b) a third potential to the downstream electrodes of the filters carried by the first and second frameworks. The electrical connection between the first and second ionizer electrodes substantially uniformly disperses the first potential across the first and second ionizer electrodes thereby forming a substantially uniform first ionizing field between the first and second upstream electrodes and the first and second ionizer electrodes. The first electrical contacts electrically connected to the second electrical contacts interconnecting the downstream electrodes of the filters carried by the first and second frameworks substantially uniformly disperse the third potential across the downstream electrodes forming a substantially uniform second ionizing field between the downstream electrodes of the filters of the first and second frameworks and the first and second ionizer electrodes. The filters carried by the first and second frameworks each have a front face and a rear face, the front faces cooperating to form the upstream face of the filters carried by the first and second frameworks. A first abutment mounted to the first framework acts on the front faces of the filters carried by the first framework thereby urging the downstream electrodes of the filters carried by the first framework against the first electrical contacts. A second abutment mounted to the second framework acts on the front faces of the filters carried by the second framework thereby urging the downstream electrodes of the filters carried by the second framework against the second electrical contacts. The first abutment consists of a first elongate rod mounted to the first framework, and the second abutment consists of a second elongate rod mounted to the second framework. First slots are formed in the first framework, second slots are formed in the second framework, the first elongate rod is received in, and held by, the first slots, and the second elongate rod is received in, and held by, the second slots. The first elongate rod has opposed first and second ends and a length extending between the first and second ends acting on the front faces of the filters carried by the first framework, the first elongate rod defining a first longitudinal axis extending front the first end to the second end. First structure interacting between the first elongate rod and the first framework prevents movement of the first elongate rod relative to the first framework along the first longitudinal axis of the first elongate rod. The first structure interacting between the first elongate rod and the first framework includes first stops interacting between the first elongate rod and the first framework. The first stops are carried by the first elongate rod and, in particular, by the first and second ends, respectively, of the first elongate rod. The second elongate rod has opposed third and fourth ends and a length extending between the third and fourth ends acting on the front faces of the filters carried by the second framework, the second elongate rod defining a second longitudinal axis extending front the third end to the fourth end. Second structure interacting between the second elongate rod and the second framework prevents movement of the second elongate rod relative to the second framework along the second longitudinal axis of the second elongate rod. The second structure interacting between the second elongate rod and the second framework comprise second stops interacting between the second elongate rod and the second framework. The second stops are carried by the second elongate rod and, in particular, by the third and fourth ends, respectively, of the second elongate rod. The first ionizer electrode includes a first ionizing wire having a first length and opposed first and second ends secured to the third framework, and the first length of the first ionizing wire between the first and second ends of the first ionizing wire strung across the third framework forming a first planar array of courses of the first length of the first ionizing wire parallel to the first upstream electrode and the downstream electrodes of the filters carried by the first framework. The second ionizer electrode consists of a second ionizing wire having a second length and opposed third and fourth ends secured to the fourth framework, and the second length of the second ionizing wire between the third and fourth ends of the second ionizing wire strung across the fourth framework forming a second planar array of courses of the second length of the second ionizing wire parallel to the second upstream electrode and the downstream electrodes of the filters carried by the second framework. The first length of the first ionizing wire between the first and second ends of the first ionizing wire is strung across first pins affixed to the third framework, and tension applied to the first ionizing wire maintains tension across each of the courses of the first length of the first ionizing wire. A tension spring coupled between one of the first and second ends of the first ionizing wire and the third framework applies the tension to the first ionizing wire. In another embodiment, the tension applied to the first ionizing wire is provided by a first tension spring coupled between the first end of the first ionizing wire and the third framework, and a second tension spring coupled between the second end of the first ionizing wire and the third framework. The second length of the second ionizing wire between the third and fourth ends of the second ionizing wire is strung across second pins affixed to the fourth framework, and tension applied to the second ionizing wire maintains tension across each of the courses of the second length of the second ionizing wire. A tension spring coupled between one of the third and fourth ends of the second ionizing wire and the fourth framework applies the tension to the second ionizing wire. In another embodiment, the tension applied to the second ionizing wire is provided by a first tension spring coupled between the third end of the second ionizing wire and the fourth framework, and a second tension spring coupled between the fourth end of the second ionizing wire and the fourth framework. The first and second upstream electrodes are together electrically isolated inhibiting arcing from occurring at the first and second upstream electrode. The downstream electrodes of the filters carried by the first and second frameworks are grounded. A resistor coupled to the first and second upstream electrodes is adjusted to obtain a predetermined value of the first potential. The filters each consist of a dielectric filter. Third electrical contacts interacting between the first and second frameworks electrically connect the first electrical contacts of the first framework to the second electrical contacts of the second framework, electrically connect the first ionizer electrode to the second ionizer electrode, and electrically connect the first upstream electrode to the second upstream electrode. Opposed, spaced-apart supports are affixed to the housing, and the first, second, third, and fourth frameworks each mounted to, and supported between, the supports. Preferably, the first, second, third, and fourth frameworks are each slidably received by the supports, preferably along the longitudinal axes of the respective supports. First compartments formed in the first framework, and the filters carried by the first framework are each received in one of the first compartments. Second compartments are formed in the second framework, and the filters carried by the second framework each received in one of the second compartments.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings:

FIG. 14 is an enlarged fragmented perspective view of one of the ionizer assemblies of FIG. 6 illustrating an electrical contact or plug operatively coupled to supply wires for imparting a potential across the ionizing wires;

FIG. 15 is a rear perspective view of a filter used in conjunction with the electrically stimulated air filter apparatus of FIG. 6, the filter including an electrode affixed to, and contacting, a broad pleated body having a shape and a plurality of applied support members extending through the electrode into the broad pleated body for maintaining the shape of the broad pleated body, in which one of the support members shown detached for illustrative purposes;

FIG. 16 is a front elevational view of the filter of FIG. 15;

FIG. 17 is a side elevational view of the filter of FIG. 15;

FIG. 18 is a rear elevational view of the filter of FIG. 15;

FIG. 19 is a side elevational view of the filter of FIG. 15 with portions thereof shown in vertical cross section for illustrative purposes;

FIG. 20 is a sectional view taken along line 20-20 of FIG. 15;

FIG. 21 is an enlarged fragmented perspective view of the filter of FIG. 15 illustrating one of the support members extending into the broad pleated body through the electrode;

FIG. 25 is an enlarged rear perspective view of the filter of FIG. 23 shown received by the framework of the one of the filter assemblies and an electrical contact carried by the framework electrically contacting the electrode carried by the filter;

DETAILED DESCRIPTION OF PREFERRED EMBODIMENTS

Figure 1:
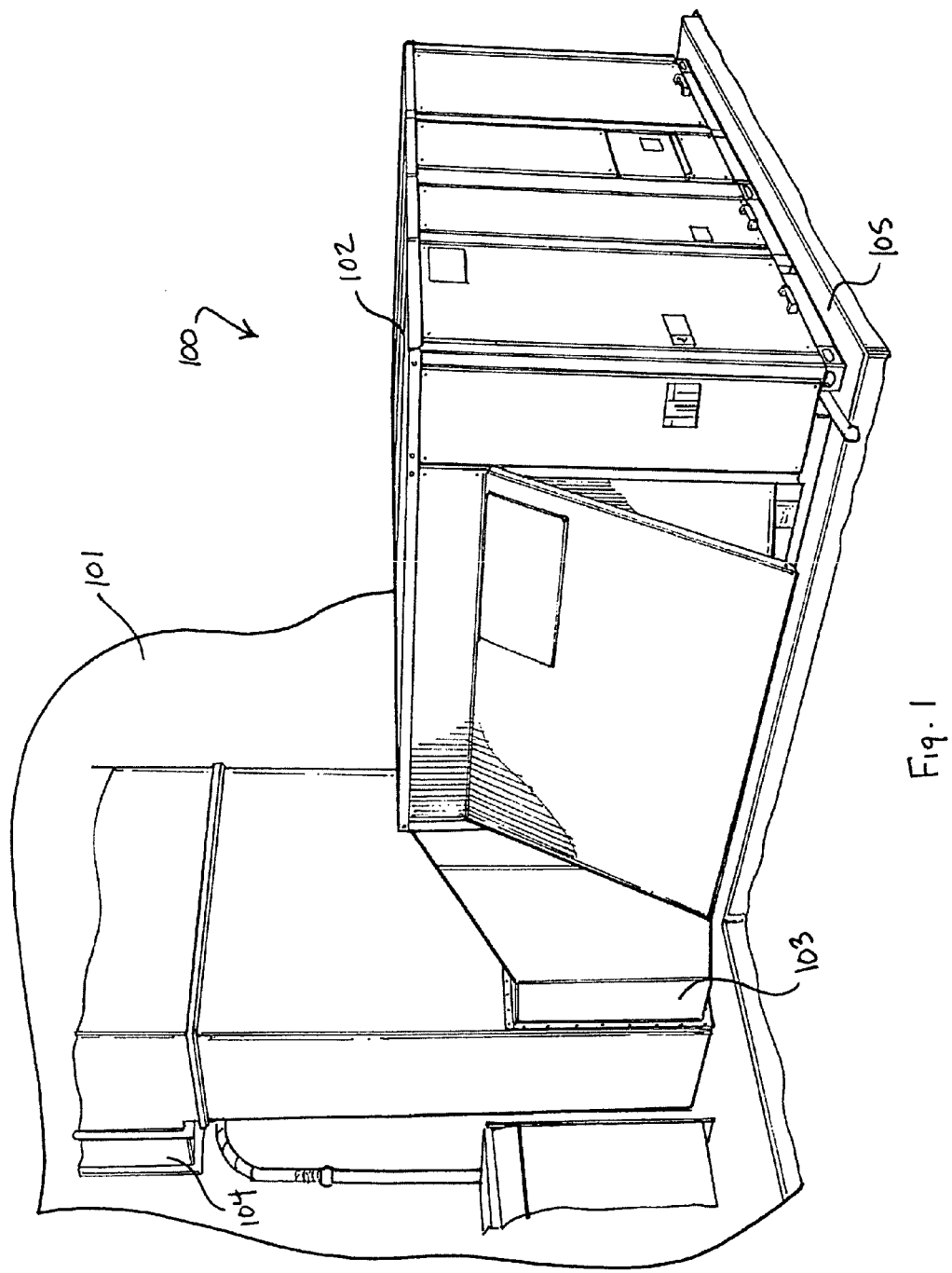
FIG. 1 is a perspective view of a prior art air conditioning system mounted adjacent to a building for providing the interior of the building with conditioning air.

Turning now to the drawings, in which like reference characters indicate corresponding elements throughout the several views, attention is first directed to FIG. 1 in which there is seen a prior art air conditioning system 100 mounted adjacent to a building 101 for providing the interior of building 101 with conditioning air. Air conditioning system 100 illustrated in FIG. 1 is a conventional large-scale air conditioning system on the order of approximately 20-tons, and includes a housing 102 bounding an air flow pathway extending therethrough and which is coupled to receive intake air from inlet 103 and coupled to expel outtake air through outlet 104. An air conditioning apparatus is disposed in the air flow pathway defined by housing 102 between inlet 103 and outlet 104 conditioning, i.e., temperature control, namely, heating or cooling, an air stream passing through the air flow pathway from inlet 103 to outlet 104. Inlet 103 is coupled to receive intake air from building 101 and direct the intake air into the air flow pathway through housing 102, and outlet 104 is coupled to receive conditioned air from the air flow pathway through housing 102 and expel the conditioned air into the interior of building 101. As a matter of an example of a typical installation, air conditioning system 100 is mounted atop a supporting concrete pad 105 formed exteriorly of building 101.

Figure 2:
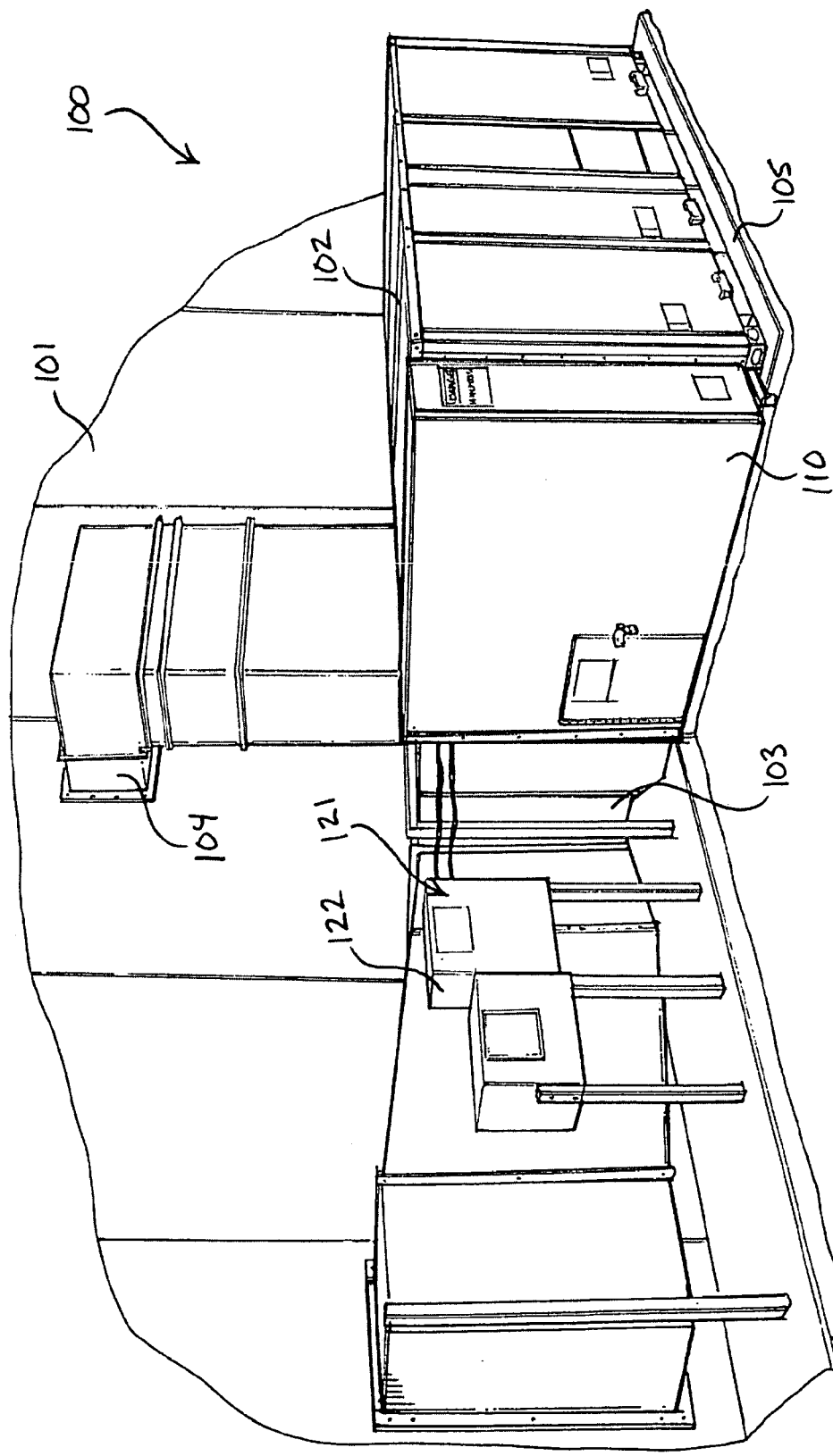
FIG. 2 is the air conditioning system illustrated in FIG. 1 shown as it would appear outfitted with an electrically stimulated air filter apparatus constructed and arranged in accordance with the principle of the invention forming an enhanced air conditioning system for producing clean, conditioned air.

According to the principle of the invention, FIG. 2 is a perspective view of the air conditioning system 100 of FIG. 1 shown as it would appear configured with an electrically stimulated air filter apparatus constructed and arranged in accordance with the principle of the invention, which, in FIG. 2, is enclosed by a specialized cover 110 attached to housing 102, and which actually forms part of housing 102 defining the air flow pathway through housing 102. In FIG. 2, air conditioning system 100 is the existing system shown in FIG. 1 illustrated as it would appear after retrofitting with the electrically stimulated air filter apparatus forming an enhanced air conditioning system for producing clean, conditioned air. The electrically stimulated air filter apparatus is disposed in the air flow pathway formed through housing 102 between inlet 103 and the conditioning air apparatus disposed in housing 102, and is operative for entrapping contaminants in the air stream passing through the air flow pathway formed in housing 102. The electrically stimulated air filter apparatus entraps and removes contaminants from the air stream upstream of the air conditioning apparatus between the air conditioning apparatus and inlet 103. Consistent with the teachings set forth in this specification, an air conditioning system incorporating the electrically stimulated air filter apparatus constructed and arranged in accordance with the principle of the invention may be provided as an original installation.

Figure 3:
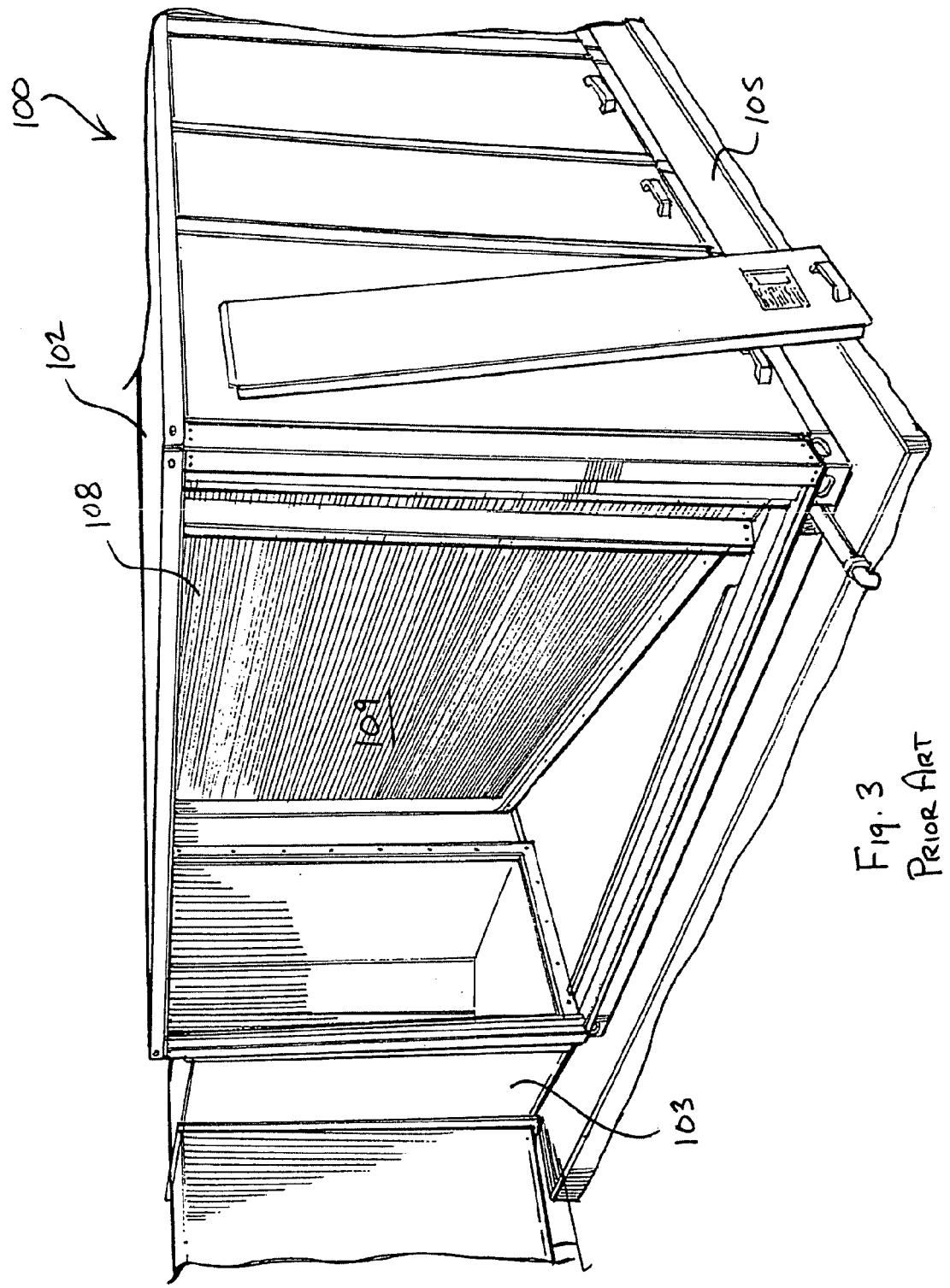
FIG. 3 is an enlarged fragmented perspective view of the prior art air conditioning system of FIG. 1 with a portion of a housing of the air conditioning system shown removed illustrating an air conditioning apparatus disposed in an air flow pathway extending through the housing.
Figure 4:
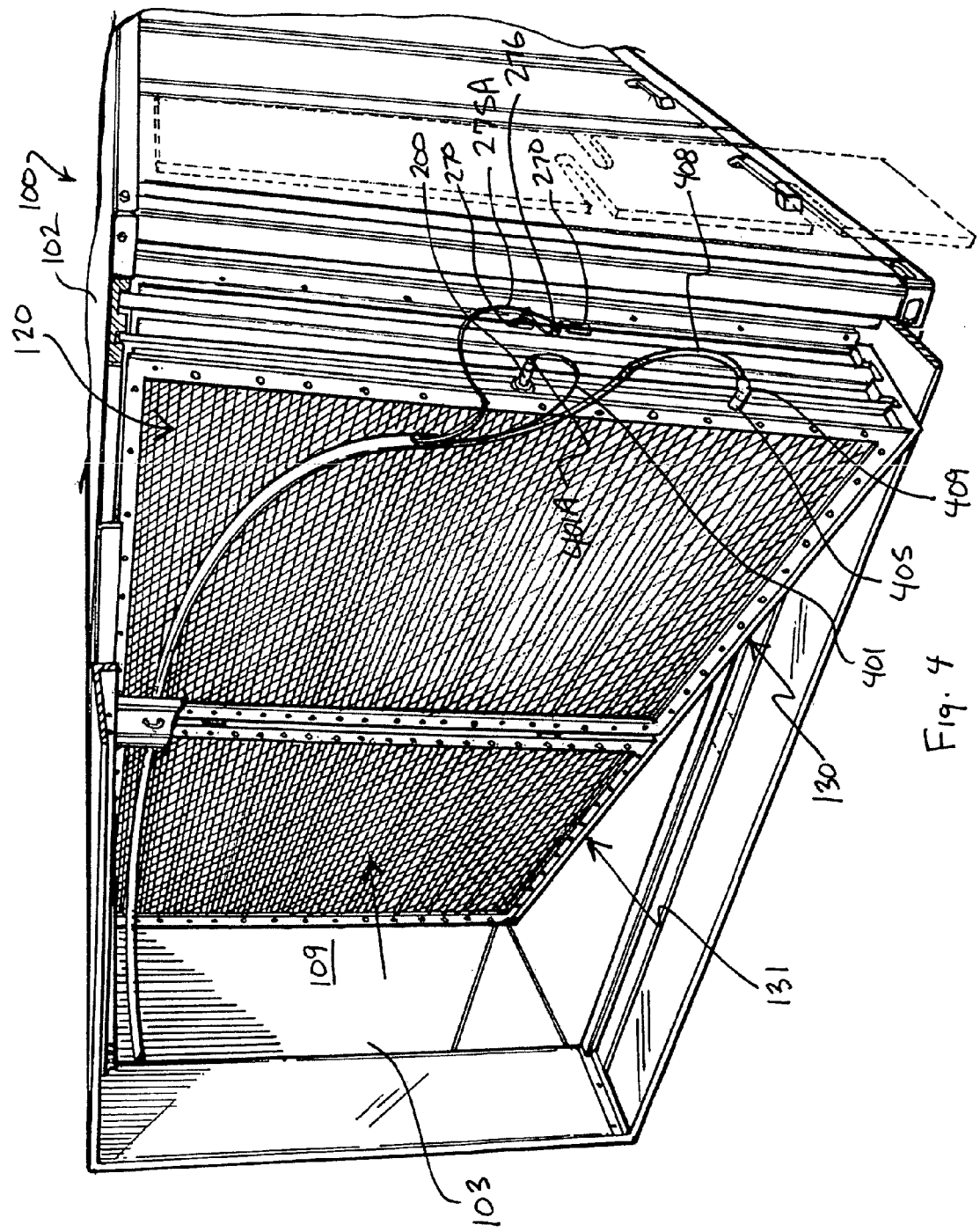
FIG. 4 is a view very similar to the view of FIG. 3 illustrating an electrically stimulated air filter apparatus installed in the air flow pathway upstream of the air conditioning apparatus, the electrically stimulated air filter apparatus constructed and arranged in accordance with the principle of the invention.
Figure 5:
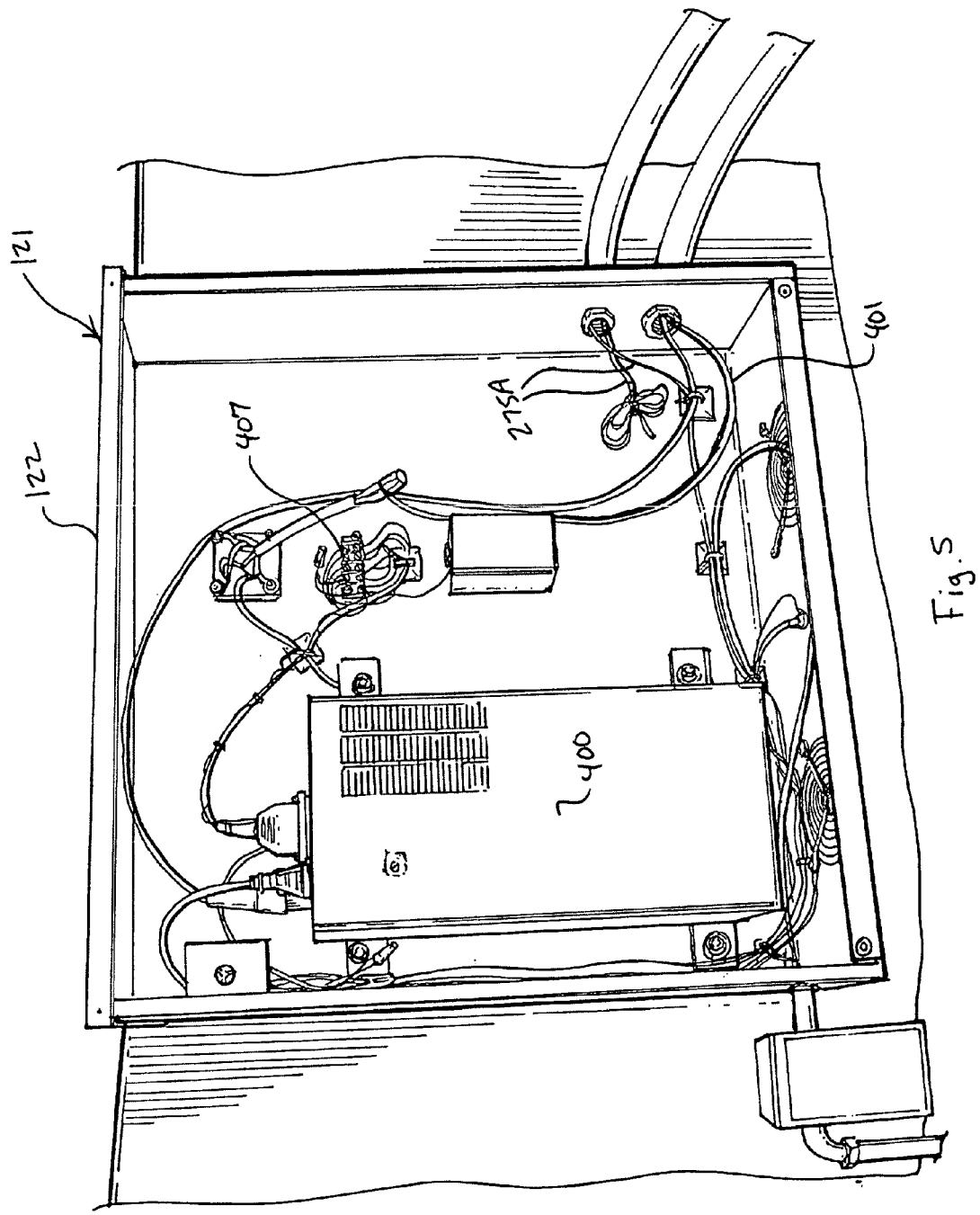
FIG. 5 is a control system for controlling the operation of the electrically stimulated air filter apparatus of FIG. 4.

As a matter of illustration and reference, FIG. 3 is an enlarged fragmented perspective view of the prior art air conditioning system of FIG. 1 with a portion of housing 102 illustrating air conditioning apparatus 108 disposed in air flow pathway 109 extending through housing 102. FIG. 4 is a view very similar to the view of FIG. 3 illustrating an electrically stimulated air filter apparatus 120, constructed and arranged in accordance with the principle of the invention, installed in air flow pathway 109 upstream of air conditioning apparatus 108 between inlet 103 and air conditioning apparatus 108. Air conditioning apparatus 108 is not illustrated in FIG. 4 because it is concealed from view by filter apparatus 120. Filter apparatus 120 is a modular system. In operation, filter apparatus 120 entraps and removes contaminants from the air stream A passing through air flow pathway 109 to air conditioning apparatus 108 from inlet 103, and does so between air conditioning apparatus 108 and inlet 103. Filter apparatus 120 shown in FIG. 4 is operatively coupled to a control system 121 illustrated in FIG. 2, which is provided, configured, and designed to control the operation of filter apparatus 120, further details of which will be discussed later in this specification. As a matter of illustration, FIG. 5 is an enlarged perspective view of control system 121 shown with a cover of a housing 122 thereof removed showing the components of control system 121.

Filter apparatus 120 is modular. Referencing FIG. 6 there is seen an exploded perspective view of filter apparatus 120, constructed and arranged in accordance with the principle of the invention, including ionizer assemblies 130 and 131, filter assemblies 132 and 133, and supports 134 and 135 for securing ionizer assemblies 130 and 131 and filter assemblies 132 and 133 for installation in air flow pathway 109 upstream of air conditioning apparatus 108 as illustrated in FIG. 4. Ionizer assemblies 130 and 131 and filter assemblies 132 and 133 cooperate to form filter apparatus 120. Supports 134 and 135 are utilized to mount ionizer assemblies 130 and 131 and filter assemblies 132 and 133 in place relative to each other and to air flow pathway 109, in accordance with the principle of the invention.

Figure 7:
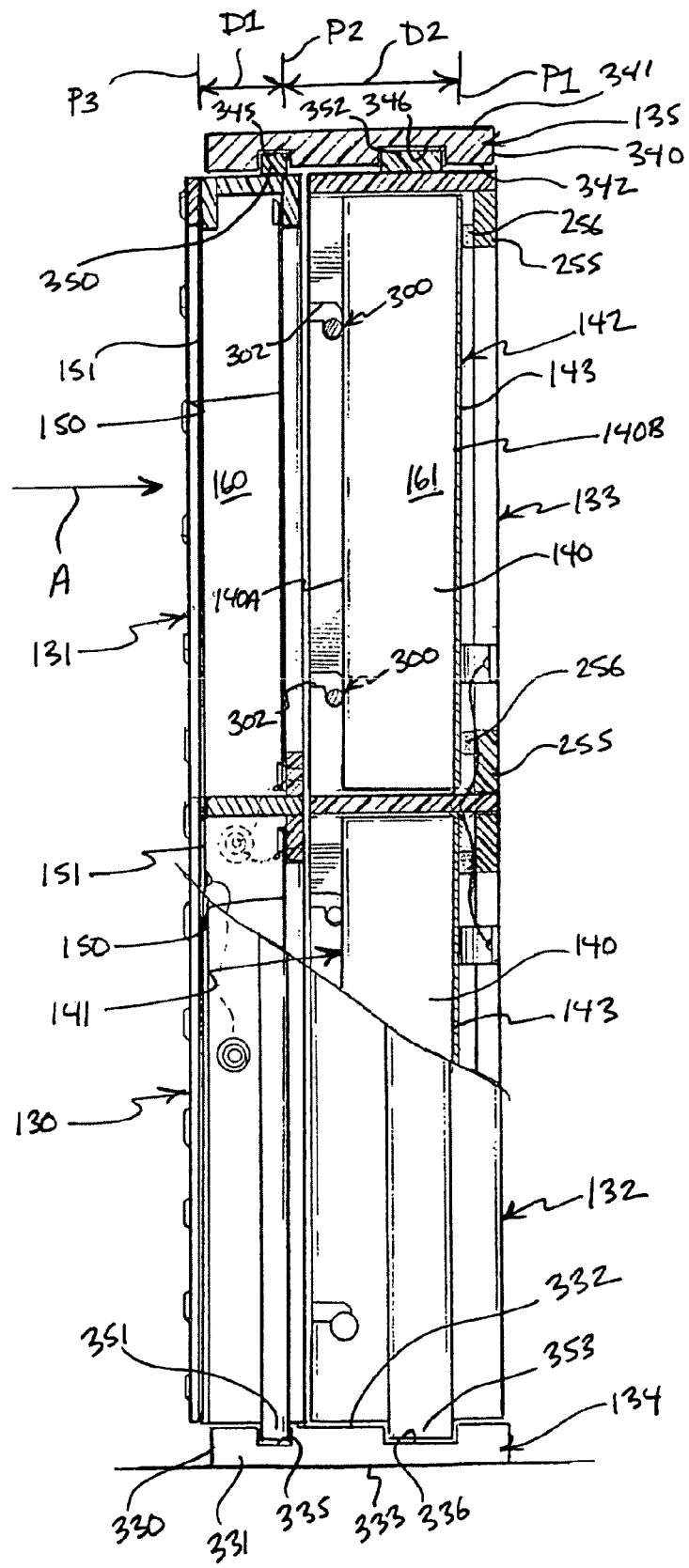
FIG. 7 a side elevational view of the electrically stimulated air filter apparatus of FIG. 6 shown assembled, with portions thereof shown in vertical cross section for illustrative purposes.
Figure 8:
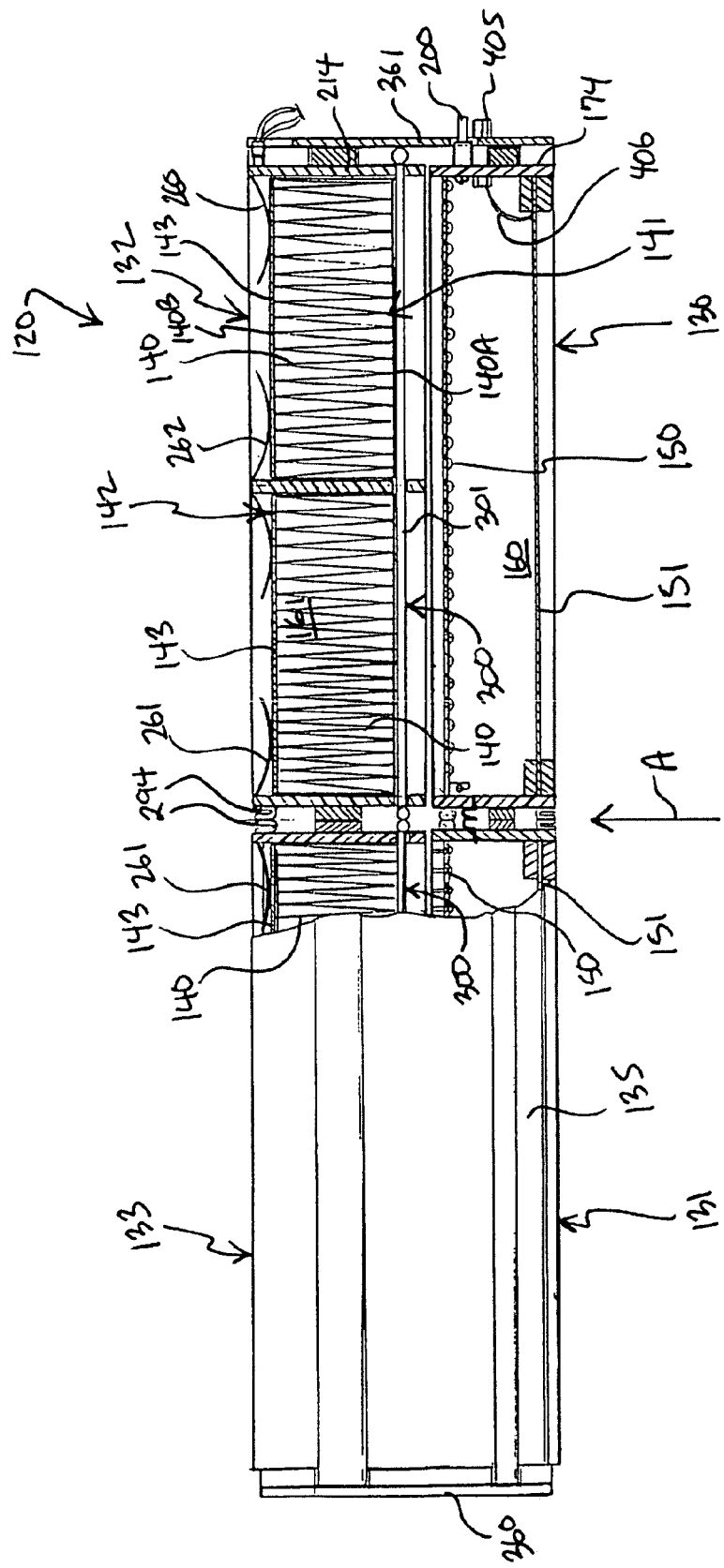
FIG. 8 is a top plan view of the electrically stimulated air filter apparatus of FIG. 7, with portions thereof shown in horizontal cross section for illustrative purposes.

FIGS. 7 and 8 illustrate filter apparatus 120 apparatus assembled, and a discussion of filter apparatus 120 assembled and operational will be discussed in detail, which will be followed by a detailed discussion of the various components of filter apparatus 120. FIG. 7 is a side elevational view of filter apparatus 120 shown assembled with portions thereof shown in vertical cross section for illustrative purposes, and FIG. 8 is a top plan view of filter apparatus 120, with portions thereof shown in horizontal cross section for illustrative purposes. An air stream denoted by the arrowed line A is denoted for orientation and reference in FIGS. 7 and 8. Air stream A through air flow pathway 109 is, of course, also denoted in FIG. 4 for orientation and reference.

Figure 9:
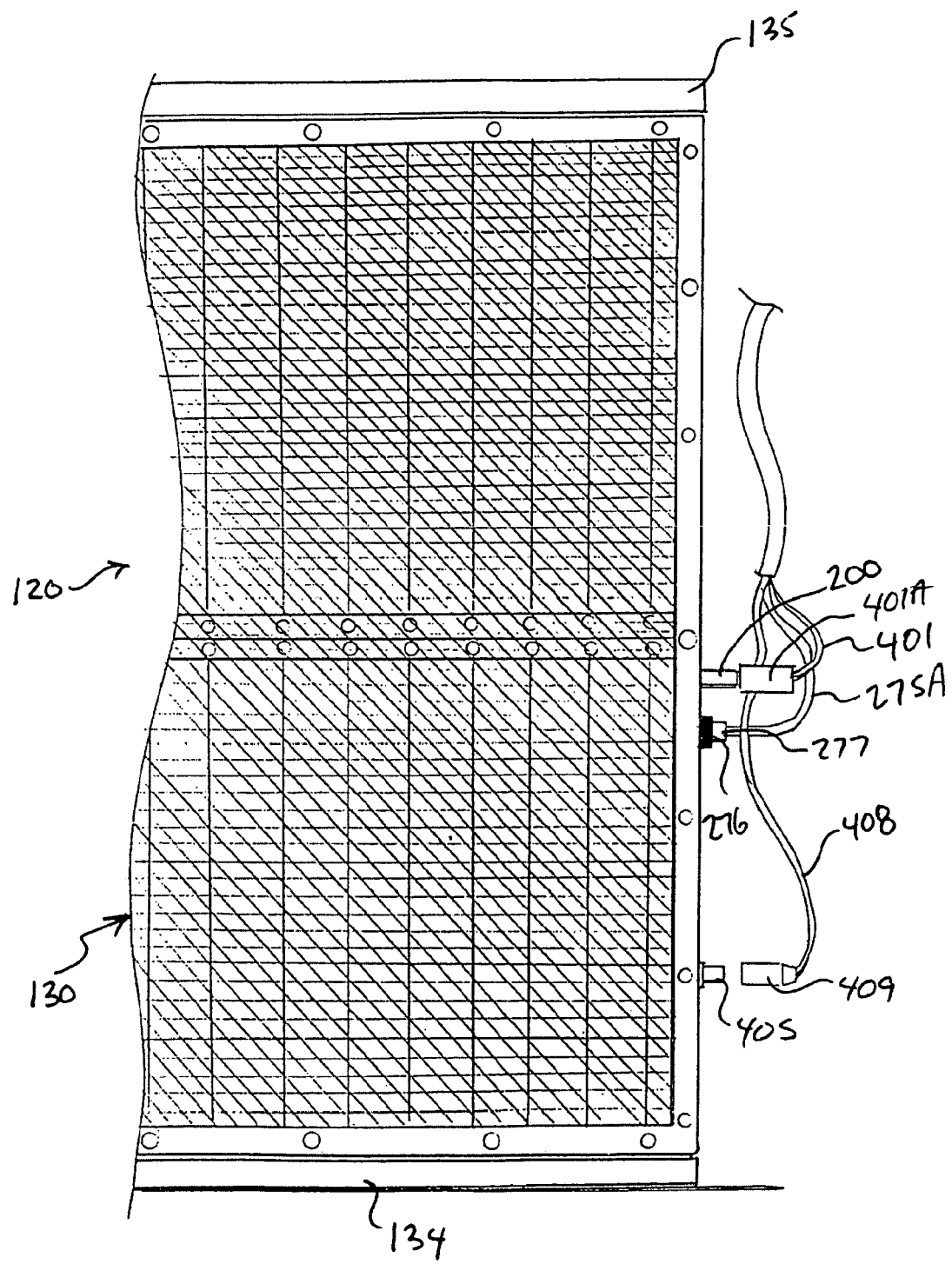
FIG. 9 is a fragmented front elevational view of the electrically stimulated air filter apparatus of FIG. 7.
Figure 10:
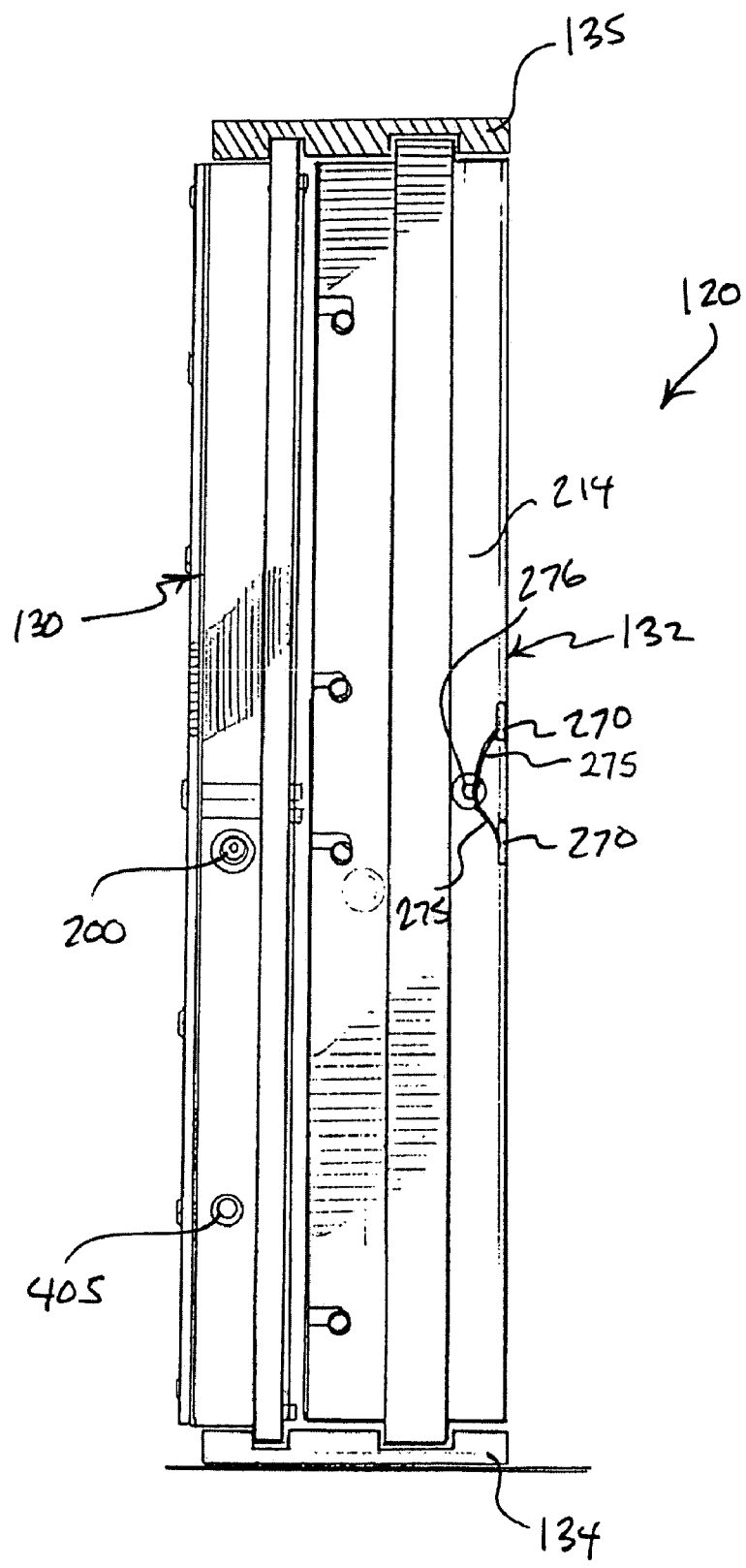
FIG. 10 is a side elevational of the electrically stimulated air filter apparatus of FIG. 7.
Figure 11:
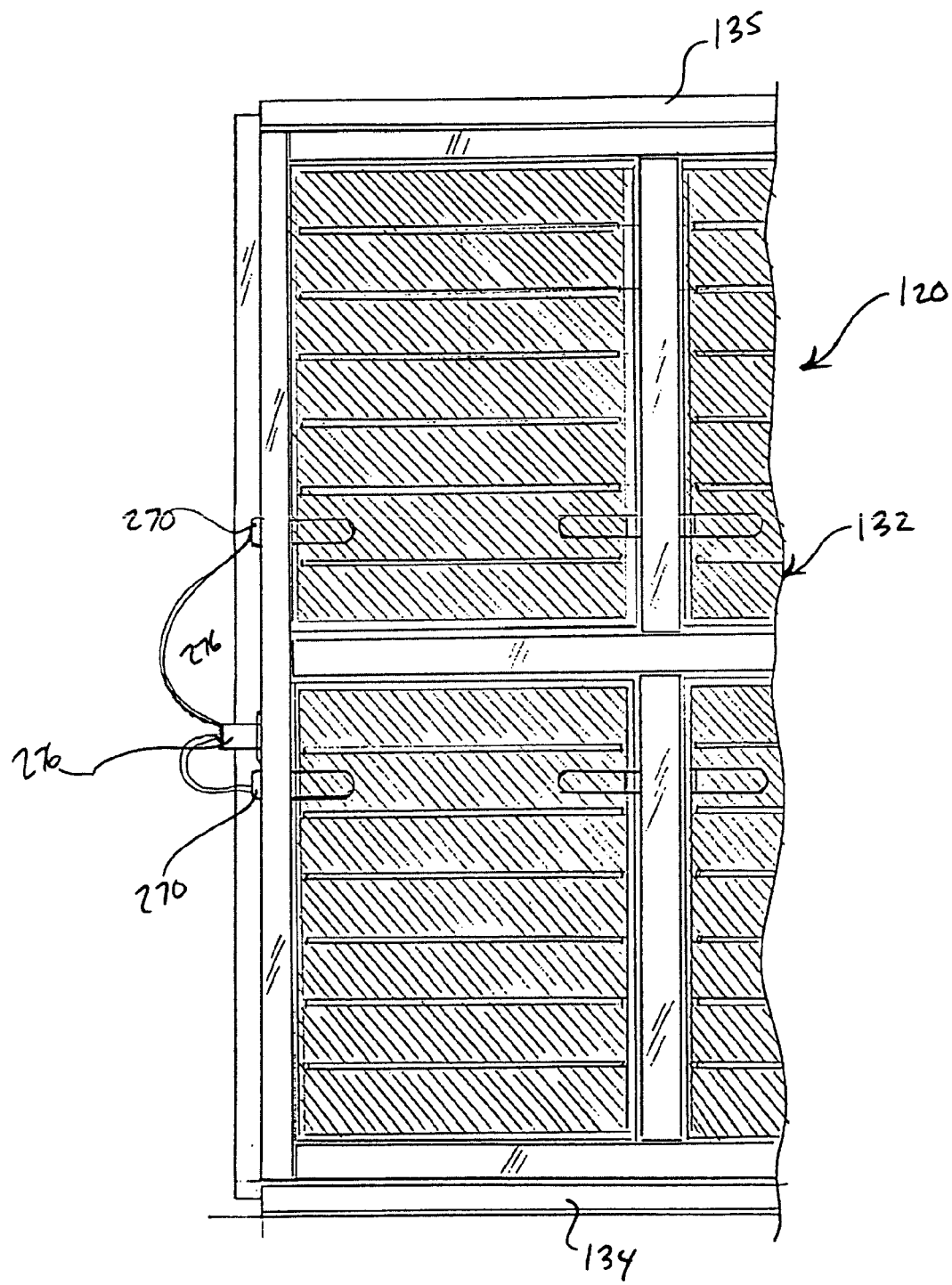
FIG. 11 is a fragmented rear elevational view of the electrically stimulated air filter apparatus of FIG. 7.

Referencing FIGS. 7 and 8 in relevant part, ionizer assemblies 130 and 131 are mounted side-by-side relative to air stream A, and filter assemblies 132 and 133 are mounted side-by-side relative to air stream A opposing and downstream of ionizer assemblies 130 and 131. Ionizer assembly 130 is operatively coupled to ionizer assembly 131, and filter assembly 132 is operatively coupled to filter assembly 133. Ionizer assemblies 130 and 131 are mounted in air stream A upstream of filter assemblies 132 and 133. Ionizer assemblies 130 and 131 extend upright and together reside in a common vertical plane, and filter assemblies 132 and 133 are upright and together reside in a common vertical plane opposing and parallel to the common vertical plane in which ionizer assemblies 130 and 131 reside. The vertical planes defined by ionizer assemblies 130 and 131, and filter assemblies 132 and 133 are substantially perpendicular relative to oncoming air stream A which flows first through ionizer assemblies 130 and 131 and then through filter assemblies 132 and 133. As a matter of illustration and reference, FIG. 9 is a fragmented front elevational view of filter apparatus illustrating ionizer assembly 131 received by and supported between supports 134 and 135, FIG. 10 is a side elevational of filter apparatus 120 illustrating ionizer assembly 130 and filter assembly 132 received by and supported between supports 134 and 135, and FIG. 11 is a fragmented rear elevational view of filter apparatus 120 illustrating filter assembly 132 received by and supported between supports 134 and 135.

Filter assemblies 132 and 133 support filters 140 each for entrapping contaminants in the air stream A. Filters 140 are supported in a common vertical plane, are each substantially equally sized and identical in structure, and cooperate forming an upstream face of filters 140 denoted generally at 141 facing ionizer assemblies 130 and 131, and an opposed parallel downstream face of filters 140 denoted generally at 142 facing away from ionizer assemblies 130 and 131. Filters 140 each carry a downstream electrode 143. Downstream electrodes 143 are disposed along downstream face 142 of filters 140 in air stream A, and together reside in a common vertical plane denoted in FIG. 7 at P1. Downstream electrodes 143 are each affixed to and contact one of filters 140, further details of which will be described in detail later in this specification. Downstream electrodes 143 of filters 140 of filter assembly 132 are electrically connected, downstream electrodes 143 of filters 140 of filter assembly 133 are electrically connected, and downstream electrodes 143 of filters 140 of filter assembly 132 are electrically connected to downstream electrodes 143 of filters 140 of filter assembly 133, according to the principle of the invention.

Ionizer assemblies 130 and 131 each support ionizer electrodes 150, and an upstream electrode 151. Ionizer electrodes 150 are supported in a common vertical plane denoted at P2 in FIG. 2 in air stream A upstream of, and parallel to, upstream face 141 of filters 140 and plane P1 defined by downstream electrodes 143. Ionizer electrodes 150 are substantially equally sized and identical in structure, the details of which will be discussed later in this specification. Ionizer electrodes 150 of ionizer assembly 130 are electrically connected, ionizer electrodes 150 of ionizer assembly 131 are electrically connected, and ionizer electrodes 150 of ionizer assembly 130 are electrically connected to ionizer electrodes 150 of ionizer assembly 131.

Upstream electrodes 151 are supported in a common vertical plane denoted at P3 in FIG. 7 in air stream A upstream of, and parallel to, ionizer electrodes 150. Plane P3 defined by upstream electrodes 151 is upstream of and parallel to plane P2 defined by ionizer electrodes 150, and is upstream of, and parallel to, plate P2 defined by downstream electrodes 143. Upstream electrodes 151 are substantially equally sized and identical in structure. Upstream electrode 151 of ionizer assembly 130 is electrically connected to upstream electrode 151 of ionizer assembly 131.

Ionizer electrodes 150 and 151 are electrically connected for carrying a potential. Upstream electrodes 151 are induced electrodes disposed in air stream A upstream of ionizer electrodes 150, and downstream electrodes 143 are induced electrodes disposed in air stream A downstream of ionizer electrodes 150. As previously mentioned in conjunction with FIG. 7, the vertical plane P3 defined by upstream electrodes 151 is parallel to the vertical plane P2 defined by ionizer electrodes 150 and the vertical plane P1 defined by downstream electrodes 143, whereby a gap or distance D1 separates plane P3 defined by upstream electrodes 151 and plane P2 defined by ionizer electrodes 150, and a gap or distance D2 separates plane P2 defined by ionizer electrodes 151 and plane P1 defined by downstream electrodes 143.

The potential carried by ionizer electrodes 150 of ionizer assemblies 130 and 131, which is supplied by a high voltage power supply, imparts through induction a potential to upstream electrodes 151 of ionizer assemblies 130 and 131 forming ionizing field 160 between upstream electrodes 151 and ionizer electrodes 150 in juxtaposition along upstream electrodes 151, and a potential to downstream electrodes 143 forming ionizing field 161 between downstream electrodes 143 and ionizer electrodes 150 in juxtaposition along downstream electrodes 143. The engagement of each downstream electrode 143 against a corresponding filter 140 imparts ionizing field 161 to filters 140 and maintains ionizing field 161 with filters 140, according to the principle of the invention.

The potential applied to ionizing electrodes 150 is substantially uniformly dispersed across ionizer electrodes 150 of ionizer assemblies 130 and 131 because ionizer electrodes 150 of ionizer assembly 130 are electrically connected, ionizer electrodes 150 of ionizer assembly 131 are electrically connected, and ionizer electrodes 150 of ionizer assemblies 130 and 131 are electrically connected, in accordance with the principle of the invention. Moreover, the induced potential formed in upstream electrodes 151 is also substantially uniformly dispersed across upstream electrodes 151 because upstream electrodes 151 of ionizer assemblies 130 and 131 are electrically connected, in accordance with the principle of the invention. Because the potential applied to ionizer electrodes 150 is substantially uniformly dispersed across ionizer electrodes 150 and because the induced potential across upstream electrodes 151 is also substantially uniformly dispersed across upstream electrodes 151, ionizing field 160 formed along upstream electrodes 151 between upstream electrodes 151 and ionizer electrodes 150 is, thereby, substantially uniform, in accordance with the principle of the invention.

The induced potential formed in downstream electrodes 143 is substantially uniformly dispersed across downstream electrodes 143 of filters 140 of filter assemblies 132 and 133 because downstream electrodes 143 of filter assembly 132 are electrically connected, downstream electrodes 143 of filter assembly 133 are electrically connected, and downstream electrodes 143 of filter assembly 132 are electrically connected to downstream electrodes 143 of filter assembly 133, in accordance with the principle of the invention. Because the potential applied to ionizer electrodes 150 is substantially uniformly dispersed across ionizer electrodes 150, as discussed above, and because the induced potential across downstream electrodes 143 is also substantially uniformly dispersed across downstream electrodes 143, ionizing field 161 formed along downstream electrodes 143 between downstream electrodes 143 and ionizer electrodes 150 is, thereby, substantially uniform, in accordance with the principle of the invention.

The potential across ionizer electrodes 150 is positive, and the potentials across upstream electrodes 151 and downstream electrodes 143 are each also positive but lesser in magnitude in comparison to the potential across ionizer electrodes 150. Because the positive potentials across upstream electrodes 151 and downstream electrodes 143 are each lesser in magnitude than the positive potential applied across ionizer electrodes 150, upstream electrodes 151 and downstream electrodes 143 are net negatively charged as compared to the potential across ionizer electrodes 150.

Through induction, positively charged electrons flow or otherwise migrate from ionizer electrodes 150 across distance D1 to upstream electrodes 151 and to downstream electrodes 143, thereby forming the induced potential in upstream electrodes 151 and the induced potential in downstream electrodes 143, according to the principle of the invention. As the positively charged electrons generated by ionizer electrodes 150 reach upstream electrodes 151 and induce the potential in upstream electrodes 151, ionizing field 160 is formed along upstream electrodes 151 between upstream electrodes 151 and ionizer electrodes 150. Ionizing field 160 is positive, but is lesser in magnitude in comparison to the potential across ionizer electrodes 150 and therefore has a net negative charge as compared to the potential across ionizer electrodes 150. As the positively charged electrons generated by ionizer electrodes 150 reach downstream electrodes 143 and induce the potential in downstream electrodes 143, ionizing field 161 is formed along downstream electrodes 143 between downstream electrodes 143 and ionizer electrodes 150. Ionizing field 161 is positive, but is lesser in magnitude in comparison to the potential across ionizer electrodes 150 and therefore has a net negative charge as compared to the potential across ionizer electrodes 150. According to the principle of the invention as previously indicated, the contact or engagement of each downstream electrode 143 against a corresponding filter 140 imparts and maintains ionizing field 161 in filters 140, thereby imparting or otherwise inducing a positive charge to filters 54, which is lesser in magnitude than the positive charge across ionizer electrode 55.

Air stream A passes through filter apparatus 120 in a direction from upstream electrodes 151 of ionizer assemblies 130 and 131 to downstream electrodes 143 of filter assemblies 132 and 133. As air stream A passes through filter apparatus 120, air stream A passes first through upstream electrodes 151 and then through ionizing field 160. As particles conveyed by air stream A, such as dust particles, mold particles, microbial particles, smoke particles, and other air-borne particles, encounter ionizing field 160, ionizing field 160 imparts or otherwise induces a potential or electric charge to the particles suspended in air stream A causing the particles to become attracted to each other forming clusters of the particles, which are then conveyed by air stream A downstream through ionizer electrodes 150 to filters 143, which entraps the clusters of particles thereby removing the clusters of particles from air stream A. The clusters of particles formed by the interaction of the particles with ionizing field 160 are positively charged. The positive charge to the clusters is imparted to the clusters by ionizing field 160, and is lesser in magnitude than the positive charge of ionizing field 161 applied across filters 140. Accordingly, as the clusters of particles reach filters 140, the net negative charge applied to the clusters as compared to the net positive charge applied across filters 140 by ionizing field 161 causes the clusters to be electrically attracted to filters 140 thereby producing an aggressive and comprehensive removal of the clusters of particles from air stream A by filters 140 and a highly efficient and effective filtration efficiency, according to the principle of the invention.

When particles pass through ionizing field 160, not only do the particles become attracted to one another to form clusters, a churning motion caused by the Van Der Walls Effect is imparted to the particles, which helps the particles impact one another and group together to form clusters of particles. The potential imparted to filters 140 by ionizing field 161 attracts and adheres the clusters of particles to filters 140, according to the principle of the invention.

The structural details of ionizer assemblies 130 and 131 and filter assemblies 132 and 133 forming filter apparatus 120 will now be discussed. Ionizer assemblies 130 and 131 will first be discussed, followed by a discussion of filter assemblies 132 and 133, in which the balance of the specification provides a discussion of the installation and operation of filter apparatus 120.

Ionizer assemblies 130 and 131 are substantially identical in size, structure, and function. Accordingly, only the structure of ionizer assembly 130 will be discussed in detail, with the understanding that the ensuing discussion of ionizer assembly 130 applies in every respect to ionizer assembly 131 with the exception of any noted differences.

Figure 12:
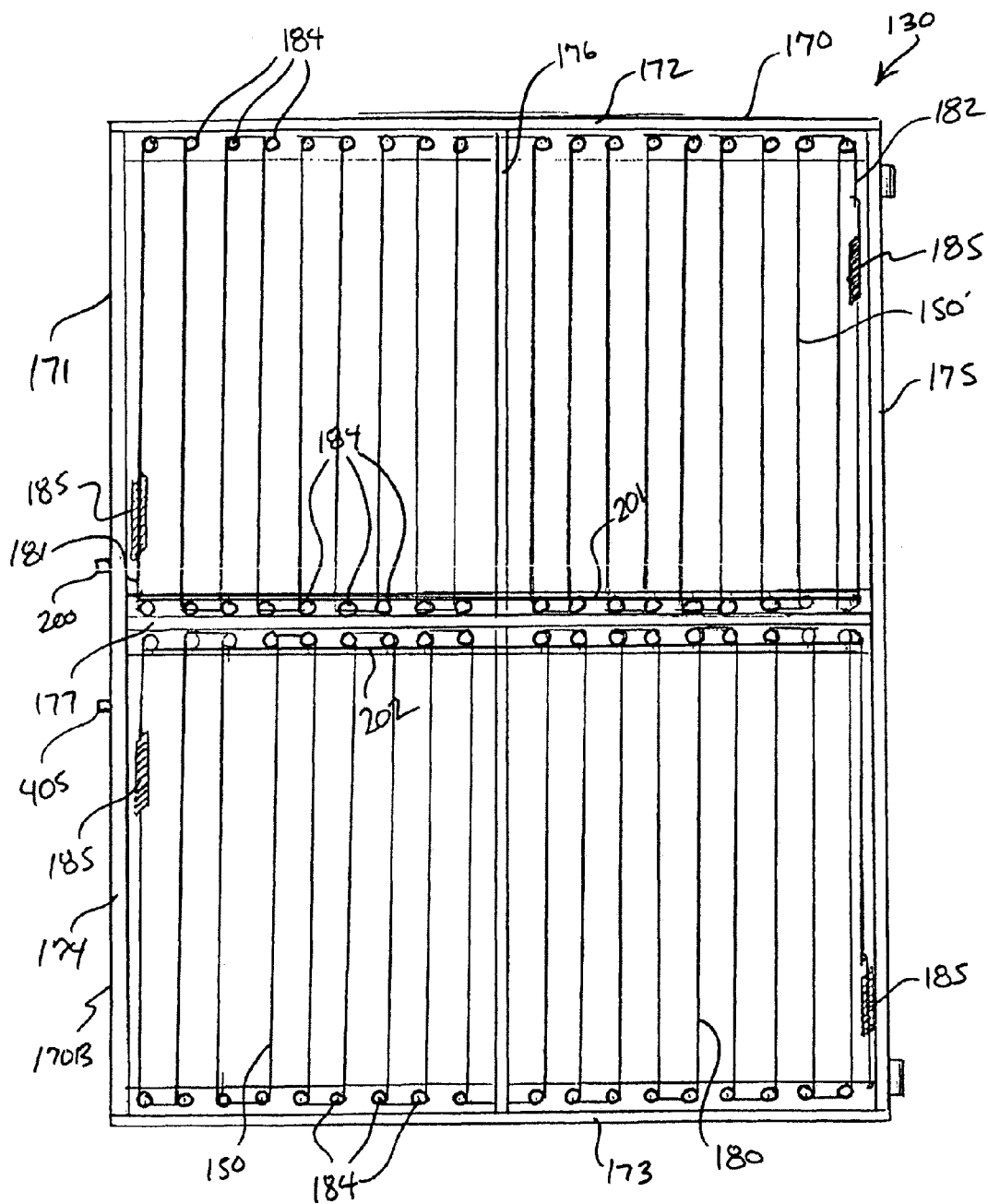
FIG. 12 is a fragmented rear elevational view of one of the ionizer assemblies of the electrically stimulated air filter apparatus of FIG. 6, the ionizer assembly including ionizing wires supported by a framework.

Referring to FIG. 12, which is a rear elevational view of ionizer assembly 130, ionizer assembly 130 consists of a framework 170 formed of plastic, polyethylene or other non-conductive material or combination of nonconductive materials. Framework 170 is the supporting structure for ionizer electrodes 150, and upstream electrodes 151.

Framework 170 consists of a generally rectangular parametric frame 171 formed by opposed, elongate, parallel upper and lower members 172 and 173 interconnected at their respective opposed ends by opposed, elongate, parallel side members 174 and 175. An elongate vertical support 176 is parallel to and disposed at an intermediate location between side members 174 and 175 and is secured to and interconnects upper member 172 with lower member 173, and an elongate, horizontal support 177 is parallel to and disposed at an intermediate location between upper and lower members 171 and 172 and is secured to and interconnects side member 174 with side member 175. Vertical support 176 and horizontal support 177 intersect and are joined at their respective midpoints. Referencing FIG. 6, for reference purposes it is to be understood that framework 170 has an upstream side denoted at 170A, and an opposed downstream side denoted at 170B. Parametric frame 171 is open from upstream side 170A to downstream side 170B as illustrated.

In the present embodiment, ionizer assembly 130 is fashioned with two ionizer electrodes 150 applied to downstream side 170B of framework 170, including upper and lower ionizer electrodes, extending between side members 174 and 175. Ionizer electrodes 150 are each substantially identical in structure and function. Accordingly, the structural details of only the uppermost ionizer electrode, which is denoted at 150' for clarity, will be discussed in detail, with the understanding that the ensuing discussion of upper electrode 150' applies equally to each ionizer electrode of filter apparatus 120. When operational ionizer electrodes 150 together function as, and may together be referred to as, the ionizer electrode of ionizer assembly 130.

Upper electrode 150' consists of a high voltage ionizing wire 180 having opposed ends 181 and 182 and a length extending between opposed ends 181 and 182. End 181 is secured to framework 170 at side member 174 of framework 170, and end 182 is secured to framework 170 at side member 175 of framework 170. The length of ionizing wire 180 between ends 181 and 182 is strung across framework 170 from side member 174 to side member 175 forming a planar, upright array of spaced-apart, parallel courses or lengths of wires of the length of ionizing wire 180. The spaced-apart, parallel courses or lengths of ionizing wire 180 extend across framework 170 from side member 174 to side member 175, and extend across framework 170 between horizontal support 177 and upper member 172. Ionizing wire 180 is formed by a single tungsten wire or other conductive material, which is attached to framework 170 and strung across framework 170 between upper member 172 and horizontal support 177 with non-conductive pins 184 affixed to upper and horizontal supports 172 and 177.

Figure 13:
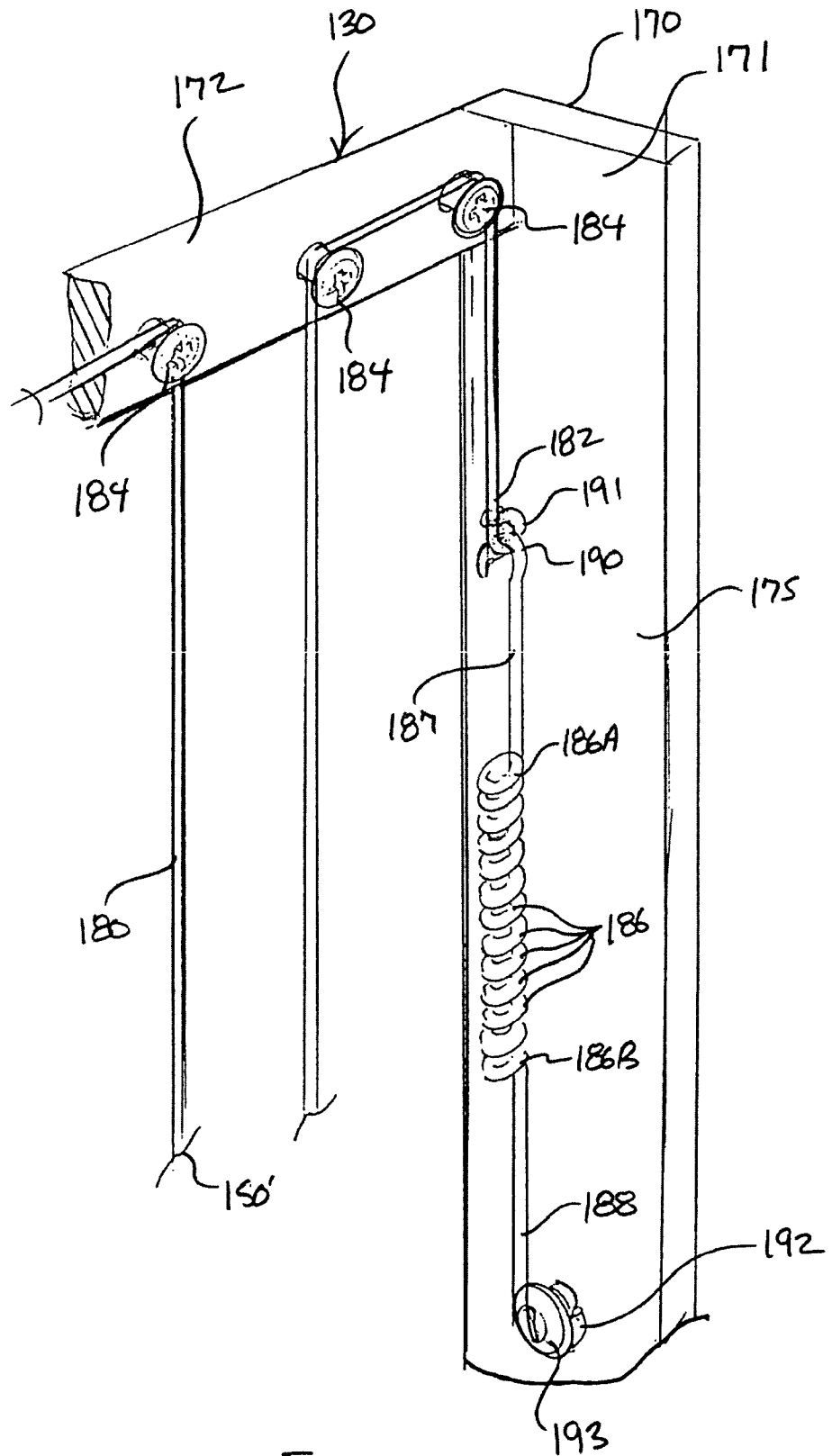
FIG. 13 is an enlarged fragmented perspective view of the ionizer assembly of FIG. 12 illustrating a spring coupled between an end of an ionizing wire and the framework applying tension to the ionizing wire.

Tension is applied to ionizing wire 180 maintaining tension across each of the courses of the length of ionizing wire 180 between ends 181 and 182 of ionizing wire, in accordance with the principle of the invention. Referring to FIG. 13, a tension spring 185 is coupled between end 182 of ionizing wire 180 and side member 175 of framework 170 applying the tension to ionizing wire 180. In the present embodiment, tension spring 185 is fashioned of spring steel, a nickel-based spring alloy, or other material or combination of materials having a substantially constant moduli of elasticity as is typical with tension springs, and includes a wire formed into coils 186, in which the two opposing outermost coils 186A and 186B lead to tag ends 187 and 188, respectively. Tag end 187 is secured to end 182 of ionizing wire 180, and tag end 188 is secured to side member 175 of framework 170. In the present embodiment, tag end 187 is formed with a hook 190, which is received by a corresponding loop 191 formed in end 182 of wire 180 thereby securing tension spring 185 to end 182 of ionizing wire 180, although this arrangement of engagement elements can be reversed if so desired. Tag end 188 is formed with a loop 192 that accepts a fastener 193, in this instance a threaded fastener, that is, in turn, secured to side member 175 of framework 170. Those having regard for the art will readily appreciate that any suitable engagement structure may be utilized for securing tag end 187 to end 182 of ionizing wire 180, and for securing tag end 188 to framework 170 without departing from the invention. End 181 of ionizing wire 180 is similarly attached to framework 170 with a tension spring 185, whereby tension springs 185 together supply the applied bias to ionizing wire 180 in accordance with the principle of the invention. Although tension springs 185 applied to ends 181 and 182, respectively, of ionizing wire 180 supply the applied tension to ionizing wire 180, only one tension spring may be utilized in conjunction with one of the ends of ionizing wire 180 for supplying the applied tension to ionizing wire 180.

Referencing FIG. 14, an electrical contact or plug 200, such as a banana plug or the like, is formed in side member 174, which is electrically connected to a pair of opposed parallel supply wires 201 and 202 with a conductive strip 203 of metal. Supply wires 201 and 202 are each formed of a single tungsten wire and are preferably soldered to strip 203 providing an electrical connection therebetween. Looking to FIG. 12, supply wires 201 and 202 extend along horizontal support 177 from side member 174 to side member 175, and are each electrically connected, such as by soldering, to a contact 204 attached to framework 170 at side member 175. Supply wire 201 is in electrical contact with ionizer electrode 150', supply wire 202 is in contact with ionizer electrode 150, and supply wires 201 and 202 are each in electrical contact with electrical contact 204 thereby forming an electrical connection of ionizer electrodes 150' to ionizer electrode 150. Supply wires 201 and 202 each electrically contact the courses of ionizing wire 180 of the respective ionizer electrodes 150' and 150, whereby a potential imparted to supply wires 201 and 202 is, in turn, imparted to ionizer electrodes 150' and 150.

Figure 34:
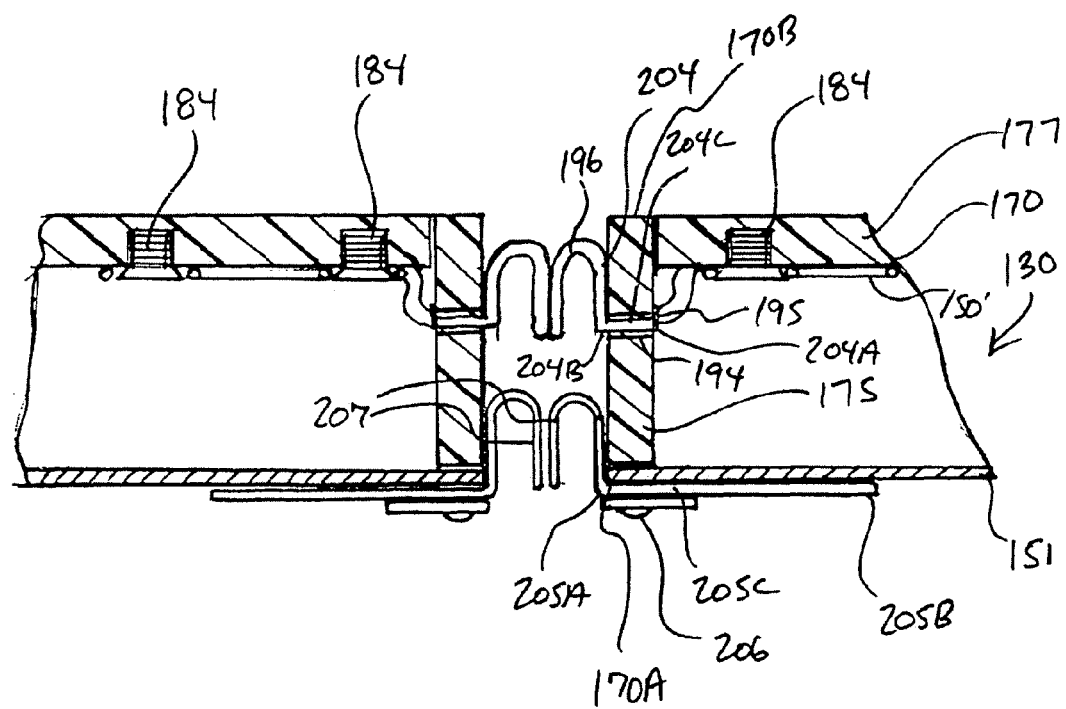
FIG. 34 is an enlarged fragmented horizontal sectional view of the ionizer assemblies of the electrically stimulated air filter apparatus of FIG. 6 illustrating the opposed engaged electrical contacts illustrated in FIG. 33.

With momentary reference to FIG. 34, illustrated is electrical contact 204 mounted to framework 170 at side member 175. Electrical contact 204 consists of an elongate member or spline formed of spring steel or other springy conductive metal having a proximal end 204A, an opposed distal end 204B, and an intermediate portion 204C between proximal and distal ends 204A and 204B. Intermediate portion 204C extends through, and is secured relative to, a sleeve 194 formed in framework 210 through side member 175. Proximal end 204A is integral with an enlarged head 195 located against the inner side of side member 175, and distal end 204B is integral with an electrical contact 196 extending outwardly from side member 175. Supply wires 201 and 201 are electrically connected to enlarged head 195 of proximal end 204A, such as by soldering or the like. The fit between intermediate portion 204C and sleeve 194 is relatively close and tight thereby providing a secure engagement of electrical contact 204 relative to side member 175 of framework 170 of ionizer assembly 130. If desired, the engagement between intermediate portion 204C and sleeve 195 may be enhanced with an adhesive, one or more rivets, screws, etc.

Referring back to FIG. 6, upstream electrode 151 is constructed of porous conductive material, typically a flattened and expanded aluminum grid, screen or mesh. Upstream electrode 151 is applied against upstream side 170A of parametric frame 171, whereby the parametric edge of upstream electrode 151 is secured to the upstream edges of upper and lower members 172 and 173 and side members 174 and 175 with a non-conductive adhesive, although non-conductive threaded fasteners or rivets or the like may be used, if desired. Because framework 170 is formed of non-conductive material, upstream electrode 151 is, in a particular embodiment, electrically isolated being under no influence or control by any device attached thereto, such as a ground or resistor or other device capable of influencing the induced potential thereacross provided by ionizer electrodes 150. Because upstream electrode 151 is electrically isolated in a preferred embodiment, upstream electrode 151 is a "floating" electrode being free of the influence of a ground or resistor or other device, the potential imparted to upstream electrode 151 through induction by ionizer electrodes 150 of ionizer assembly 130 is lower in magnitude than the potential applied across ionizer electrodes 151 as previously discussed, and the incidence of arcing occurring between ionizer electrodes 150 and upstream electrode 151 is restrained. If desired, upstream electrode 151 may be grounded. However, grounding upstream electrode 151 tends to increase the incidence of arcing between ionizer electrodes 150 and upstream electrode 151, whereby distance D1, referenced in FIG. 7, between ionizer electrodes 150 and upstream electrode 151 must be carefully chosen to prevent the incident of arcing therebetween.

In the preferred embodiment set forth herein, upstream electrode 151 is formed of a single sheet of flattened and expanded aluminum grid, screen or mesh. If desired, upstream electrode 151 may be formed of a plurality of sheets of flattened and expanded aluminum grids, screens or meshes.

Referring back to FIG. 12, applied to framework 170 at side member 175 are opposed electrical contacts 205. Electrical contacts 205 extend outwardly relative to side member 175. One electrical contact 205 is located adjacent to upper member 172, and the other electrical contact 205 is located adjacent to lower member 173. Electrical contacts 205 are identical in every respect, and the details of only one of electrical contacts will be discussed in conjunction with FIG. 33, with the understanding that the ensuing discussion applies to each electrical contact 205.

Figure 33:
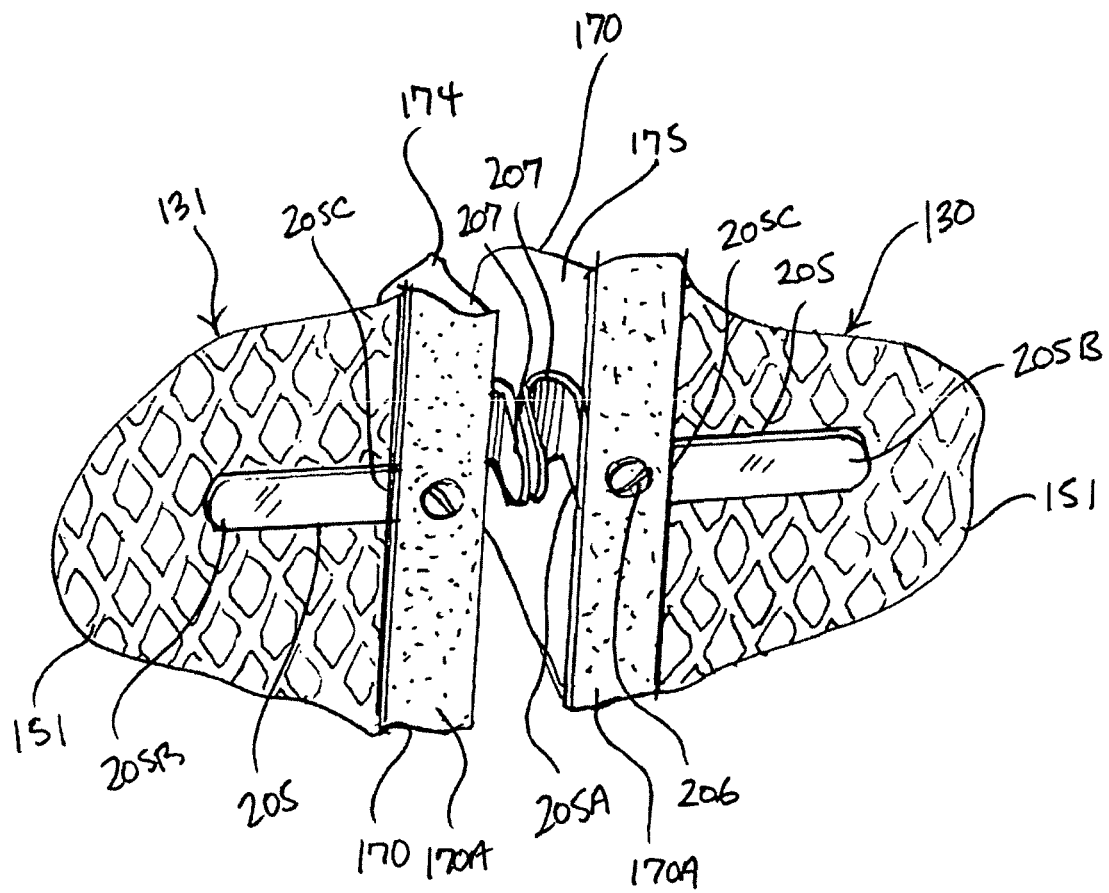
FIG. 33 is an enlarged fragmented perspective of the ionizer assemblies of the electrically stimulated air filter apparatus of FIG. 6 illustrating opposed engaged electrical contacts mounted to frameworks of the ionizer assemblies.

Referencing FIGS. 33 and 34, an electrical contact 205 is shown, and is applied and secured to side member 175 at upstream side 170A of framework 170. Electrical contact 205 consists of an elongate member or spline formed of spring steel or other springy conductive metal having a proximal end 205A, an opposed distal end 205B, and an intermediate portion 205C between proximal and distal ends 205A and 205B. Intermediate portion 205C is secured to the upstream edge of side member 175 with a threaded fastener 206, although a rivet, adhesive or other selected fastener or combination of fastener may be used to secure electrical contact 205 in place. Proximal end 205A is integral with an electrical contact 207 extending outwardly relative to side member 175 of framework 170. Distal end 205B extends inwardly relative to side member 175 and is received in contact against upstream electrode 151, according to the principle of the invention. In the present embodiment, two electrical contacts 205, and corresponding electrical contacts 207 integral therewith, are incorporated with ionizer assembly 130, although less or more may be utilized if desired.

The structural details of ionizer assembly 130 have been described. As previously mentioned, ionizer assemblies 130 and 131 are substantially identical, and the discussion above relating to ionizer assembly 130 applies to ionizer assembly 131. One difference between ionizer assembly 130 and ionizer assembly 131 is that electrical contacts 205, and the corresponding electrical contacts 207 integral therewith, of ionizer assembly 131 are attached to framework 170 at side member 174, in which case electrical contacts 207 project outwardly relative to side member 174 of ionizer assembly 131. FIGS. 33 and 34 illustrate this aspect showing side member 174 of framework 170 of ionizer assembly 131, an electrical contact 205 mounted to framework 170 at side member 174 of ionizer assembly 131, and electrical contact 207 integral with electrical contact 205 projecting outwardly relative to side member 174 of ionizer assembly 131.

As previously mentioned, when filter apparatus 120 is assembled upstream electrode 151 of ionizer assembly 130 is electrically connected to upstream electrode 151 of ionizer assembly 131, in which electrical contacts 205 between ionizer assemblies 130 and 131 provide this electrical connection between ionizer assemblies 130 and 131. In particular, when filter apparatus 120 is assembled ionizer assemblies 130 and 131 are mounted side-by-side and extend upright and together reside in a common vertical plane, in which side member 175 of ionizer assembly 130 faces and confronts side member 174 of ionizer assembly 131 as illustrated in FIGS. 33 and 34. Electrical contacts 205, and electrical contacts 207 integral therewith, between ionizer assembly 130 and ionizer assembly 131 relate, whereby electrical contacts 207 of ionizer assembly 130 contact electrical contacts 207 of ionizer assembly 131 thereby electrically connecting upstream electrode 151 of ionizer assembly 130 to upstream electrode 151 of ionizer assembly 131, in accordance with the principle of the invention.

Another difference between ionizer assembly 130 and ionizer assembly 131 is that electrical contact 204 of ionizer assembly 131 is attached to framework 170 at side member 174 of ionizer assembly 131, in which case electrical contact 196 projects outwardly relative to side member 174 of ionizer assembly 131. FIG. 34 illustrates this point showing side member 174 of framework 170 of ionizer assembly 131, electrical contact 204 mounted to framework 170 at side member 174 of framework 170 of ionizer assembly 131 and electrical contact 196 integral with proximal end 204A projecting outwardly relative to side member 174 of ionizer assembly 131.

As previously mentioned, when filter apparatus 120 is assembled ionizer electrodes 150 of ionizer assembly 130 are electrically connected to ionizer electrodes 150 of ionizer assembly 131. Electrical contacts 204 between ionizer assemblies 130 and 131 provide this electrical connection between ionizer assemblies 130 and 131. In particular, when filter apparatus 120 is assembled ionizer assemblies 130 and 131 are mounted side-by-side and extend upright and together reside in a common vertical plane, in which side member 175 of ionizer assembly 130 faces and confronts side member 174 of ionizer assembly 131 as illustrated in FIG. 34. Electrical contacts 204 between ionizer assembly 130 and ionizer assembly 131 relate, whereby electrical contact 196 of ionizer assembly 130 contacts electrical contact 196 of ionizer assembly 131 thereby electrically connecting supply wires 201 and 202 of ionizer assembly 130 to supply wires 201 and 202 of ionizer assembly 131 thereby, in turn, electrically connecting ionizer electrodes 150 of ionizer assembly 130 to ionizer electrodes 150 of ionizer assembly 131, in accordance with the principle of the invention.

Having described the structural details of ionizer assembly 130, in which the discussion thereof applies equally to ionizer assembly 131 with the exception of the noted differences described above, the structural details of filter assemblies 132 and 133 will now be discussed. Filter assemblies 132 and 133 are substantially identical, both in size and in structure. Accordingly, only the structure of filter assembly 132 will be discussed in detail, with the understanding that the ensuing discussion of filter assembly 132 applies to filter assembly 133 in every respect with the exception of any noted differences.

Figure 6:
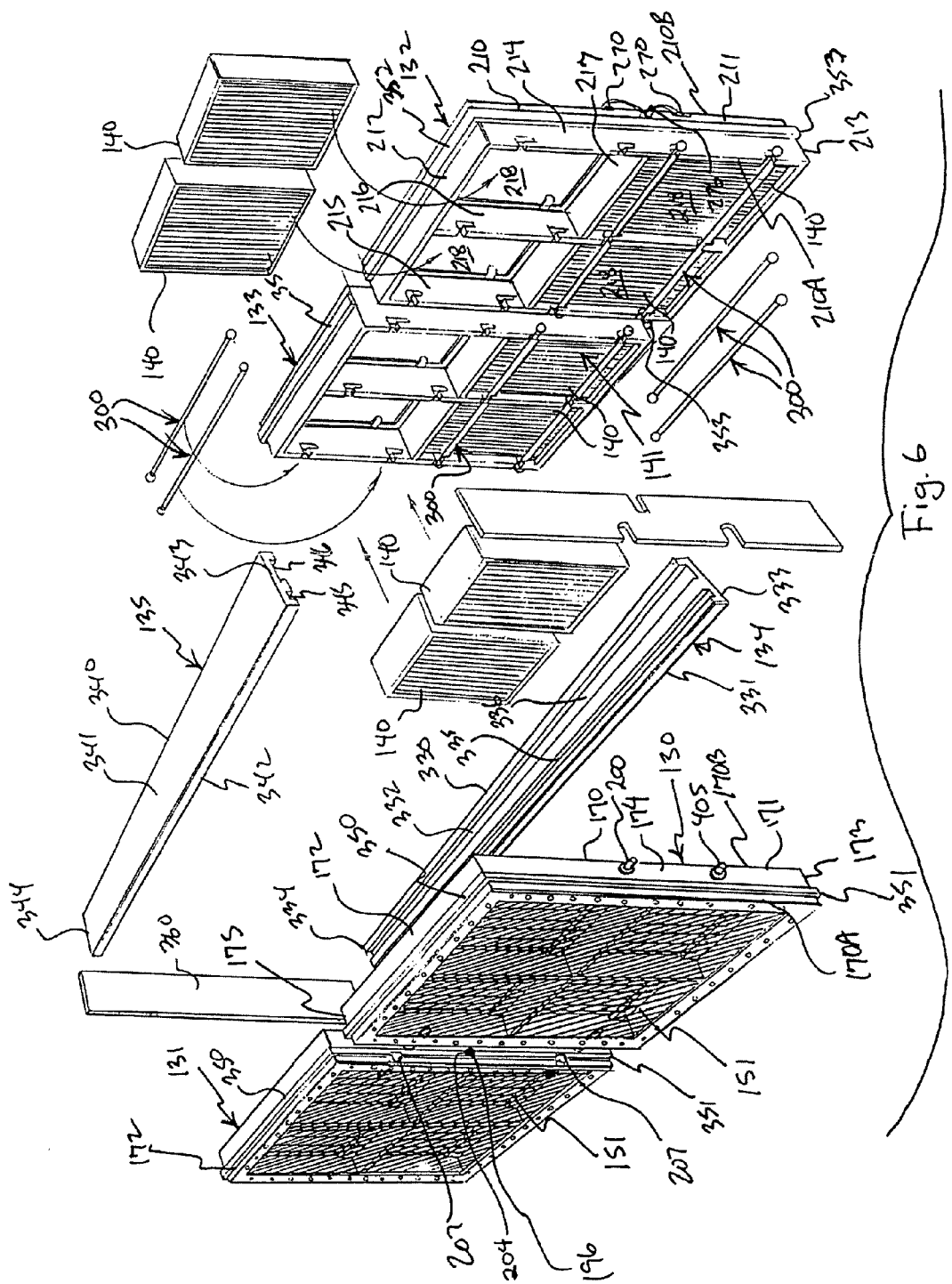
FIG. 6 is a highly generalized exploded perspective view of the electrically stimulated air filter apparatus of FIG. 4 illustrating filter assemblies, ionizer assemblies, and supports for securing the filter and ionizer assemblies.

Referring to FIG. 6, filter assembly 132 consists of a framework 210 formed of plastic, polyethylene or other nonconductive material or combination of nonconductive materials. Framework 210 receives filters 140, and is the supporting structure for filters 140. Framework 210 consists of a generally rectangular parametric frame 211 formed by opposed, elongate, parallel upper and lower members 212 and 213 interconnected at their opposed ends by opposed, elongate, parallel side members 214 and 215. An elongate vertical support 216 is parallel to and disposed at an intermediate location between side members 214 and 215 and is secured to and interconnects upper member 212 with lower member 213. An elongate, horizontal support 217 is parallel to and disposed at an intermediate location between upper and lower members 211 and 212 and is secured to and interconnects side member 214 with side member 215. Vertical support 216 and horizontal support 217 intersect and are joined at their respective midpoints, and cooperate with parametric frame 211 to form receiving areas or compartments 218 for filters 140. In the present embodiment, framework 210 incorporates four compartments 218, including two upper compartments 218 disposed side-by-side on either side of vertical support 216, and two lower compartments 218 disposed side-by-side on either side of vertical support 216. Compartments 218 are substantially equal in size and shape. For reference purposes it is to be understood that framework 210 has an upstream side denoted at 210A, and an opposed downstream side denoted at 210B, and that parametric frame 211 is open from upstream side 210A to downstream side 210B as illustrated.

Compartments 218 each receive and hold a filter 140, in accordance with the principle of the invention. The size and shape of each filter 140 relates to the size and shape of each corresponding compartment 218. In the present embodiment, the size and shape of each filter 140 and each corresponding compartment 218 is generally rectangular, although other corresponding shapes can be implemented if so desired. The size of each compartment 218 is only somewhat greater than the size of the corresponding filter 140 ensuring a relatively close fit, yet not so close making it easy to install and remove filters 140 relative to compartments 218.

Filters 140 are substantially identical, both in size and in structure, as are each of compartments 218. Accordingly, only the structure of one filter 140 will be discussed in detail, with the understanding that the ensuing discussion of one filter 140 applies in every respect to each one of filters 140. For ease of discussion, the filter to be discussed in detail is denoted at 140'.

Figure 22:
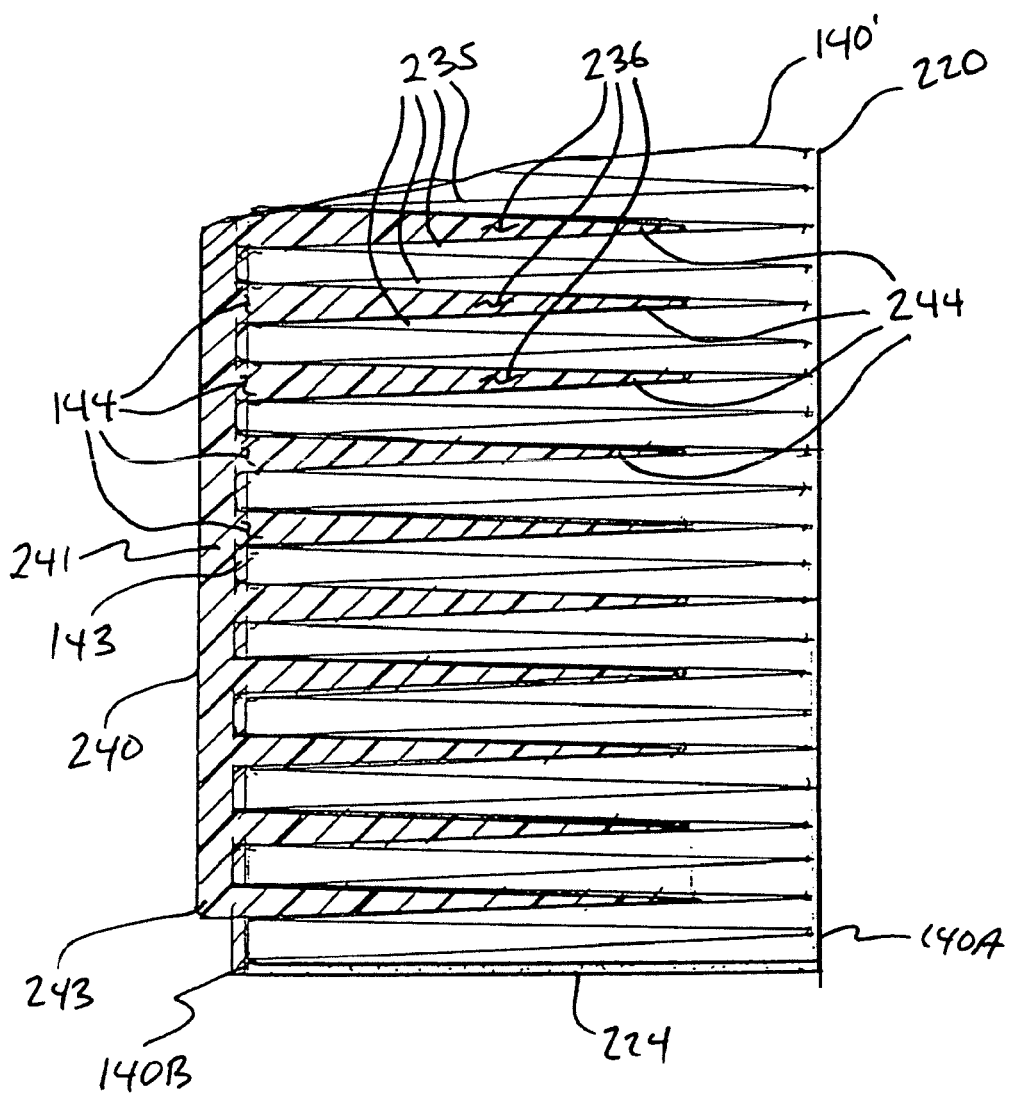
FIG. 22 is a sectional view taken along line 22-22 of FIG. 15.

Referencing FIG. 15, filter 140' is illustrated, which is representative of each of filters 140 and which consists of a broad pleated body 220 formed by opposed, parallel upper and lower ends 221 and 222, opposed parallel sides 223 and 224, and pleats 225. Equally spaced-apart pleats 225 extend vertically from upper end 221 to lower end 222, and are parallel relative to sides 223 and 224 and extend between sides 223 and 224. As seen in FIG. 22, which is a sectional view taken along line 22-22 of FIG. 15, and FIG. 26, which is a fragmented top horizontal sectional view of filter assembly 132 illustrating filter 140' shown installed relative to framework 210, pleats 235 are clearly illustrated, and define and are separated by equally spaced-apart spaces 236 formed by and between pleats 235. Pleats 235 can, if desired, be constructed to extend horizontally from side 223 to side 224. In shape, pleats 235 and spaces 236 formed by and between pleats 235 are each an elongate, triangular shape.

The broad, pleated characteristics of filter 140' provides an increased surface area allowing for capture of a greater quantity of contaminants, including clusters of particles. Filter 140' is formed of dielectric material, such as glass or other plastic fiber material having a low dielectric and low conductivity. According to the preferred embodiment set forth herein, filter 140' is preferably fashioned of fiberglass with approximately 6-10% binder material incorporated to bond the fiberglass together in the formation of filter 140'. Filter 140' neither contains nor incorporates conductive material. As a matter of illustration and reference, FIG. 16 is a front elevational view of filter 140', FIG. 17 is a side elevational view of filter 140', FIG. 18 is a rear elevational view of the filter 140', and FIG. 19 is a side elevational view of the filter 140' with portions thereof shown in vertical cross section for illustrative purposes. In the present embodiment, filter 54 is approximately 18-22 inches in width, approximately 24-30 inches in height, approximately 4-6 inches deep, and is formed of dielectric material that is approximately 0.22 inches thick.

Referencing FIG. 15, filter 140' has a front or upstream face 140A, and an opposed parallel rear or downstream face 140B. Downstream electrode 143 is constructed of porous conductive material, typically a flattened and expanded aluminum grid, screen or mesh defining an array of equally-sized openings 144. Downstream electrode 143 is applied against downstream face 140B of filter 140, and relates to the size of downstream face 140B thereby completely covering downstream face 140B. In other words, downstream electrode 143 is coextensive relative to downstream face 140B. Preferably, the parametric edge of downstream electrode 143 is adhered to the perimeter edge of filter 140 formed by the downstream edges of upper and lower ends 221 and 222 and sides 223 and 224 at downstream face 140B of filter 140' with a non-conductive adhesive. Downstream electrode 143 is in full contact with downstream face 140B of filter 140'.

In the preferred embodiment set forth herein, downstream electrode 143 is formed of a single sheet of flattened and expanded aluminum grid, screen or mesh. If desired, downstream electrode 143 may be formed of a plurality of sheets of flattened and expanded aluminum grids, screens or meshes.

Referencing FIG. 15, filter 140 incorporates a plurality of spacer elements 240. Spacer elements 240 are applied to filter 140' in a direction toward downstream electrode 143, and extend into pleated body 220 through openings 144 formed by downstream electrode 143, in accordance with the principle of the invention. In the preferred embodiment disclosed herein, spacer elements 240 are parallel relative to each other and relative to upper and lower ends 221 and 222 of pleated body 220, extend along substantially the entire width of pleated body 220 from side 223 to side 224, and are disposed at substantially equal spaced intervals between upper and lower ends 221 and 222. Spacer elements 240 function to maintain the shape of pleated body 220, namely, the shape pleats 235 from upper end 221 of pleated body 220 to lower end 222 of pleated body 220 preventing pleats 235 from collapsing and moving relate to each other in response to an air stream passing through pleated body 220 in a direction from upstream face 140A to downstream face 140B which could otherwise alter the shape of pleats 235 and the shape and size of spaces 236 formed by and between pleats 235 and, thus, the filtering efficiency of filter 140'. As illustrated in FIGS. 15 and 18, filter 140' incorporates six spacer elements 240 between upper end 221 of pleated body 220 and lower end 222 of pleated body 220, although less or more may be utilized as so desired or as so needed.

Spacer elements 240 are substantially identical in size, structure, and function, and are each formed of non-conductive material, such as polyethylene, polypropylene, or other selected plastic or plastic-like material. One spacer element 240 is detached and removed from filter 140' in FIG. 15 for illustrative purposes, in which the illustrated spacer element 240 consists of a straight, elongate body 241 having opposed ends 242 and 243, and a plurality of equally spaced-apart and equally-sized fingers 244 extending in a parallel row from elongate body 241 from end 242 to end 243. Fingers 244 each have an elongate, triangular shape. Moreover, the size and shape of fingers 244 each generally relate to the cross sectional size and shape of each space 236 formed by and between pleats 235.

Spacer elements 240 are each applied to filter 140' and form part of filter 140'. Referencing FIG. 22, which is a sectional view taken along line 22-22 of FIG. 15, a spacer element 240 is illustrated applied to filter 140'. Applied to filter 140' in accordance with the principle of the invention, fingers 244 are applied through openings 144 formed in downstream electrode 143 and elongate body 241 is applied exteriorly against downstream electrode 143, whereby fingers 244 extend into and through openings 144 formed in downstream electrode 143 from elongate body 241 into alternating ones of spaces 236 as illustrated toward upstream face 140A of filter body 220. In other words, every other one of spaces 236 facing downstream electrode 143 is occupied by one finger 244, whereby pleats 235 are thereby inhibited from collapsing and moving relative to each other in response to an air stream passing through pleated body 220 in a direction from upstream face 140A to downstream face which could otherwise alter the shape of pleats 235 and the shape and size of spaces 236 formed by and between pleats 235. As a matter of illustration and reference, FIG. 19 is a side elevational view of filter 140' with portions thereof shown in vertical cross section illustrating one finger 244 from adjacent spacer elements 240 received in space 236 formed along pleat 235, in which fingers 244 are parallel relative to one another and also relative to upper and lower ends 221 and 222 of pleated body 220, and extend into pleated body 220 from downstream electrode 143 at downstream face 140A of pleated body 220 toward upstream face 140A of pleated body 220. In this regard, it is to be understood that the parallel rows of fingers 244 of the plurality of spacer elements 240 are parallel relative to each other and relative to upper and lower ends 221 and 222 of pleated body 220 in accordance with the principle of the invention.

To secure spacer elements 240 in place after applying them to filter 140' as herein specifically described, a non-conductive adhesive is applied adhering the elongate body 241 of each spacer element 240 to downstream electrode 143 and downstream face 140B of pleated body 220. Preferably, the non-conductive adhesive is applied along the entire length of the elongate body 241 of each spacer element 240 from end 242 to end 243 in the form of one or more beads of the non-conductive adhesive. As a matter of illustration and reference, FIG. 20 is a sectional view taken along line 20-20 illustrating beads 250 of non-conductive adhesive applied between the elongate body 241 of the illustrated spacer element 240, the downstream electrode 143 and the downstream face 140B of pleated body 220 of filter 140'. In FIG. 20, two beads 250 of the non-conductive adhesive are applied, one bead 250 formed on one side of the elongate body 241 and the second of the two beads 250 formed on the opposed side of the elongate body 241. FIG. 21 is an enlarged fragmented perspective view illustrating the spacer element 240 of FIG. 20 applied to filter 140' and one of the beads 250 of non-conductive adhesive applied to one side of the elongate body 241 and interacting between the elongate body 241, the downstream electrode 143, and the downstream face 140B of pleated body 220 of filter 140'. The application of spacer elements 240 to filter 140' not only inhibits or prevents pleats 235 from collapsing and moving relative to each other in response to an air stream passing through pleated body 220 in a direction from upstream face 140A to downstream face 140B which could otherwise alter the shape of pleats 235 and the shape and size of spaces 236 formed by and between pleats 235, but also applies downstream electrode 143 into intimate contact against downstream face 140B of pleated body 220, in accordance with the principle of the invention. More particularly, the adhesion formed between the elongate bodies 241 of spacer elements 240 applies downstream electrode 143 against downstream face 140B.

Figure 23:
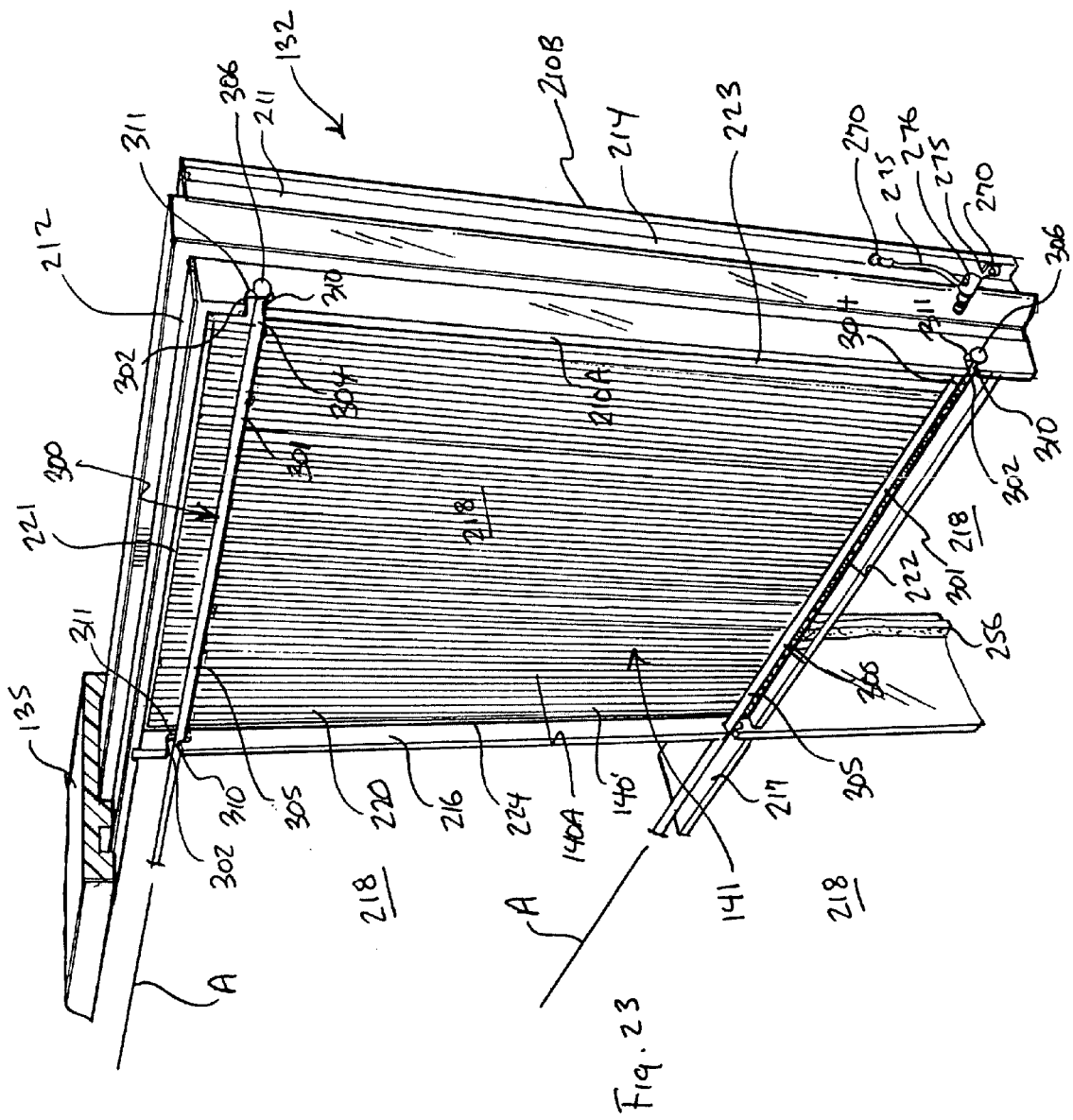
FIG. 23 is an enlarged front perspective view of the filter of FIG. 15 shown received by a framework of one of the filter assemblies of the electrically stimulated air filter apparatus of FIG. 6, including rods carried by the framework interacting with the filter.
Figure 26:
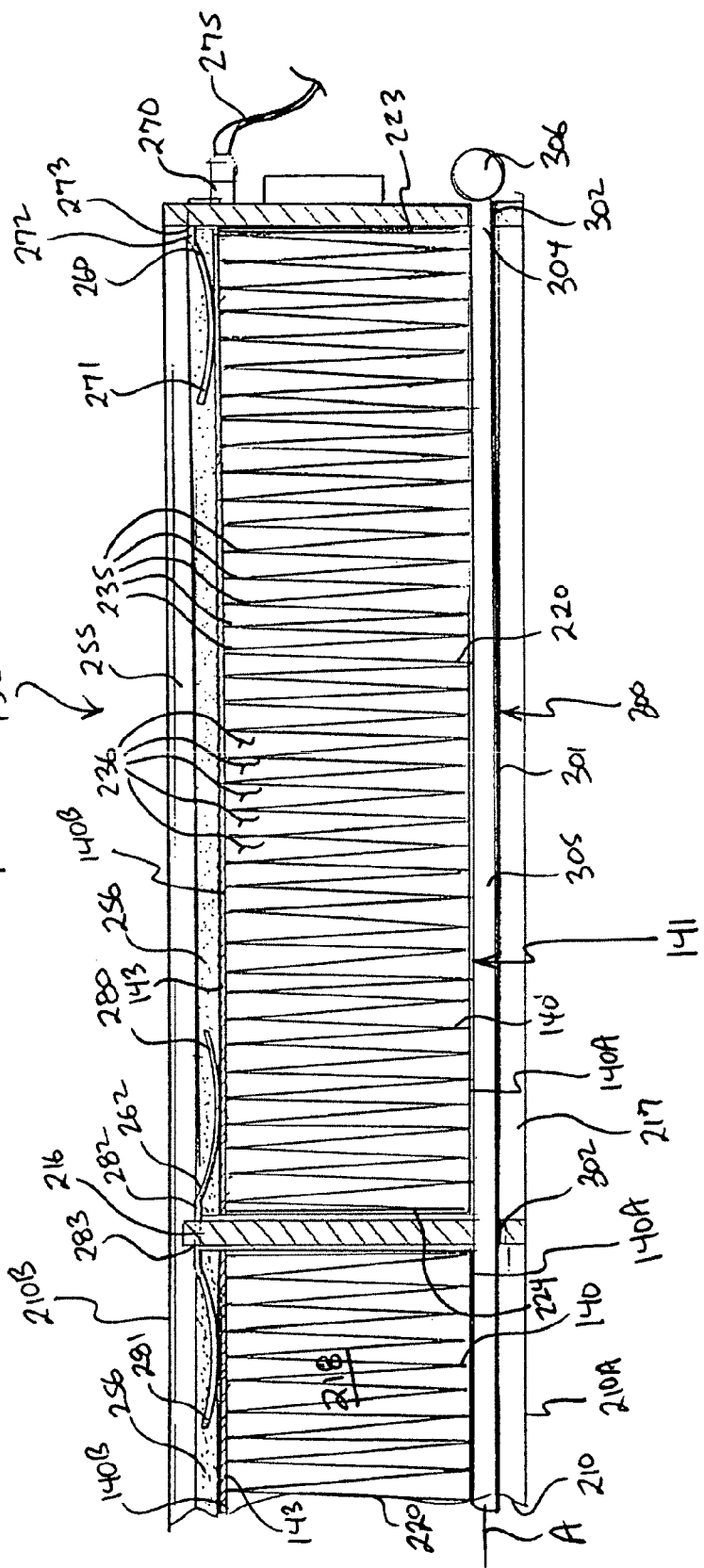
FIG. 26 is a fragmented top horizontal sectional view of one of the filter assemblies of the electrically stimulated air filter apparatus of FIG. 7.

As with each filter 140, filter 140' is received by one of the compartments 218 formed in framework 210 as illustrated in FIGS. 23 and 26. In FIGS. 23 and 26, filter 140' shown received in a compartment 218 of framework 210, whereby downstream face 140B (FIG. 26) of filter 140' and downstream electrode 143 (FIG. 26) of filter 140' face downstream side 210B of framework 210 and upstream face 140A of filter 140' faces upstream side 210A of framework 210. FIG. 23 clearly shows how the shape of filter 140' relates to the shape of the compartment 218 receiving and maintaining filter 140'. FIG. 25 is an enlarged rear perspective view of filter 140' shown received in a compartment 218 of framework 210 viewed from downstream side 210B of framework 210, whereby downstream face 140B of filter 140' and downstream electrode 143 of filter 140' face downstream side 210B of framework 210 and upstream face 140A of filter 140' faces upstream side 210A of framework 210.

Figure 28:
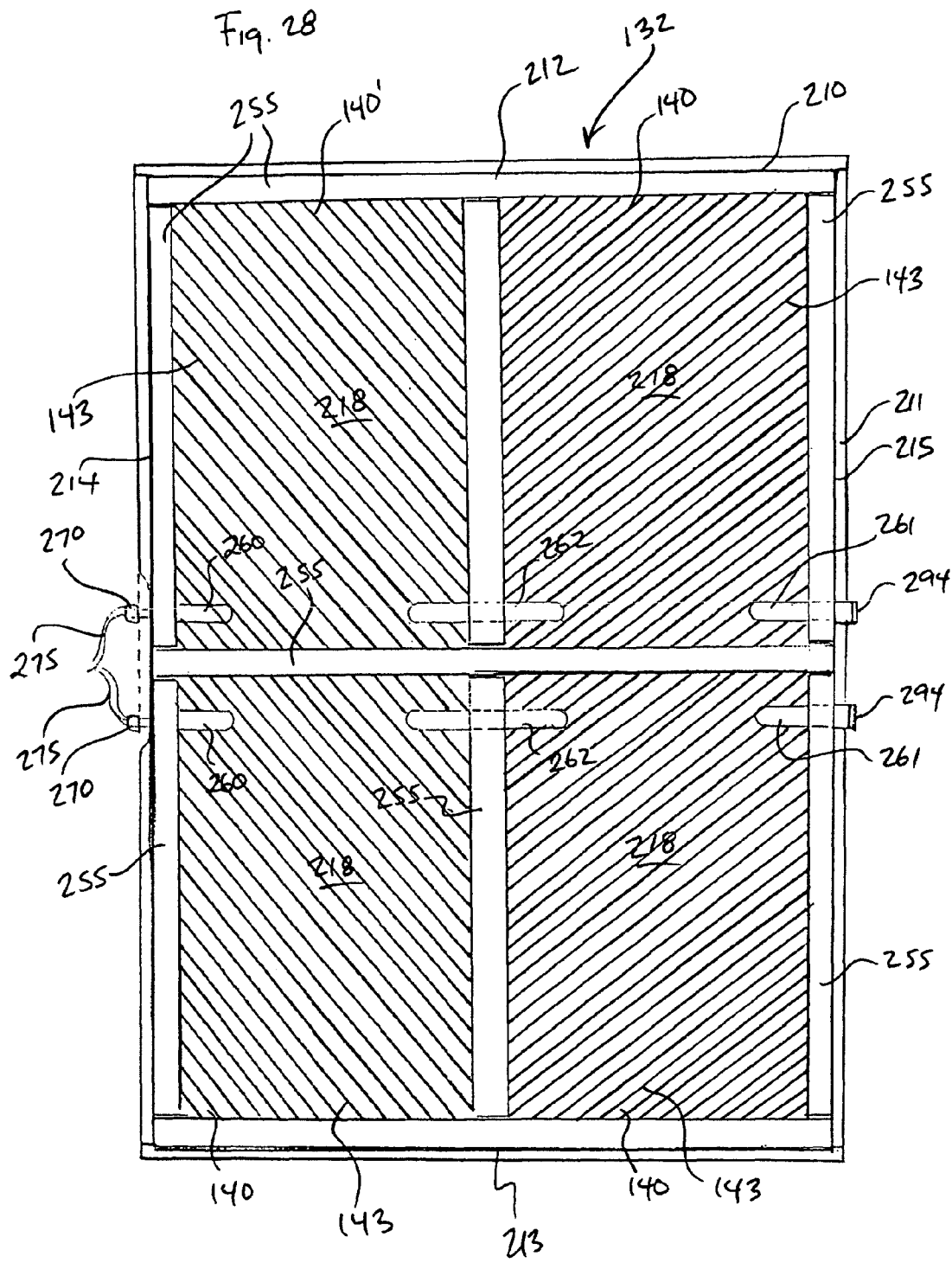
FIG. 28 is a rear elevational view of one of the filter assemblies of the electrically stimulated air filter apparatus of FIG. 7.
Figure 30:
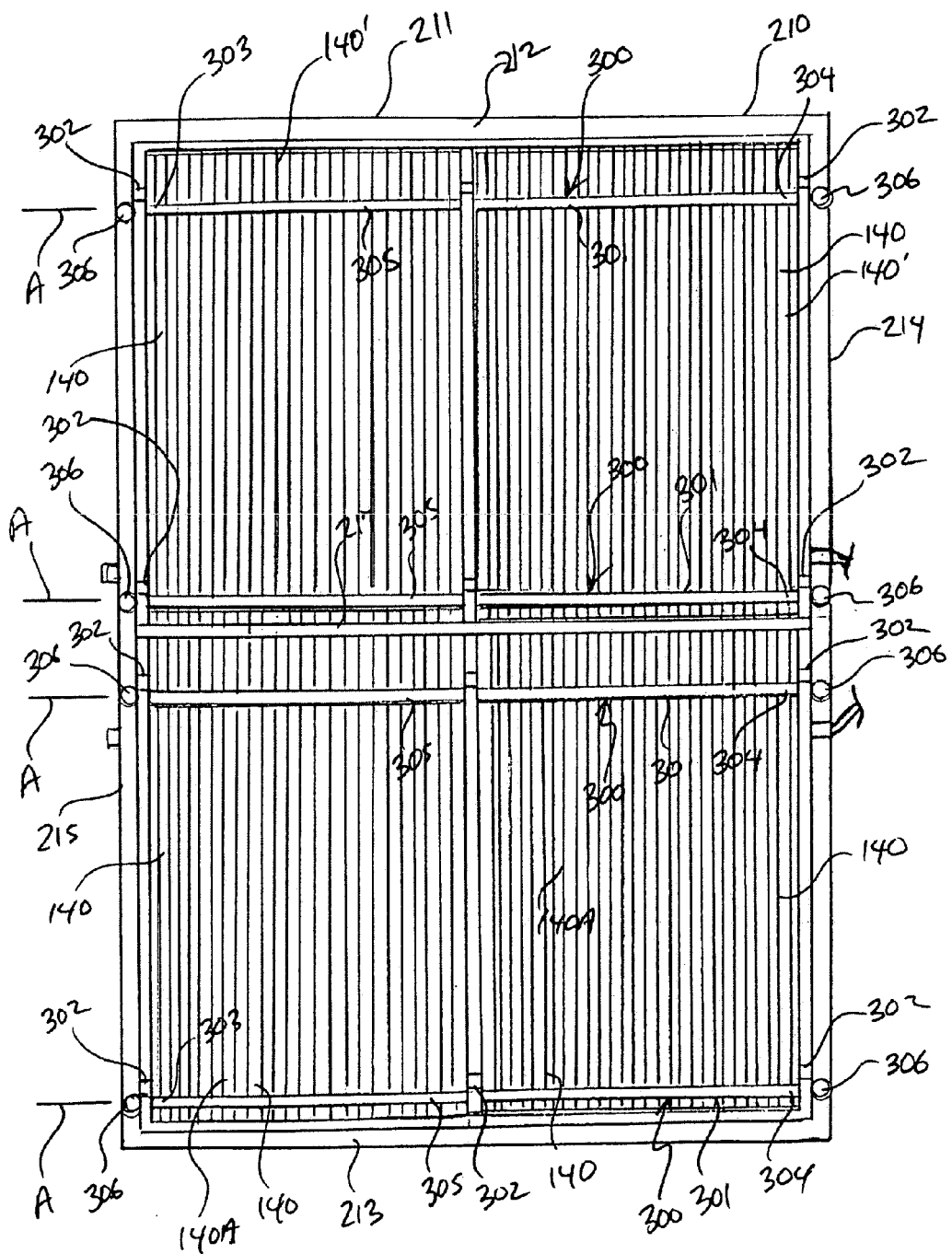
FIG. 30 is a front elevational view of the filter assembly of FIG. 28.

FIG. 28 is a rear elevational view of filter assembly 132 illustrating filters 140, including filter 140', received in compartments 218 formed by framework 210, and FIG. 30 is a front elevational view of filter assembly 132 illustrating filters 140, including filter 140', disposed in compartments 218 formed by framework 210. As seen in FIG. 28, widened strips 255 of material are applied to the downstream edges of upper, lower, and side members 211-214 of parametric frame 210, and to the downstream edges of vertical and horizontal supports 216 and 217, which cooperate to form parametric rims each directed inwardly relative to a corresponding compartment 218. The outer perimeter of each filter 140 is received against the corresponding parametric rim formed at the corresponding compartment 218 by widened strips 255, which prevents filters 140 from simply falling outwardly through the downstream side 210B of framework 210 from compartments 218.

In FIG. 25, widened strips 255 are shown formed on the parametric rim formed by framework 210 relating to compartment 218 in which filter 140' is received, and which is the case with each compartment 218 formed by framework 210. As clearly seen in FIG. 25, the perimeter of filter 140' along downstream face 140B is received against the corresponding parametric frame formed by widened strips 255 of framework 210 relating to the compartment 218 receiving filter 140' thereby preventing filter 140' from falling outwardly from compartment 218 from downstream side 210B of framework 210. Applied inwardly to widened strips 255 between the parametric frame defined by widened strips 255 relating to the compartment 218 receiving filter 140' are strips 256 of foam rubber, which provide a certain amount of compliance between filter 140' and the parametric frame and which form a seal inhibiting air from flowing between the perimeter of filter 140' and framework 210. Each filter 140 relates to a corresponding parametric frame as described in connection with filter 140', and strips 256 of foam rubber are preferably applied between the perimeter of each filter 140 and the corresponding parametric frame formed along downstream side 210A of framework 210.

Referencing FIG. 28, framework 210 supports electrical contacts, which are received against downstream electrodes 143 of filters 140, including filter 140', which electrically connect the downstream electrodes 143 of the two uppermost filters 140, one of which is filter 140', and which electrically connect the downstream electrodes 143 of the two lowermost filters 140. The electrical contacts electrically connecting the downstream electrodes 143 of the two uppermost filters 140 include opposed end electrical contacts 260 and 261 and an intermediate electrical contact 262. End electrical contact 260 is affixed framework 210 at side member 214 and is received against the downstream electrode 143 of filter 140' received in the uppermost compartment 218 formed between side member 214 and vertical support 216 and upper member 212 and horizontal support 217. End electrical contact 261 is affixed to framework 210 at side member 215 and is received against the downstream electrode 143 of filter 140 received in the uppermost compartment 218 formed between side member 215 and vertical support 216 and upper member 212 and horizontal support 217. Intermediate electrical contact 262 is affixed to framework 210 at vertical support 216 and is concurrently received against the downstream electrode 143 of filter 140' received in the uppermost compartment 218 formed between side member 214 and vertical support 216 and upper member 212 and horizontal support 217, and filter 140 received in the uppermost compartment 218 formed between side member 215 and vertical support 216 and upper member 212 and horizontal support 217. Electrical contacts 260, 261, and 262 provide the electrical contact between the respective downstream electrodes 143 of the uppermost filters.

Figure 29:
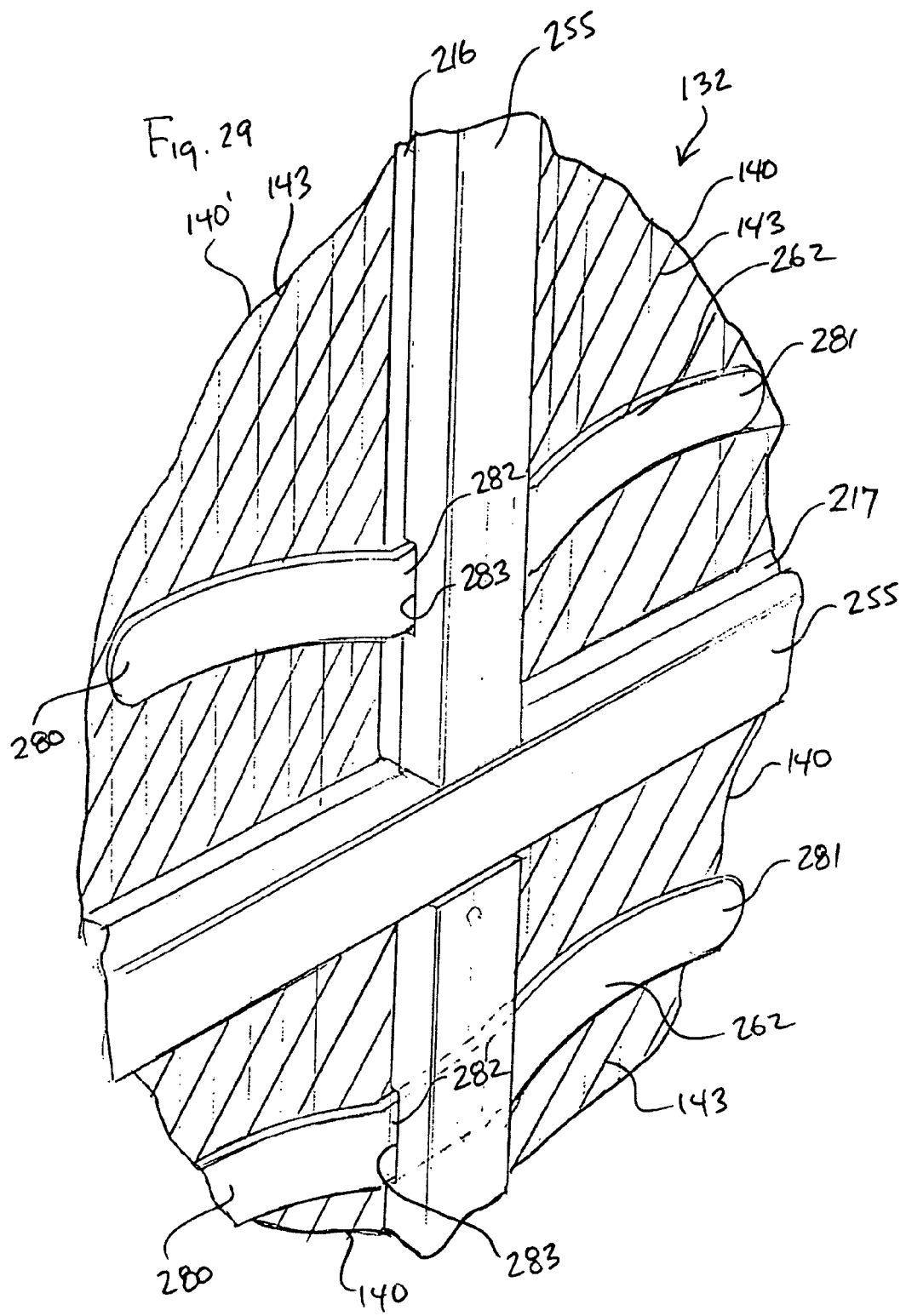
FIG. 29 is an enlarged fragmented perspective view of the filter assembly of FIG. 28 illustrating opposed filters carried by the framework and electrical contacts carried by the framework contacting the electrodes of the opposed filters.

With filter 140' properly positioned in the corresponding compartment 218, downstream electrode 143 of filter 140' is concurrently applied against electrical contact 260 as seen in FIGS. 25 and 26, and against electrical contact 262 as seen in FIGS. 26 and 29. As illustrated in FIGS. 25 and 26, electrical contact 260 consists of an elongate member or spline formed of spring steel or other springy conductive metal having a proximal end 270, an opposed distal end 271, and an intermediate portion 272 between proximal and distal ends 270 and 271. Intermediate portion 272 extends through, and is secured relative to, a sleeve 273 formed in framework 210 between side member 214 and the widened strip 255 attached to side member 214. Proximal end 270 is connected to a ground wire 275, and distal end 271 is received or otherwise abutted against downstream electrode 143 of filter 140', and ground wire 275 is, in turn, electrically connected to an electrical contact or ground plug 276 formed in side member 214 as shown in FIG. 23.

The fit between intermediate portion 272 and sleeve 273 is relatively close and tight thereby providing a secure engagement of electrical contact 260 relative to side member 214 of framework 210. If desired, the engagement between intermediate portion 272 and sleeve 273 may be enhanced with an adhesive, one or more rivets, screws, etc.

Looking to FIGS. 26 and 29, electrical contact 262 consists of an elongate member or spline formed of spring steel or other springy conductive metal having opposed free or distal ends 280 and 281 on either side of an intermediate portion 283. Intermediate portion 282 extends through, and is secured relative to, a sleeve 283 formed in framework 210 between vertical support 216 and the widened strip 255 attached to vertical support 216. Distal end 280 of electrical contact 262 is received or otherwise abutted against downstream electrode 143 of filter 140', and the opposed distal end 281 of electrical contact 262 is received or otherwise abutted against downstream electrode 143 of the adjacent uppermost filter 140 received in the adjacent compartment 218. The fit between intermediate portion 282 and sleeve 283 is relatively close and tight thereby providing a secure engagement of electrical contact 262 relative to vertical support 216. If desired, the engagement between intermediate portion 282 and sleeve 283 may be enhanced with an adhesive, one or more rivets, screws, etc.

Figure 32:
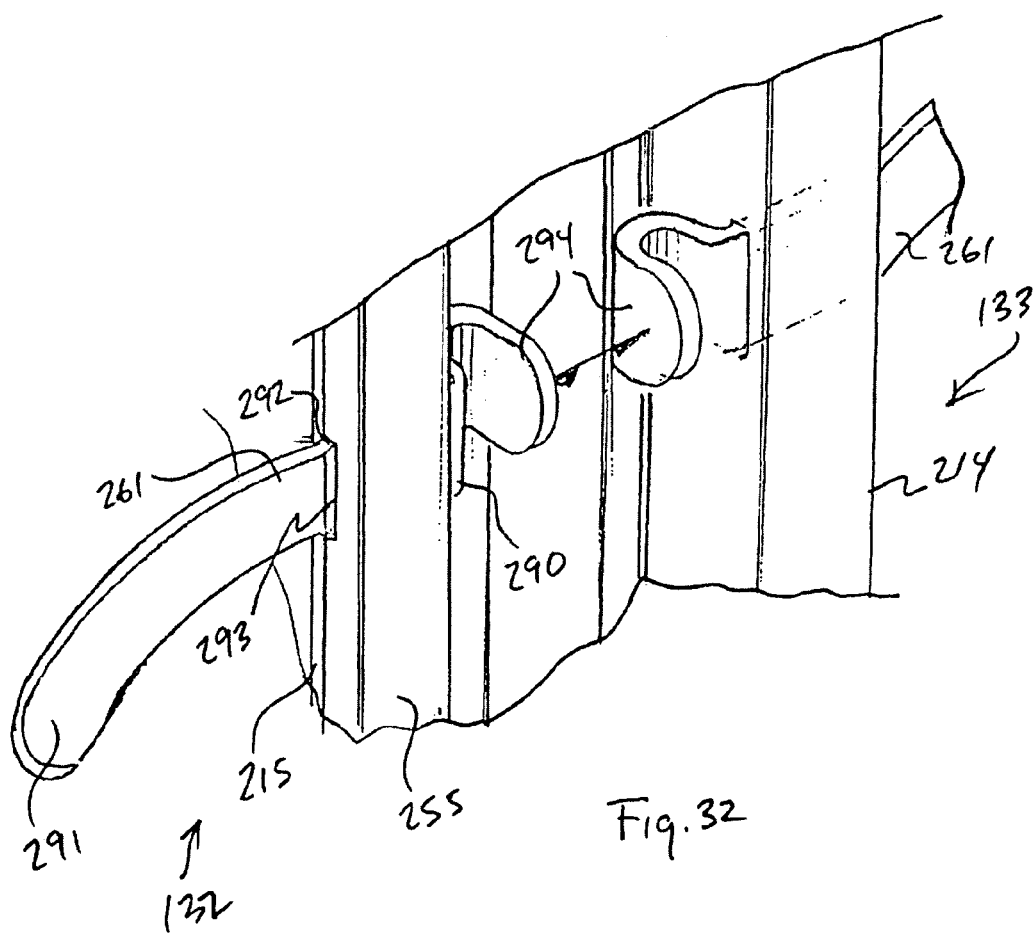
FIG. 32 is an enlarged fragmented perspective view of opposed electrical contacts mounted to frameworks of the filter assemblies of the electrically stimulated air filter apparatus of FIG. 6.

Referring to FIG. 32, electrical contact 261 consists of an elongate member or spline formed of spring steel or other springy conductive metal having a proximal end 290, an opposed distal end 291, and an intermediate portion 292 between proximal and distal ends 290 and 291. Intermediate portion 292 extends through, and is secured relative to, a sleeve 293 formed in framework 210 between side member 215 and the widened strip 255 attached to side member 215 of framework 210. Proximal end 290 is integral with an electrical contact 294 extending outwardly relative to side member 215 of framework 210, and distal end 291 received or otherwise abutted against downstream electrode 143 of the corresponding uppermost filter 140 received in the corresponding compartment 218 adjacent to the other uppermost filter 140' denoted in FIG. 26. The fit between intermediate portion 292 and sleeve 293 is relatively close and tight thereby providing a secure engagement of electrical contact 261 relative to side member 215 of framework 210. If desired, the engagement between intermediate portion 292 and sleeve 293 may be enhanced with an adhesive, one or more rivets, screws, etc.

Referring to FIG. 28, the lowermost filters 140 also relate to corresponding electrical contacts 260, 261, and 262 mounted to framework 210, and it is to be understood that the foregoing discussion of electrical contacts 260, 261, and 262 relating to the uppermost filters 140, including filter 140', of filter assembly 132 apply equally to electrical contacts 260, 261, and 262 in connection with the lowermost filters 140 of filter assembly 132. In response to applying filters 140 to compartments 218 formed by framework 210 of filter assembly 132, the electrical contacts 260, 261, and 262 attached to framework 210 along downstream side 210B electrically interconnect the downstream electrodes 143 of the plurality of filters 140. Proximal end 270 of electrical contact 260 associated with lowermost filters 140 is connected to a ground wire 275, which is, in turn, electrically connected to electrical contact or ground plug 276 formed in side member 214 as shown in FIG. 23.

After installing filters 140 into the corresponding compartments 218 formed in framework 210 as seen in FIG. 30, abutments 300 are then attached to framework 210 which act against filters 140 thereby urging downstream electrodes 143 of filters 140 against electrical contacts 260, 261, and 262 mounted to framework 210 along downstream side 210B, in accordance with the principle of the invention, and which also prevent filters 140 from falling outwardly from compartments 218 from upstream side 210A of framework 210. In the present embodiment, abutments 300 are formed of plastic, polyethylene or other nonconductive material or combination of nonconductive materials, and each consist of an elongate rod 301 mounted to framework 210 along downstream side 210A. Rods 301 are each received in corresponding slots 302 formed in the upstream edges of side members 214 and 214 and vertical support 216.

Rods 301 are elongate, have opposed ends 303 and 304 and a length 305 therebetween, run parallel relative to each other and to upper and lower members 212 and 213 of framework 210, are disposed at spaced intervals between upper member 212 and lower member 213, and extend across upstream side 210A of framework 210 from side member 214 to side member 215. Two rods 301 are applied to each filter 140, one adjacent to the upper end 221 thereof and the other rod 301 adjacent to the lower end 222 thereof. Each rod 301 extends across upstream side 210A of framework 210 and is applied against the upstream face 140A of two adjacent filters 140.

Figure 24:
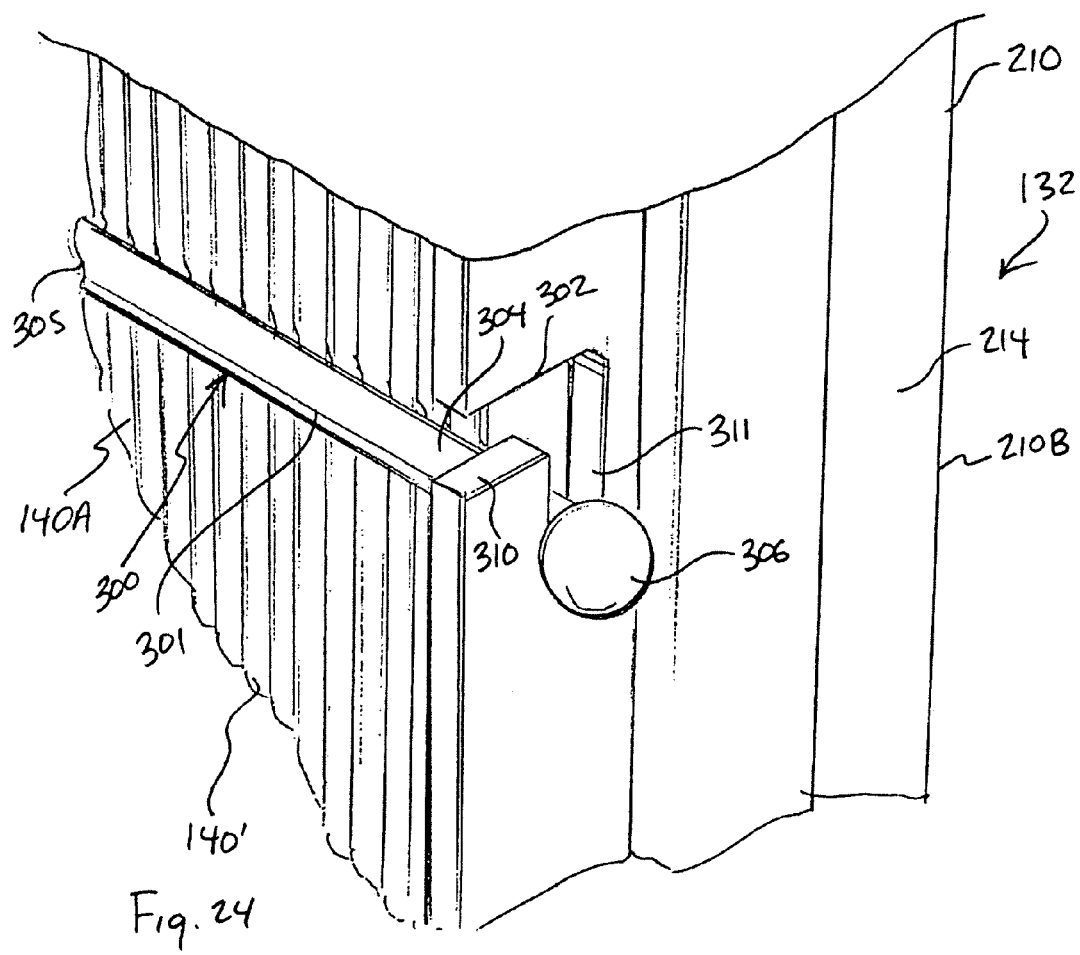
FIG. 24 is an enlarged fragmented perspective view of the filter of FIG. 23 shown received by the framework and a rod disposed in a slot formed in the framework maintaining the interaction between the rod and the filter.

Slots 302 are each identical. Looking to FIG. 24, one of the slots 302 formed in the upstream edge of side member 214 is illustrated. As seen in FIG. 24, slot 302 has an inwardly-directed portion 310 that leads to a down-turned portion 311. Rod 301 is initially received in portion 310, and is then applied downwardly into down-turned portion 311 of slot 302. Rods 301 are received in the down-turned portions of corresponding ones of slots 302, which maintains rods 301 in forcible engagement against the upstream faces 140A of the filters 140 received in compartments 218 formed by framework 210 thereby urging downstream electrodes 143 of filters 140 of filter assembly 132 against electrical contacts 260, 261, and 262 as previously discussed. Rods 301 are removed simply by reversing the operation used to install them, at which point filters 140 may be removed as needed for repair, cleaning, or replacement.

Figure 27:
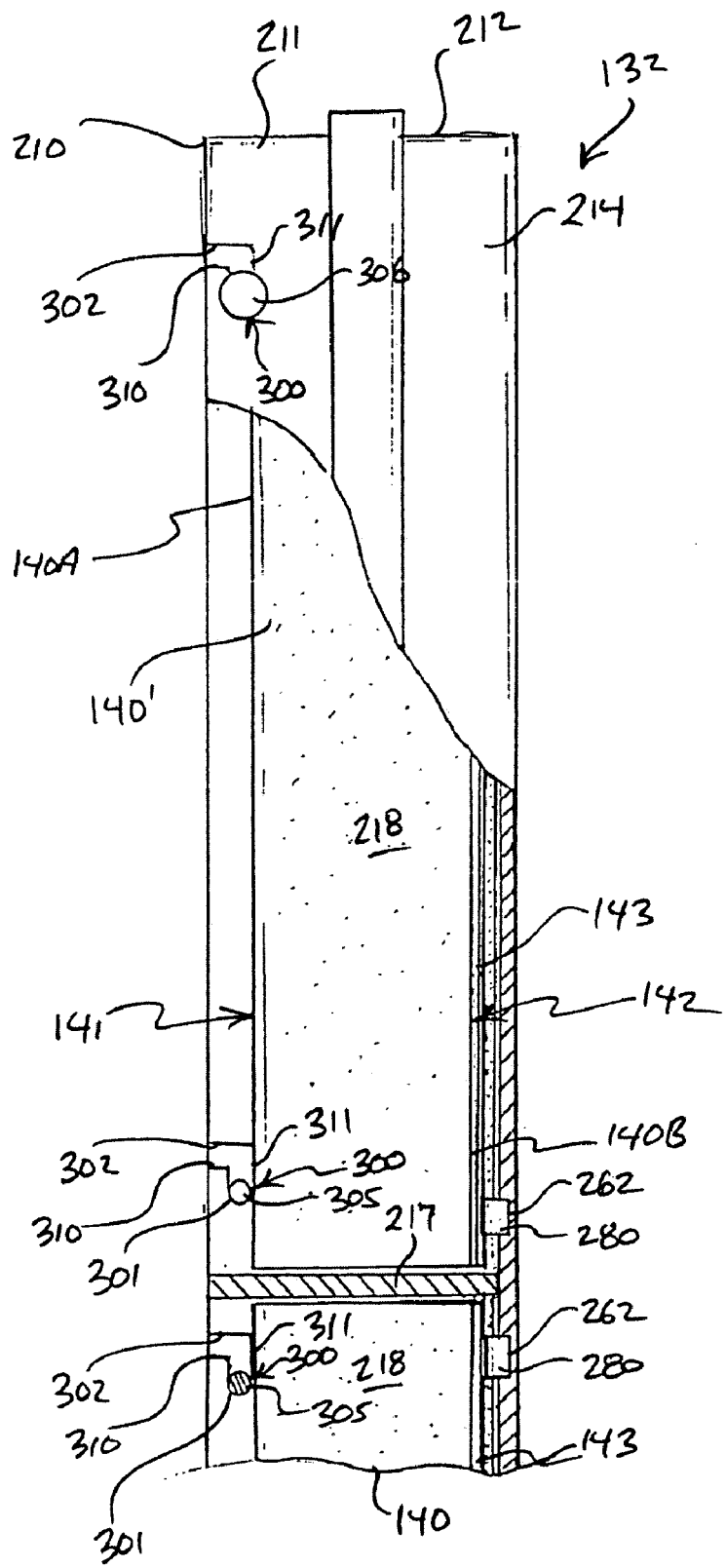
FIG. 27 is a fragmented side elevational view of the filter assembly of FIG. 26 with portions thereof shown in vertical cross section for illustrative purposes.

FIG. 27 is a fragmented side elevational view of filter assembly 132 with a portion thereof shown in vertical cross section showing rods 301 as they would appear received and maintained in down-turned portions 311 of corresponding slots 302, and forcibly applied against the upstream faces 140A of adjacent filters 140 thereby urging filters 140 toward downstream side 210B of framework 210 away from upstream side 210A thereby urging the corresponding downstream electrodes 143 against the electrical contacts formed on downstream side 210A of framework 210. In FIG. 27, free ends 280 of electrical contacts 262 are illustrated, one free end 280 of one electrical contact 262 contacting the downstream electrode 143 of uppermost filter 140', and the free end 280 of the opposed electrical contact 262 contacting the downstream electrodes 143 of the corresponding lowermost filter 140 underlying filter 140'. FIG. 23 illustrates opposed rods 301 received in corresponding slots 302 formed in the upstream edges of side member 214 and vertical support 216, in which the lengths 305 of rods 301 are illustrated applied against upstream face 140A of filter 140'. FIG. 26 is an exemplary drawing illustrating a rod 301 received and maintained in slots 302 interacting against upstream faces 140A of adjacent filters 140' and 140 urging downstream electrodes 143 of filters 140' and 140 against electrodes 260 and 262.

Referencing FIG. 30, each rod 301 defines a longitudinal axis A extending from end 303 to end 304. Structure is provided that interacts between each rod 301 and framework 210 preventing movement of each rod 301 relative to framework 210 along longitudinal axis A of each rod 301. In the present embodiment, rods 301 support stops 306. The stops 306 of each rod 301 interact with framework 210 preventing the rod 301 from moving relative to framework 210 along longitudinal axis A. In the present embodiment, stops 306 are enlargements carried by ends 303 and 304 of each rod 301. Stop 303 is located outboard of side member 214, and stop 215 is located outboard of side member 215, and together stops 306 interact with side members 214 and 215, respectively, preventing movement of the rod 301 along longitudinal axis A. If desired, one or more stops may be applied at an intermediate location so as to interact with vertical support 216.

The structural details of filter assembly 132 have been described. As previously mentioned, filter assemblies 132 and 133 are substantially identical, and the discussion above relating to filter assembly 131 applies to filter assembly 133. One difference between filter assembly 132 and filter assembly 133 is that electrical contacts 261, and the corresponding electrical contacts 294 integral therewith, of filter assembly 133 are attached to framework 210 at side member 214, in which case electrical contacts 294 project outwardly relative to side member 214 of framework 210 of filter assembly 133. FIG. 32 illustrates this aspect showing side member 214 of framework 210 of filter assembly 133, electrical contact 261 mounted to framework 210 at side member 214 of filter assembly 133, and electrical contact 294 integral with electrical contact 261 projecting outwardly relative to side member 214 of filter assembly 133.

Figure 31:
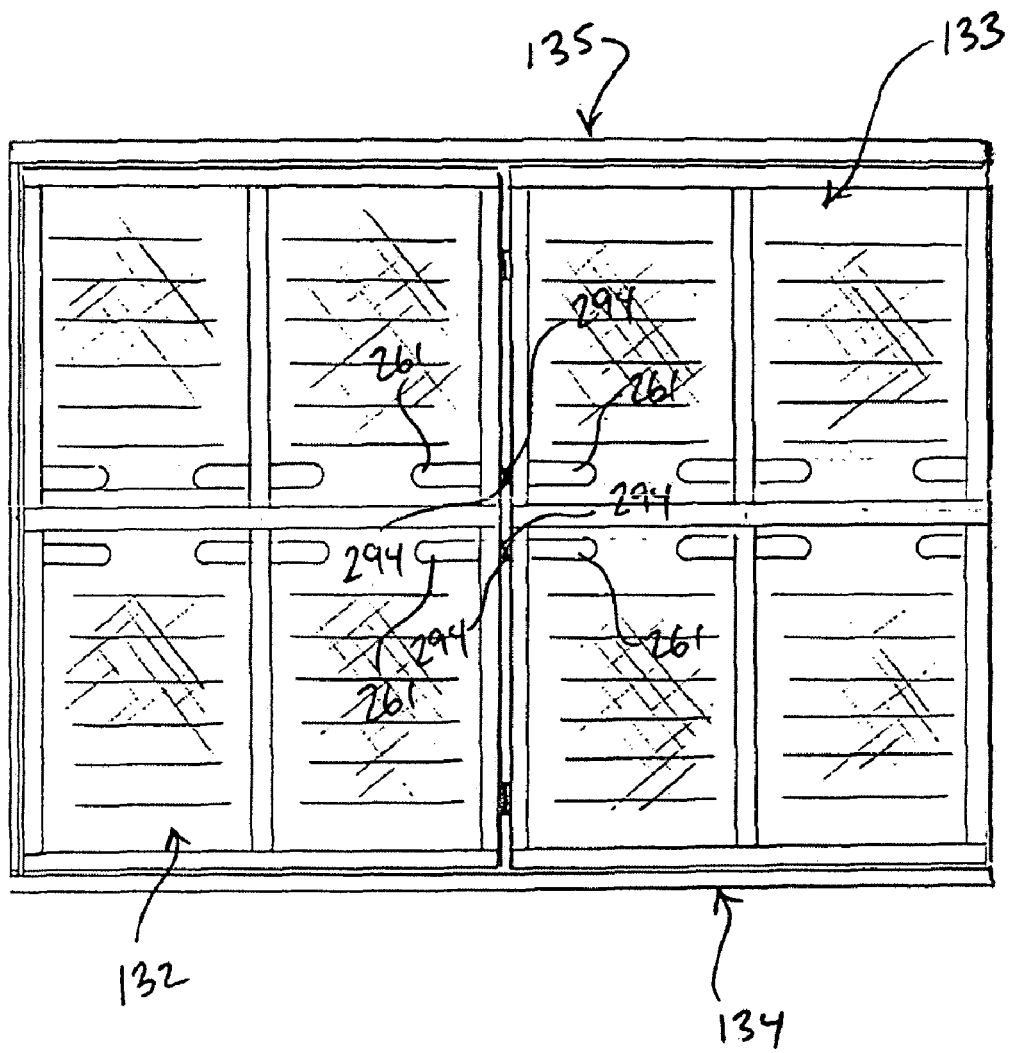
FIG. 31 is a highly generalized rear elevational view of the electrically stimulated air filter apparatus of FIG. 7.

As previously mentioned, when filter apparatus 120 is assembled downstream electrodes 143 of filters of filter assembly 132 are electrically connected to downstream electrodes 143 of filters 140 of filter assembly 133. Electrical contacts 261 between filter assemblies 132 and 133 provide this electrical connection. In particular, when filter apparatus 120 is assembled filter assemblies 132 and 133 are mounted side-by-side and extend upright and together reside in a common vertical plane, in which side member 215 of filter assembly 132 faces and confronts side member 214 of filter assembly 133 as illustrated in FIGS. 32 and 31. Electrical contacts 261, and electrical contacts 294 integral therewith, between filter assembly 132 and filter assembly 133 relate, whereby electrical contacts 294 of filter assembly 132 contact electrical contacts 294 of filter assembly 133 thereby electrically connecting downstream electrodes 143 of filters 140 of filter assembly 132 to downstream electrodes 143 of filters 140 of filter assembly 133, in accordance with the principle of the invention.

The structural details of ionizer assemblies 130 and 131 and filter assemblies 132 and 133 have been discussed in detail. The balance of this specification relates to the installation and implementation of the assembled filter apparatus 120 with air conditioning system 100 referenced in FIGS. 1 and 3. Referring to FIG. 3, to install filter apparatus 120 a portion of housing 102 is removed revealing air conditioning apparatus 108 disposed in air flow pathway 109 extending through housing 102 as specified FIG. 3. The installation of filter apparatus 120 begins first with the installation of supports 134 and 135 referenced in FIG. 6.

Supports 134 and 135 are tracks that are attached to housing 102 and which, in turn, receive and hold ionizer assemblies 130 and 131 and filter assemblies 132 and 133 forming filter apparatus 120. Referring to FIG. 6, supports 134 and 135 are substantially coextensive, and are each formed of plastic, polyethylene, or other non-conductive material or combination of non-conductive materials. Support 134 consists of an elongate fixture 330 including a lower surface 331, an opposed upper surface 332, and opposed ends 333 and 334. Formed in upper surface 331 are two, opposed parallel grooves 335 and 336, which run along the entire length of fixture 330 from end 333 to end 334. Support 135 consists of an elongate fixture 340 including an upper surface 341, an opposed lower surface 342, and opposed ends 343 and 344. Formed in lower surface 342 are two, opposed parallel grooves 345 and 346, which run along the entire length of fixture 340 from end 343 to end 344. Upper and lower members 172 and 173 of frameworks 170 of ionizer assemblies 130 and 131 incorporate elongate tongues 350 and 351, respectively, which relate to grooves 345 and 335 of supports 340 and 330, respectively. Upper and lower members 212 and 213 of frameworks 210 of filter assemblies 132 and 133 incorporate elongate tongues 352 and 353, respectively, which relate to grooves 346 and 336 of supports 340 and 336, respectively.

Figure 36:
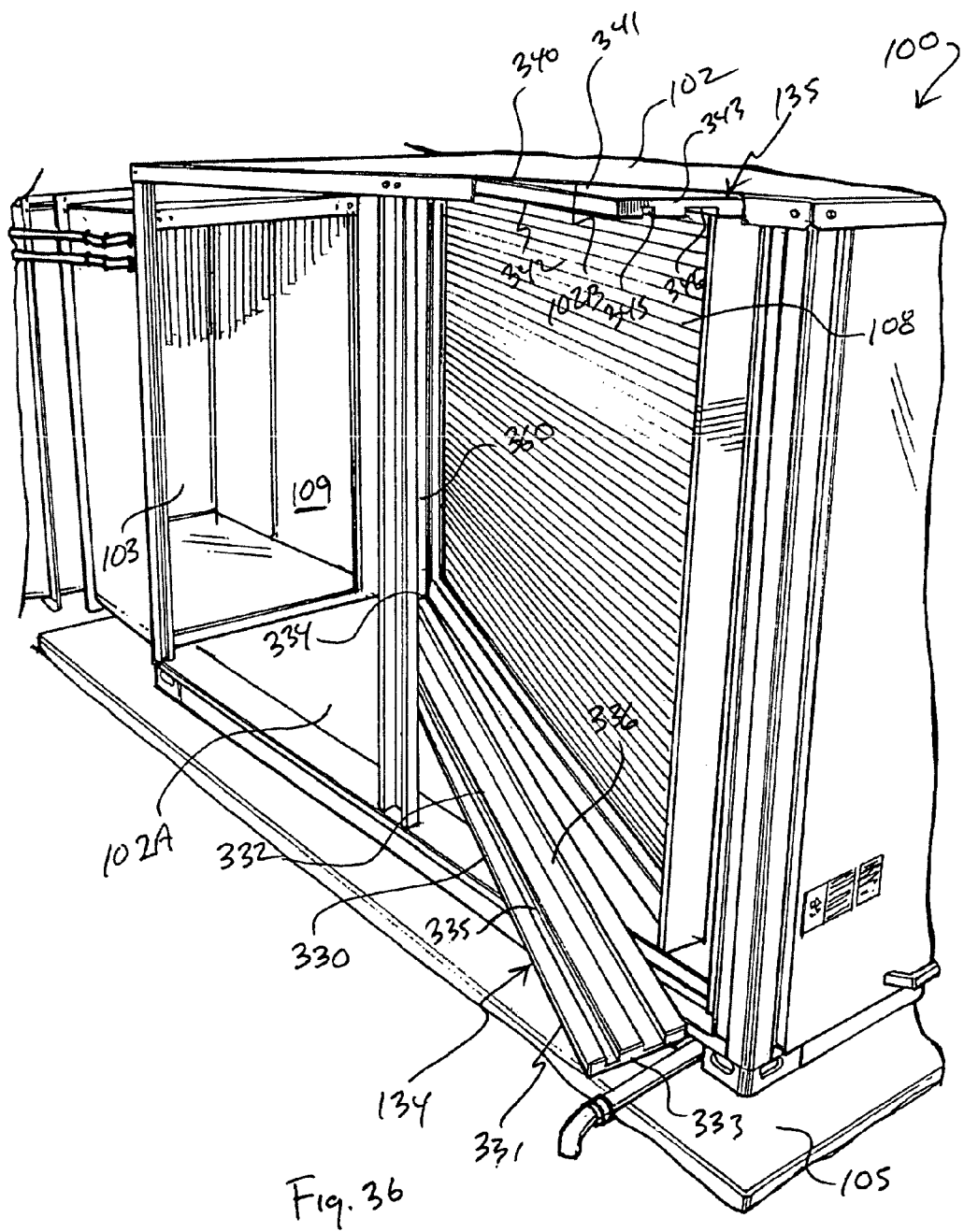
FIG. 36 is a view very similar to that of FIG. 3 illustrating the supports of the electrically stimulated air filter apparatus of FIG. 6 attached to the housing upstream of the air conditioning apparatus.

Looking to FIG. 36 supports 134 and 135 are mounted interiorly to housing 102 and are directed toward, and reside in, air flow pathway 109 between air conditioning apparatus 108 and inlet 103. Supports 134 and 135 are spaced upstream of and parallel to air conditioning apparatus 108. Support 134 is the lower support and is mounted interiorly to the floor 102A of housing, and support 135 is the upper support and is mounted interiorly to ceiling 102B of housing 102. Lower surface 331 of support 134 is flat and is applied against floor 102A of housing 102, and is secured in place with adhesive, rivets, screws, or the like. Upper surface 341 of support 135 is flat and is applied against ceiling 102B of housing 102, and is secured in place with adhesive, rivets, screws, or the like. At this point, an end plate 360 referenced in FIGS. 6 and 36 may be affixed between ends 334 and 344 (end 344 not shown in FIG. 36). Having installed supports 134 and 135, ionizer assemblies 130 and 131 and filter assemblies 132 and 133 may now be installed, in accordance with the principle of the invention.

Figure 35:
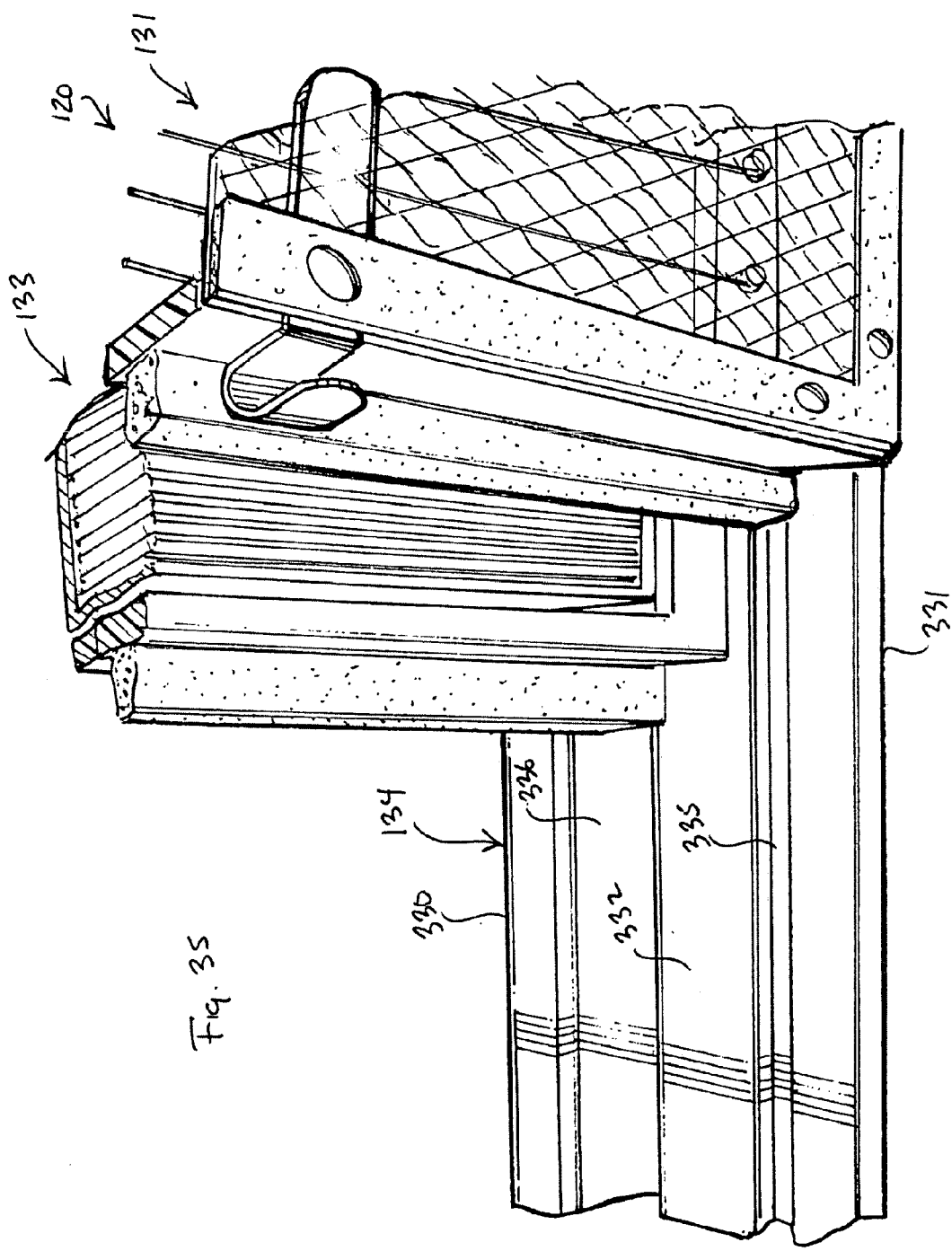
FIG. 35 is a fragmented perspective view of the electrically stimulated air filter apparatus of FIG. 6 illustrating opposed filter and ionizer assemblies received by one of the supports.
Figure 37:
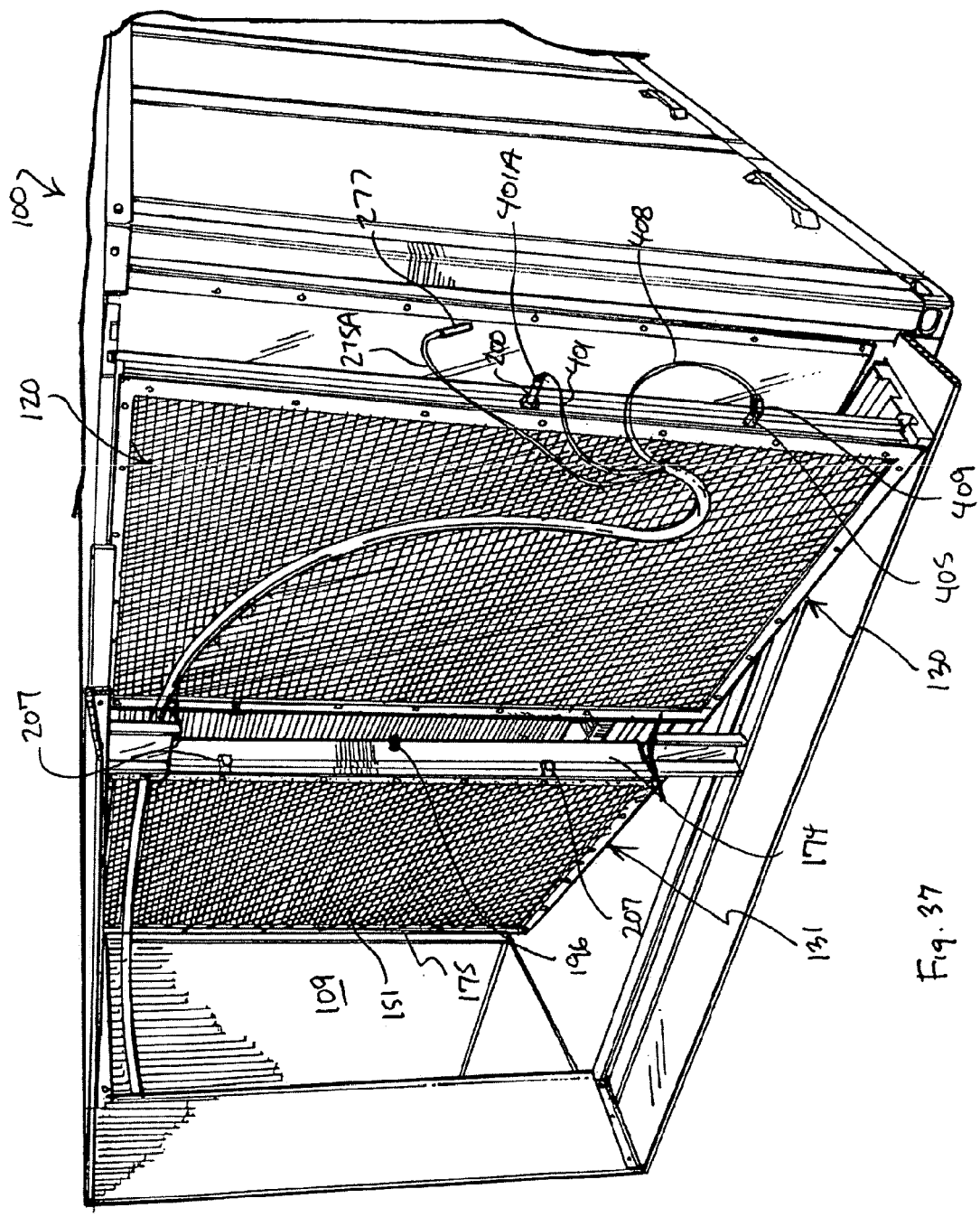
FIG. 37 is a view very similar to that of FIG. 36 illustrating ionizer assemblies of the electrically stimulated air filter apparatus of FIG. 6 shown mounted between the supports.

To install ionizer assemblies 130 and 131, ionizer assembly 131 is taken up and held upright with upstream electrode 151 facing away from air conditioning apparatus 108 toward inlet 103, ionizer electrodes 150 facing toward air conditioning apparatus 108, upper member 172 facing lower surface 342 of support 135 and lower member 173 facing upper surface 332 of support 134. Tongues 350 and 351 are applied to grooves 345 and 335 at ends 343 and 333 of supports 135 and 134, and ionizer assembly 131 is then simply slide inwardly along supports 135 and 134 until side member 175 is applied against end plate 360 connected between ends 344 and 334 of supports 135 and 134 as illustrated in FIG. 37. In FIG. 37, electrical contacts 207 electrically connected to upstream electrode 151 of ionizer assembly 131, and electrical contact 196 electrically connected to ionizer electrodes 150 (not illustrated in FIG. 37) are each illustrated extending away from side member 174 of framework 170 of ionizer assembly 131. As a matter of illustration, FIG. 35 illustrates support 134 and ionizer assembly 131 disposed atop upper surface 332 of support 134 as ionizer assembly 131 would appear being slide along support 134 in the installation of filter apparatus 120. After ionizer assembly 131 is installed, ionizer assembly 130 may then be installed.

To install ionizer assembly 130, ionizer assembly 130 is taken up and held upright with upstream electrode 151 facing away from air conditioning apparatus 108 toward inlet 103, ionizer electrodes 150 facing toward air conditioning apparatus 108, upper member 172 facing lower surface 342 of support 135 and lower member 173 facing upper surface 332 of support 134. Tongues 350 and 351 of ionizer assembly 130 are applied to grooves 345 and 335 at ends 343 and 333 of supports 135 and 134, and ionizer assembly 130 is then simply slide inwardly along supports 135 and 134 until side member 175 is juxtaposed relative to side member 174 of ionizer assembly 131 and electrical contacts 207 disposed along side member 175 of ionizer assembly 130 engage and thereby electrically contact the corresponding electrical contacts 207 disposed along side member 174 of ionizer assembly 131, and electrical contact 196 disposed along side member 175 of ionizer assembly 130 engages and thereby electrically contacts the corresponding electrical contact 196 disposed along side member 174 of ionizer assembly 131. In response to electrical contacts 207 disposed along side member 175 of ionizer assembly 130 engaging and thereby electrically contacting the corresponding electrical contacts 207 disposed along side member 174 of ionizer assembly 131, upstream electrodes 151 of ionizer assembly 130 is electrically connected to upstream electrode 151 of ionizer assembly 131, in accordance with the principle of the invention. In response to electrical contact 196 disposed along side member 175 of ionizer assembly 130 engaging and thereby electrically contacting the corresponding electrical contact 196 disposed along side member 174 of ionizer assembly 131, ionizer electrodes 150 of ionizer assembly 130 are electrically connected to ionizer electrodes 150 and ionizer assembly 131, in accordance with the principle of the invention.

To install filter assemblies 132 and 133, filter assembly 133 is taken up and held upright with upstream face 141 of filters 140 facing away from air conditioning apparatus 108 toward ionizing electrodes 150 of ionizer assemblies 130 and 131, downstream electrodes 143 of filters 140 facing toward air conditioning apparatus 108, upper member 212 facing lower surface 342 of support 135 and lower member 213 facing upper surface 332 of support 134. Tongues 352 and 353 are applied to grooves 345 and 335 at ends 343 and 333 of supports 135 and 134, and filter assembly 133 is then simply slide inwardly along supports 135 and 134 until side member 215 is applied against end plate 360 connected between ends 344 and 334 of supports 135 and 134 as illustrated in FIG. 31. In FIG. 31, electrical contacts 294 electrically connected to downstream electrodes 143 of filter assembly 133 are each illustrated extending away from side member 214 of framework 210 of filter assembly 133. As a matter of illustration, FIG. 35 illustrates support 134 and filter assembly 133 disposed atop upper surface 332 of support 134 as filter assembly 133 would appear being slide along support 134 in the installation of filter apparatus 120. After filter assembly 133 is installed, filter assembly 132 may then be installed.

To install filter assembly 132, filter assembly 132 is taken up and held upright upstream face 141 of filters 140 of filter assembly 132 facing away from air conditioning apparatus 108 toward ionizing electrodes 150 of ionizer assemblies 130 and 131, downstream electrodes 143 of filters 140 of filter assembly 132 facing toward air conditioning apparatus 108, upper member 212 facing lower surface 342 of support 135 and lower member 213 facing upper surface 332 of support 134. Tongues 352 and 353 of filter assembly 132 are applied to grooves 345 and 335 at ends 343 and 333 of supports 135 and 134, and filter assembly 132 is then simply slide inwardly along supports 135 and 134 toward filter assembly 133 until side member 215 is juxtaposed relative to side member 214 of filter assembly 133 and electrical contacts 294 disposed along side member 215 of filter assembly 132 engage and thereby electrically contact the corresponding electrical contacts 294 disposed along side member 214 of filter assembly 133. In response to electrical contacts 294 disposed along side member 215 of filter assembly 132 engaging and thereby electrically contacting the corresponding electrical contacts 294 disposed along side member 214 of filter assembly 133, downstream electrodes 143 of filter assembly 132 are electrically connected to downstream electrodes 143 of filter assembly 133, in accordance with the principle of the invention. Upon installation of ionizer assemblies 130 and 131 and filter assemblies 132 and 133 with respect to supports 134 and 135 as herein explained, filter apparatus 120 is formed and installed in air flow pathway 109 as illustrated in FIG. 4 between inlet 103 and air conditioning apparatus 108 (not shown in FIG. 4). At this point, end plate 361 may be secured to side members 174 and 214 of ionizer and filter assemblies 130 and 132, respectively as illustrated in FIG. 8. After making the required electrical connections grounding downstream electrodes 143 of filter assemblies 132 and 133, and electrically connecting ionizer electrodes 150 of ionizer assemblies 130 and 131 to a direct current power supply for supplying the required potential to ionizer electrodes 150 of ionizer assemblies 130 and 131, cover 110 referenced in FIG. 2 may be secured to housing 102 completing the installation of filter apparatus 120.

Upon completion of the installation of ionizer assemblies 130 and 131 and filter assemblies 132 and 133 as herein described, ionizer assemblies 130 and 131 are mounted side-by-side relative to air stream A passing along air flow pathway 109, filter assemblies 132 and 133 are mounted side-by-side relative to air stream A passing through air flow pathway 109 opposing and downstream of ionizer assemblies 130 and 131, ionizer electrodes 150 of ionizer assembly 130 are electrically connected to ionizer electrodes 150 of ionizer assembly 131, upstream electrode 151 of ionizer assembly 130 is electrically connected to ionizer electrode 151 of ionizer assembly 131, and downstream electrodes 143 of filters 140 of filter assembly 132 are electrically connected to downstream electrodes 143 of filters 140 of filter assembly 133. Ionizer assemblies 130 and 131 extend upright and together reside in a common vertical plane, and filter assemblies 132 and 133 are upright and together reside in a common vertical plane opposing and parallel to the common vertical plane in which ionizer assemblies 130 and 131 reside. The vertical planes defined by ionizer assemblies 130 and 131, and filter assemblies 132 and 133 are substantially perpendicular relative to oncoming air stream A which flows first through ionizer assemblies 130 and 131 and then through filter assemblies 132 and 133.

As previously discussed, and which is again discussed here for clarity, ionizer assemblies 130 and 131 each supportionizer electrodes 150, and an upstream electrode 151. Ionizer electrodes 150 are supported in a common vertical plane denoted at P2 in FIG. 2 in air stream A upstream of, and parallel to, upstream face 141 of filters 140 and plane P1 defined by downstream electrodes 143. Ionizer electrodes 150 are substantially equally sized and identical in structure, the details of which will be discussed later in this specification. Ionizer electrodes 150 of ionizer assembly 130 are electrically connected, ionizer electrodes 150 of ionizer assembly 131 are electrically connected, and ionizer electrodes 150 of ionizer assembly 130 are electrically connected to ionizer electrodes 150 of ionizer assembly 131. It is to be understood that upstream electrodes 151 of ionizer assemblies 130 and 131 are supported in vertical plane denoted at P3, ionizer electrodes 150 of ionizer assemblies 130 and 131 are supported in vertical plane P2, and downstream electrodes 143 of filters 140 of filter assemblies 132 and 133 are supported in vertical plane P1. Planes P1-P3 are parallel relative to each other and preferably to air conditioning apparatus 108, whereby distance D1 separates plane P3 from plane P2, and distance D2 separates plane P2 from plane P1.

In operation, and with reference to FIG. 8, a potential is applied to ionizer electrodes 150 of ionizer assemblies 130 and 131. The potential applied to ionizer electrodes 150 imparts through induction a potential to upstream electrodes 151 of ionizer assemblies 130 and 131 forming ionizing field 160 between upstream electrodes 151 and ionizer electrodes 150 in juxtaposition along upstream electrodes 151, and a potential to downstream electrodes 143 forming ionizing field 161 between downstream electrodes 143 and ionizer electrodes 150 in juxtaposition along downstream electrodes 143. The engagement of each downstream electrode 143 against a corresponding filter 140 imparts ionizing field 161 to filters 140 and maintains ionizing field 161 with filters 140, according to the principle of the invention.

The potential applied to ionizing electrodes 150 is substantially uniformly dispersed across ionizer electrodes 150 of ionizer assemblies 130 and 131 because, as herein described, ionizer electrodes 150 of ionizer assembly 130 are electrically connected, ionizer electrodes 150 of ionizer assembly 131 are electrically connected, and ionizer electrodes 150 of ionizer assemblies 130 and 131 are electrically connected. Moreover, the induced potential formed in upstream electrodes 151 of ionizer assemblies 130 and 131 is also substantially uniformly dispersed across upstream electrodes 151 because upstream electrodes 151 of ionizer assemblies 130 and 131 are electrically connected as herein described. Because the potential applied to ionizer electrodes 150 is substantially uniformly dispersed across ionizer electrodes 150 and because the induced potential across upstream electrodes 151 is also substantially uniformly dispersed across upstream electrodes 151, ionizing field 160 formed along upstream electrodes 151 between upstream electrodes 151 and ionizer electrodes 150 is, thereby, substantially uniform, in accordance with the principle of the invention.

Again, the induced potential formed in downstream electrodes 143 is substantially uniformly dispersed across downstream electrodes 143 of filters 140 of filter assemblies 132 and 133 because, as herein specifically described, downstream electrodes 143 of filter assembly 132 are electrically connected, downstream electrodes 143 of filter assembly 133 are electrically connected, and downstream electrodes 143 of filter assembly 132 are electrically connected to downstream electrodes 143 of filter assembly 133. Because the potential applied to ionizer electrodes 150 is substantially uniformly dispersed across ionizer electrodes 150, as discussed above, and because the induced potential across downstream electrodes 143 is also substantially uniformly dispersed across downstream electrodes 143, ionizing field 161 formed along downstream electrodes 143 between downstream electrodes 143 and ionizer electrodes 150 is, thereby, substantially uniform.

Again, the potential across ionizer electrodes 150 is positive, and the potentials across upstream electrodes 151 and downstream electrodes 143 are each also positive but lesser in magnitude in comparison to the potential across ionizer electrodes 150. Because the positive potentials across upstream electrodes 151 and downstream electrodes 143 are each lesser in magnitude than the positive potential applied across ionizer electrodes 150, upstream electrodes 151 and downstream electrodes 143 are net negatively charged as compared to the potential across ionizer electrodes 150.

Through induction, positively charged electrons flow or otherwise migrate from ionizer electrodes 150 across distance D1 to upstream electrodes 151 and to downstream electrodes 143, thereby forming the induced potential in upstream electrodes 151 and the induced potential in downstream electrodes 143, according to the principle of the invention. As the positively charged electrons generated by ionizer electrodes 150 reach upstream electrodes 151 and induce the potential in upstream electrodes 151, ionizing field 160 is formed along upstream electrodes 151 between upstream electrodes 151 and ionizer electrodes 150. Ionizing field 160 is positive, but is lesser in magnitude in comparison to the potential across ionizer electrodes 150 and therefore has a net negative charge as compared to the potential across ionizer electrodes 150. As the positively charged electrons generated by ionizer electrodes 150 reach downstream electrodes 143 and induce the potential in downstream electrodes 143, ionizing field 161 is formed along downstream electrodes 143 between downstream electrodes 143 and ionizer electrodes 150. Ionizing field 161 is positive, but is lesser in magnitude in comparison to the potential across ionizer electrodes 150 and therefore has a net negative charge as compared to the potential across ionizer electrodes 150. According to the principle of the invention as previously indicated, the contact or engagement of each downstream electrode 143 against a corresponding filter 140 imparts and maintains ionizing field 161 in filters 140, thereby imparting or otherwise inducing a positive charge to filters 54, which is lesser in magnitude than the positive charge across ionizer electrode 55.

Air stream A passes through filter apparatus 120 along air flow pathway 109 from inlet in a direction from upstream electrodes 151 of ionizer assemblies 130 and 131 to downstream electrodes 143 of filter assemblies 132 and 133 and then to air conditioning apparatus 108. As air stream A passes through filter apparatus 120, air stream A passes first through upstream electrodes 151 and then through ionizing field 160. As particles conveyed by air stream A, such as dust particles, mold particles, microbial particles, smoke particles, and other air-borne particles, encounter ionizing field 160, ionizing field 160 imparts or otherwise induces a potential or electric charge to the particles suspended in air stream A causing the particles to become attracted to each other forming clusters of the particles, which are then conveyed by air stream A downstream through ionizer electrodes 150 to filters 143, which entraps the clusters of particles thereby removing the clusters of particles from air stream A. The clusters of particles formed by the interaction of the particles with ionizing field 160 are positively charged. The positive charge to the clusters is imparted to the clusters by ionizing field 160, and is lesser in magnitude than the positive charge of ionizing field 161 applied across filters 140. Accordingly, as the clusters of particles reach filters 140, the net negative charge applied to the clusters as compared to the net positive charge applied across filters 140 by ionizing field 161 causes the clusters to be electrically attracted to filters 140 thereby producing an aggressive and comprehensive removal of the clusters of particles from air stream A by filters 140 and a highly efficient and effective filtration efficiency, according to the principle of the invention.

When particles pass through ionizing field 160, not only do the particles become attracted to one another to form clusters, a churning motion caused by the Van Der Walls Effect is imparted to the particles, which helps the particles impact one another and group together to form clusters of particles. The potential imparted to filters 140 by ionizing field 161 attracts and adheres the clusters of particles to filters 140, according to the principle of the invention.

Ionizer electrodes 150 are energized by a high voltage direct current power supply 400 illustrated in FIG. 5. Preferably, ionizer electrodes 150 are electrically connected to a power supply 400 before cover 110 is attached to enclose housing 102 after the installation of filter apparatus 120. In the present embodiment, plug 200, illustrated in FIGS. 4 and 37, is electrically connected to receive power from power supply 400, whereby plug 200 conveys the supplied power to ionizer electrodes 150 via supply wires 201 and 202 of ionizer assemblies 130 and 131. A plug 401A of electrical wiring 401 is electrically connected to plug 200 thereby electrically connecting power supply 400 to plug 200, which is referenced in FIGS. 4 and 37. The electrical connection of plug 200 to power supply 400 is made before cover 110 is applied to enclose the installed filter apparatus 120 in air flow pathway 109 through housing 102. When energized, power supply 400 imparts a potential, namely, a positive potential, to ionizer electrodes 150 of ionizer assemblies 130 and 131.

In the present embodiment, power supply 400 is disposed exteriorly of air flow pathway 109, and is mounted in housing 122 forming part of control system 121. As seen in FIG. 2, control system 121 including housing 122 is mounted to a large duct coupling the interior of building an air communication with inlet 103 leading to air flow pathway 109 through housing 102, although control system 121 may be mounted at any suitable location. Power supply 400 supplies ionizer electrodes 150 of ionizer assemblies 130 and 131 with power and thereby controls the operation of filter apparatus 120.

Power supply 400 is an AC to DC high voltage power supply, which provides high voltage to ionizer electrodes 150 of ionizer assemblies 130 and 131 forming the potential thereacross. For filter apparatus 120 to operate according to desired specifications as disclosed herein, preferably power supply 400 provides a voltage of approximately 14-30 KVDC, with a preferred operating voltage being approximately 15.5 KVDC. Again, because ionizer electrodes 150 of ionizer assemblies 130 and 131 are electrically connected, the potential applied to ionizer electrodes 150 of ionizer assemblies 130 and 131 from power supply 400 is substantially uniformly dispersed across ionizer electrodes 150 of ionizer assemblies 130 and 131. Based on the operating voltage range provided by power supply 400, distance D1 between ionizer electrodes 150 and upstream electrodes 151 is preferably 1-3 inches, with a preferred distance D1 being approximately 1.8 inches based on the preferred operating voltage of approximately 15.5 KVDC. Distance D2 between ionizer electrodes 150 and downstream electrode 143 is not overly critical to the function of filter apparatus 120 according to the structure of filter apparatus 120 herein disclosed. According to the preferred embodiment disclosed herein, distance D2 is preferably is approximately 5-10 inches.

As previously explained, the magnitude of ionizing fields 160 and 161 is determined principally by the voltage provided by power supply 400 across ionizer electrodes 150, in addition to the magnitude of distances D1 and D2. Accordingly, the operating or filtering characteristics may be selectively determined by selecting the power applied by power supply 400. The selected intensity of ionizing fields 160 and 161, and more importantly ionizing field 160, is largely dependent on specific needs and applications.

Downstream electrodes 143 are preferably grounded, preferably before cover 110 is attached to enclose housing 102 after the installation of filter apparatus 120. Downstream electrodes 143 may be grounded directly to an earth ground and/or to the negative side of power supply 400. As a matter of example, a plug 277 of ground electrical wiring 275A (FIG. 37) is plugged into plug 276 wired to proximal ends 270 of electrical contacts 260 of filter assembly 132 and the negative side of power supply 400 as illustrated in FIG. 5, which provides the grounding of downstream electrodes 143 of filter assemblies 132 and 133. The electrical connection grounding downstream electrodes 143 is made before cover 110 is applied to enclose the installed filter apparatus 120 in air flow pathway 109 through housing 102.

At a fixed or predetermined voltage of power supply 400 as previously mentioned, the operating or filtering characteristics of filter apparatus 120 may be determined by selecting the voltage applied by power supply 400. Again, the selected intensity of ionizing fields 60 and 61, and more importantly ionizing field 60, is largely dependent on specific needs and applications. Alternatively, power supply 400 may be a variable voltage power supply, in which the applied voltage may be increased or decreased so as to maintain the same level of current across filter apparatus 120. The voltage provided by power supply 400 across ionizer electrodes 150 may be required to float up or down depending on the loading of filters 140 over time, as well as independent factors such as humidity and/or temperature so as to maintain the predetermined current level across filter apparatus 120. This predetermined level of current is directly proportional to the effectiveness of filter apparatus 120 and may require the voltage to be floating and variable according to a various factors that may impact the operational characteristics of filter apparatus 120.

In a particular embodiment, upstream electrodes 151 are connected to a resistor used to control the induced potential applied across upstream electrodes for reducing the incidence of arcing and to reduce excess production of ozone. Upstream electrodes 151 are electrically connected to a resistor, preferably before cover 110 is attached to enclose housing 102 after the installation of filter apparatus 120. FIG. 8 illustrates an electrical plug 405, such as a banana plug or other suitable electrical plug, formed in side member 174 of framework 210 of ionizer assembly 130, which is electrically connected to upstream electrode 151 of ionizer assembly 140 with a wire 406. Plug 405 is, in turn, electrically coupled to a corresponding plug 409 that, in turn, is coupled to a resistor 407 mounted in housing 122 with electrical wire 408. Resistor 407 is grounded and may be set to a predetermined voltage value to achieve a selected magnitude of the potential across upstream electrodes 151 of ionizer assemblies 130 and 131 and thus a selected magnitude of ionizing field 160. Resistor 407 may be set to any selected voltage value for establishing a selected magnitude of the potential across upstream electrodes 151 of ionizer assemblies 130 and 131 for establishing a selected magnitude of ionizing field 160 and for reducing arcing and for reducing excess production of ozone.

Those having regard for the art will readily appreciate that a highly efficient modular electrically stimulated air filter apparatus is disclosed, which is easy to construct, easy to assemble, and easy to install in conjunction with a large-scale air conditioning system as herein described. Although filter apparatus 120 is discussed herein in connection with a 20-ton air conditioning apparatus 108, filter apparatus 120 may be employed in connection with air conditioning systems of varying sizes. Furthermore, the various elements of filter apparatus 120 may be scaled or multiplied as needed for meeting specific needs. For instance, although filter apparatus 120 incorporates two ionizer assemblies 130 and 131, less or more may be utilized. Although filter apparatus 120 incorporates two filter assemblies 132 and 133, less or more may be utilized. Furthermore, although filter assemblies 132 and 133 each utilize four filters 140, less ore more may be utilized. Still further, the sizes of the various components of the invention may be selected for meeting any desired need or implementation. To ensure complete air filtering, strips 256 of foam rubber may be applied to frameworks 170 and 210 of ionizer assemblies 130 and 131 and filter assemblies 132 and 133 for interacting between frameworks 170 of ionizer assemblies 130 and 131 for preventing air from flowing therebetween, for interacting between frameworks 210 of filter assemblies 132 and 133 for preventing air from flowing therebetween, for interacting between frameworks 170 of ionizer assemblies 130 and 131 for preventing air from flowing between frameworks 170 and supports 134 and 135 and also end plates 360 and 361, and for interacting between frameworks 210 of filter assemblies 132 and 133 for preventing air from flowing between frameworks 210 and supports 134 and 135 and also end plates 360 and 361. Strips 256 of foam rubber may be applied between ionizer assemblies 130 and 131, between filter assemblies 132 and 133, and between assemblies 130-133 and supports 145 and 134 and end plates 360 and 360 in any desired manner for limiting air flow along the regions of the applied strips 256 of foam rubber. Strips 256 of foam rubber are referenced throughout the various figures for illustration and reference.

Filter apparatus 120 is exemplary for removing particles from air stream A upstream of air conditioning apparatus 108 for providing clean, conditioned air to the interior spaces of a building. The particles filter apparatus 120 can remove include such particles as dust particles, mold particles, microbial particles, smoke particles, and other air-borne particles. Ionizer assemblies 130 and 131 and filter assemblies 132 and 133 are easy to construct offsite, easy to transport to a given installation, and easy to install in connection with an existing large-scale air conditioning system as herein discussed. Filter apparatus 120 is useful in that filter apparatus 120 provides for the efficient and exemplary removal of particles from an air stream, provides for the suppression of odors in odoriferous air caused by particles that impart undesired odors, such as air contaminated with cigarette smoke, and is capable of removing particles such as germs and other microbial agents from an air stream, including contagious airborne pathogen particles, legionella particles, sars particles, *bacillus subtilis* particles, *serratia merescens* particles, *aspergillus versicolor* particles, etc. Also, tests conducted with filter apparatus 120 show that exposure of germs and microbial particles, such as *bacillus subtilis, serratia merescens, aspergillus versicolor*, and the like, trapped in filters 140 to the electrostatic fields generated by filter apparatus 120 kill or otherwise neutralize such particles, according to the principle of the invention.

In the preferred embodiment herein described, ionizer assemblies 130 and 131 extend upright and together reside in a common vertical plane, and filter assemblies 132 and 133 are upright and together reside in a common vertical plane opposing and parallel to the common vertical plane in which ionizer assemblies 130 and 131 reside. It is to be understood that ionizer assemblies 130 and 131 and filter assemblies 132 and 133, which together form filter apparatus 120, may be disposed substantially horizontally or at other selected angle relating to an oncoming air stream without departing from the invention.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A method comprising steps of:
   providing an air stream flowing through an airflow pathway between upstream and downstream locations;
   positioning filters in the airflow pathway to entrap contaminants in the air stream passing through the airflow pathway, the filters cooperating to form an upstream face facing the upstream location and an opposed downstream face facing the downstream location;
   positioning downstream electrodes in the airflow pathway each contacting one of the filters;
   electrically interconnecting the downstream electrodes;
   positioning an ionizer electrode in the airflow pathway between the upstream location and the upstream face formed by the filters;
   positioning an upstream electrode in the airflow pathway between the upstream location and the ionizer electrode; and
   applying a first potential to the ionizer electrode imparting through induction a) a second potential to the upstream electrode forming a first ionizing field between the upstream electrode and the ionizer electrode, and b) a third potential to the downstream electrodes, the electrical interconnection between the downstream electrodes substantially uniformly dispersing the third potential across the downstream electrodes forming a substantially uniform second ionizing field between the downstream electrodes and the ionizer electrode.

2. The method according to claim 1, further comprising electrically isolating the upstream electrode to inhibit arcing from occurring at the upstream electrode.

3. The method according to claim 1, further comprising grounding the downstream electrodes.

4. The method according to claim 1, further comprising coupling a resistor to the upstream electrode and adjusting the resistor to obtain a predetermined value of the first potential.

5. The method according to claim 1, wherein the step of positioning filters in the airflow pathway further comprises positioning a framework in the airflow pathway, and mounting the filters to the framework.

6. The method according to claim 1, wherein the step of positioning downstream electrodes in the airflow pathway each contacting one of the filters further comprises positioning a framework in the airflow pathway, and mounting the downstream electrodes to the framework.

7. The method according to claim 1, wherein the step of positioning the ionizer electrode in the airflow pathway further comprises positioning a framework in the airflow pathway, and mounting the ionizer electrode to the framework.

8. The method according to claim 1, wherein the step of positioning the upstream electrode in the airflow pathway further comprises positioning a framework in the airflow pathway, and mounting the upstream electrode to the framework.

9. A method comprising steps of:
   providing an air stream flowing through an airflow pathway between upstream and downstream locations;
   positioning filters in the airflow pathway to entrap contaminants in the air stream passing through the airflow pathway, the filters cooperating to form an upstream face facing the upstream location and an opposed downstream face facing the downstream location;
   positioning electrically interconnected downstream electrodes in the airflow pathway each contacting one of the filters;
   positioning electrically interconnected ionizer electrodes in the airflow pathway between the upstream location and the upstream face formed by the filters;
   positioning electrically interconnected upstream electrodes in the airflow pathway between the upstream location and the ionizer electrode;
   applying a first potential to the ionizer electrodes imparting through induction a) a second potential to the upstream electrodes, and b) a third potential to the downstream electrodes;
   the electrically interconnected ionizer electrodes substantially uniformly dispersing the first potential across the ionizer electrodes forming a substantially uniform first ionizing field between the upstream electrodes and the ionizer electrodes; and
   the electrically interconnected downstream electrodes substantially uniformly dispersing the third potential across the downstream electrodes forming a substantially uniform second ionizing field between the downstream electrodes and the ionizer electrodes.

10. The method according to claim 9, further comprising electrically isolating the upstream electrodes to inhibit arcing from occurring at the upstream electrodes.

11. The method according to claim 9, further comprising grounding the downstream electrodes.

12. The method according to claim 9, further comprising coupling a resistor to the upstream electrodes and adjusting the resistor to obtain a predetermined value of the first potential.

13. The method according to claim 9, wherein the step of positioning the filters in the airflow pathway further comprises positioning frameworks in the airflow pathway, and mounting the filters to the frameworks.

14. The method according to claim 9, wherein the step of positioning the electrically interconnected downstream electrodes in the airflow pathway each contacting one of the filters further comprises positioning frameworks in the airflow pathway, and mounting the downstream electrodes to the frameworks.

15. The method according to claim 9, wherein the step of positioning the electrically interconnected ionizer electrode in the airflow pathway further comprises positioning frameworks in the airflow pathway, and mounting the ionizer electrodes to the framework.

16. The method according to claim 9, wherein the step of positioning the electrically interconnected upstream electrodes in the airflow pathway further comprises positioning frameworks in the airflow pathway, and mounting the upstream electrodes to the frameworks.

* * * * *